C. T. MOORE.
AUTOMATIC TYPOGRAPHIC APPARATUS.
APPLICATION FILED MAY 12, 1904. RENEWED MAR. 13, 1912.
1,115,474.
Patented Oct. 27, 1914.
17 SHEETS—SHEET 3.
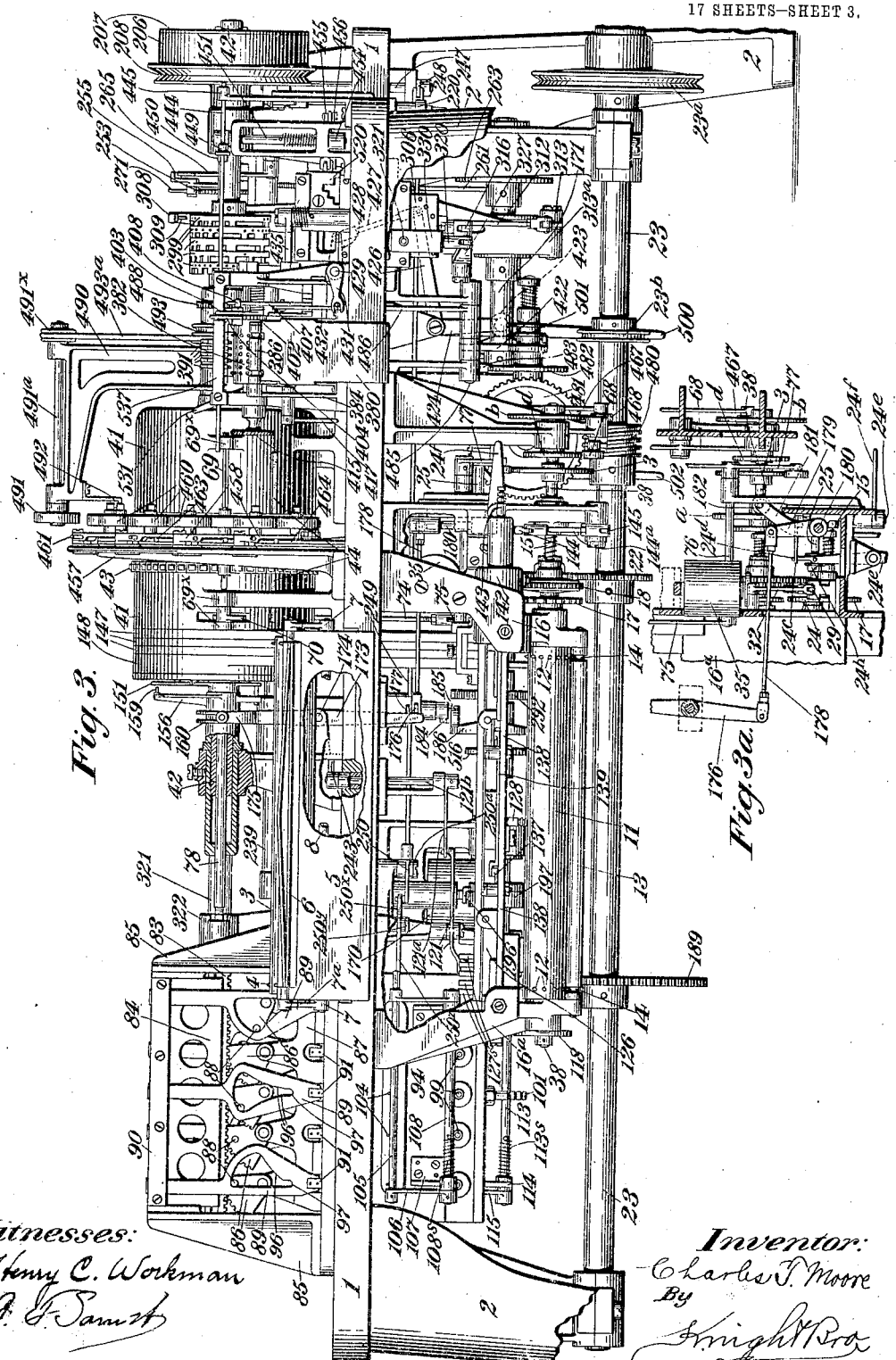
Witnesses:
Henry C. Workman
Inventor:
Charles T. Moore
By Knight Bro
Attorneys.

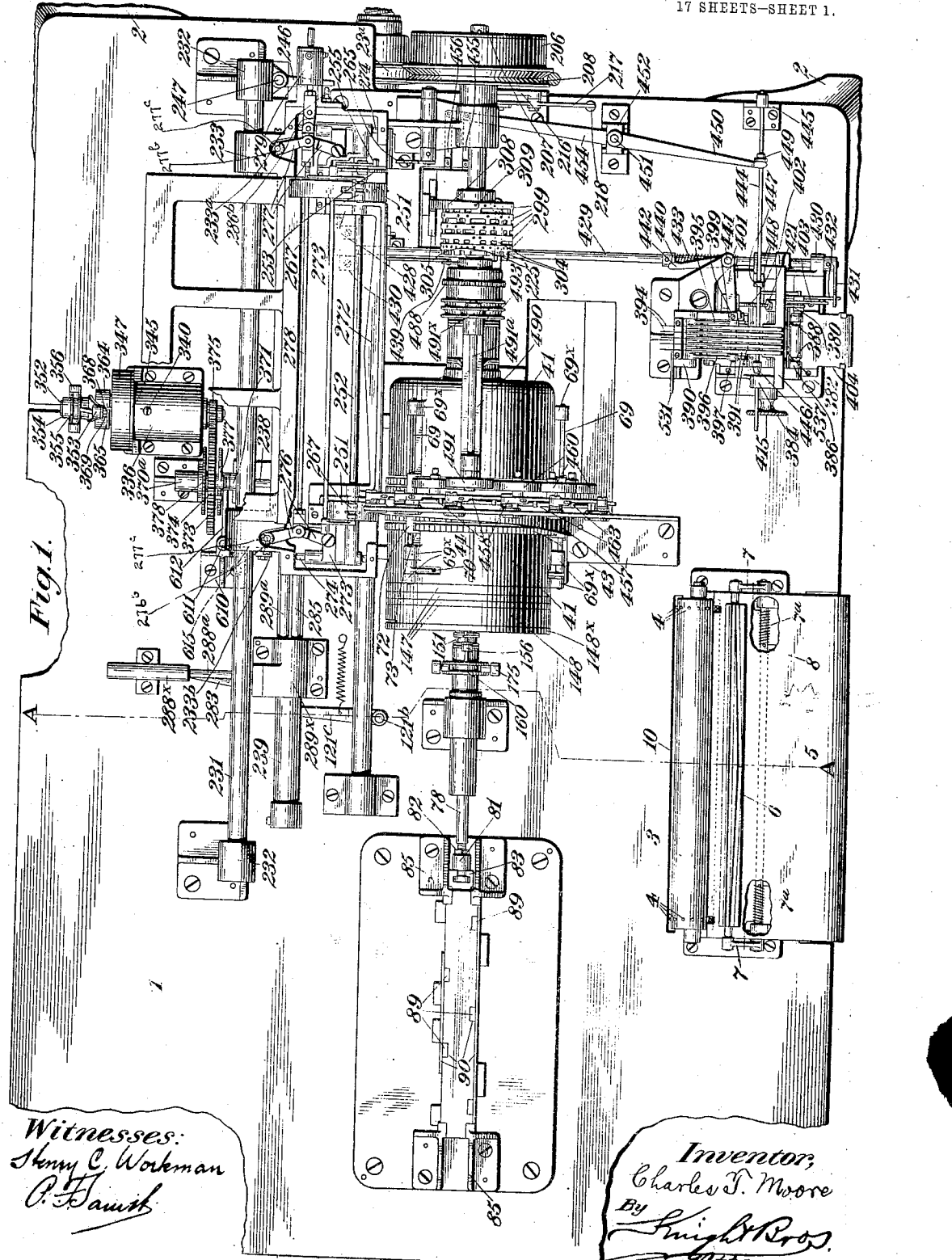

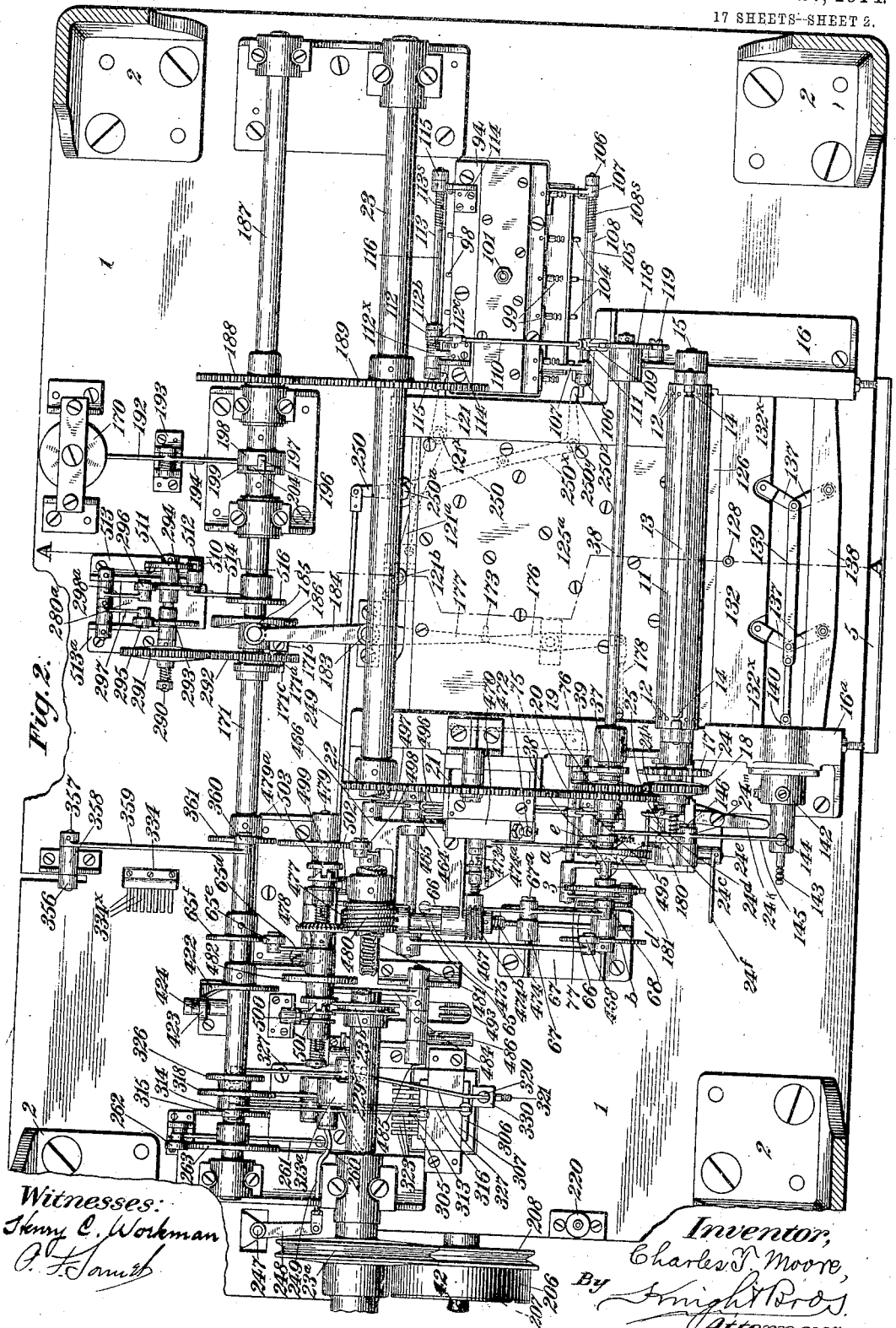

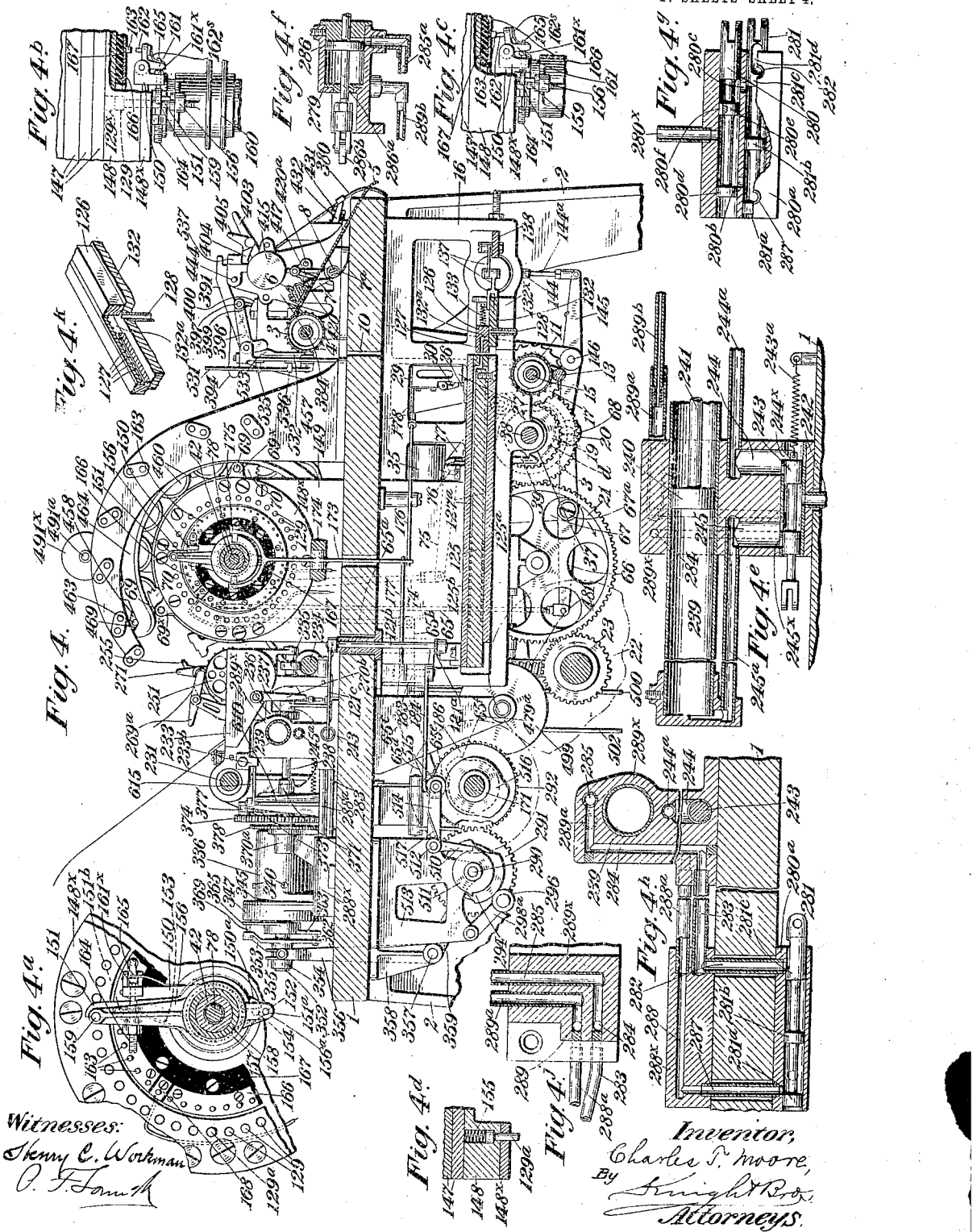

C. T. MOORE.
AUTOMATIC TYPOGRAPHIC APPARATUS.
APPLICATION FILED MAY 12, 1904. RENEWED MAR. 13, 1912.
1,115,474.   Patented Oct. 27, 1914.
17 SHEETS—SHEET 5.
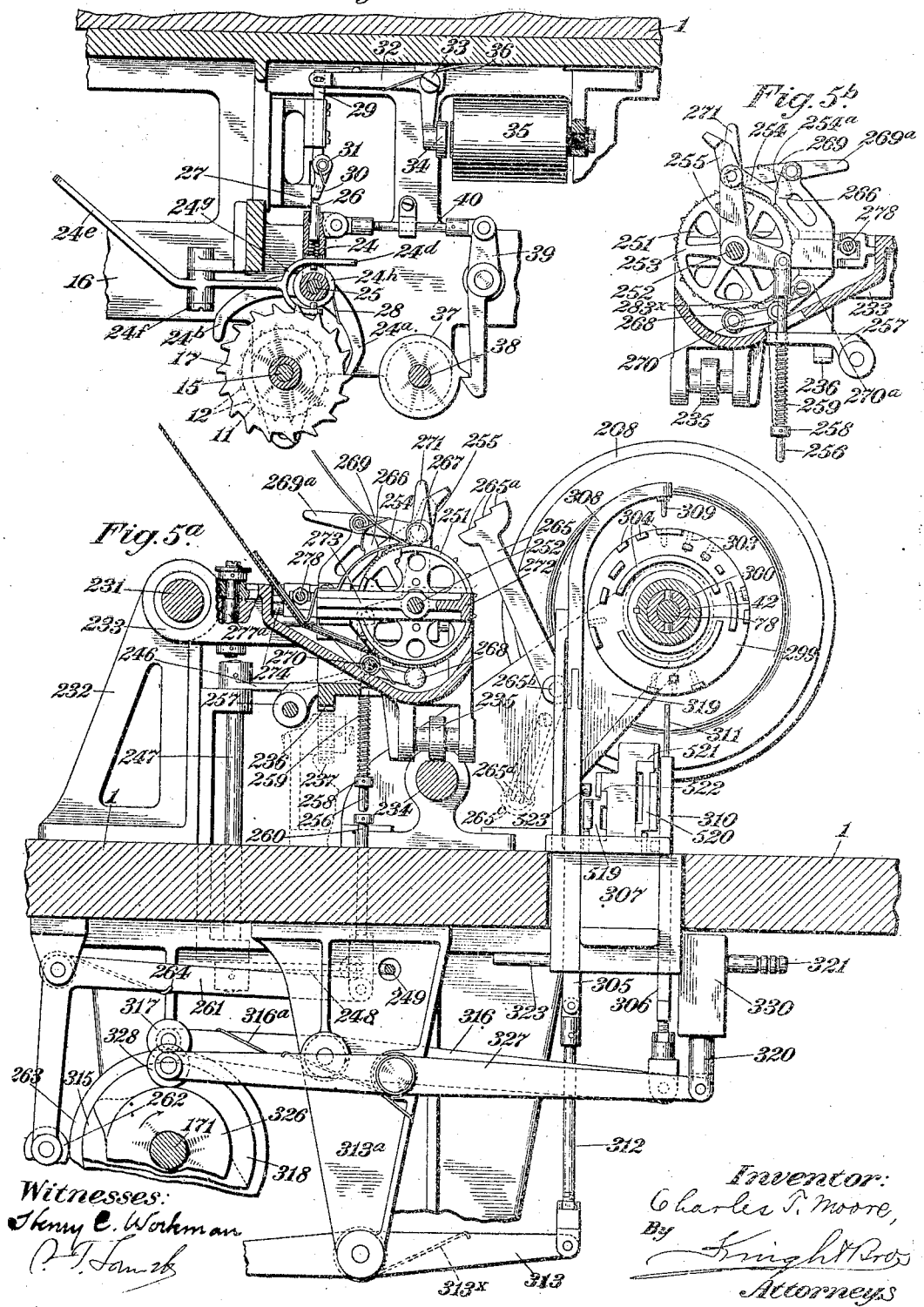

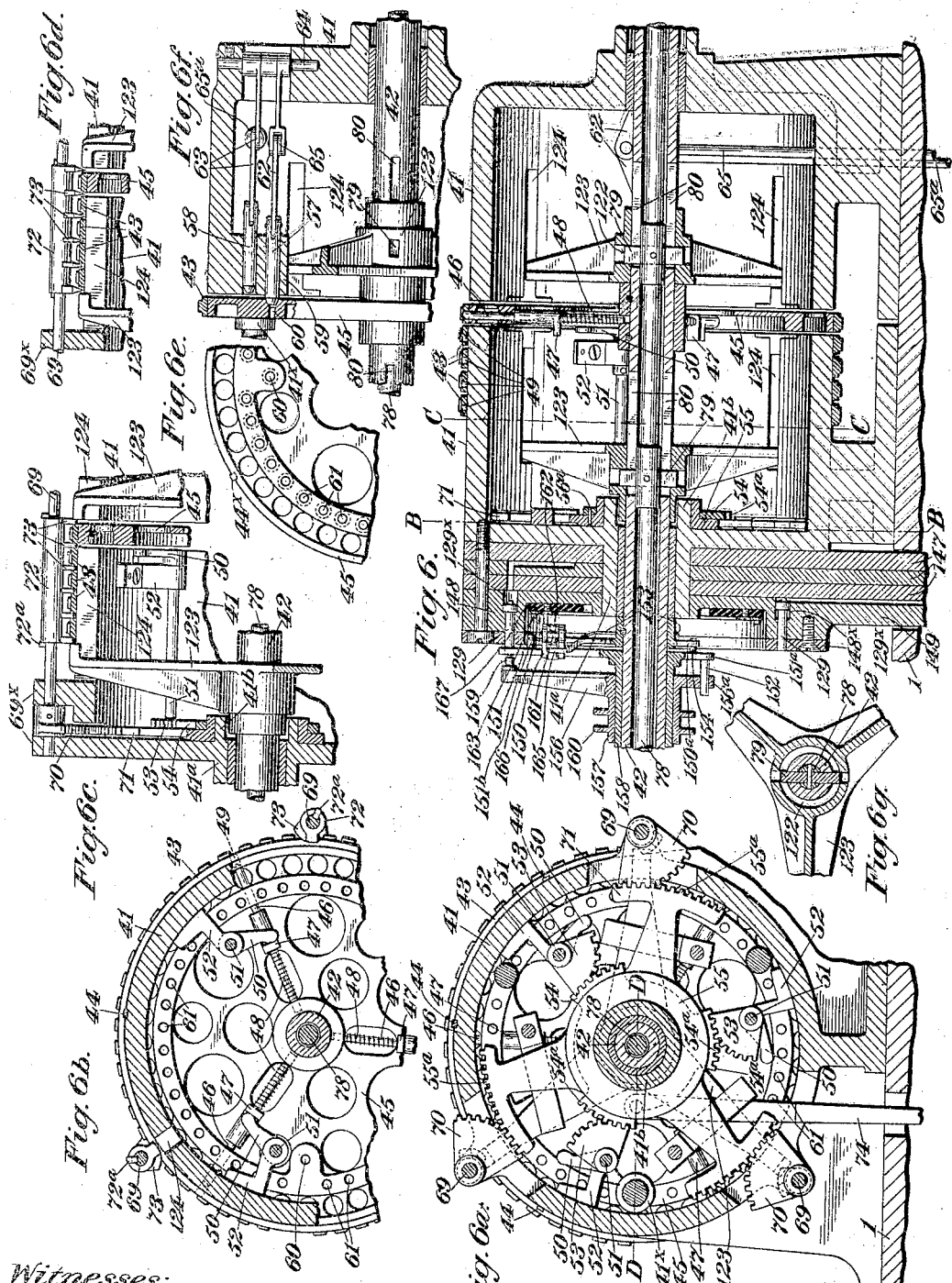

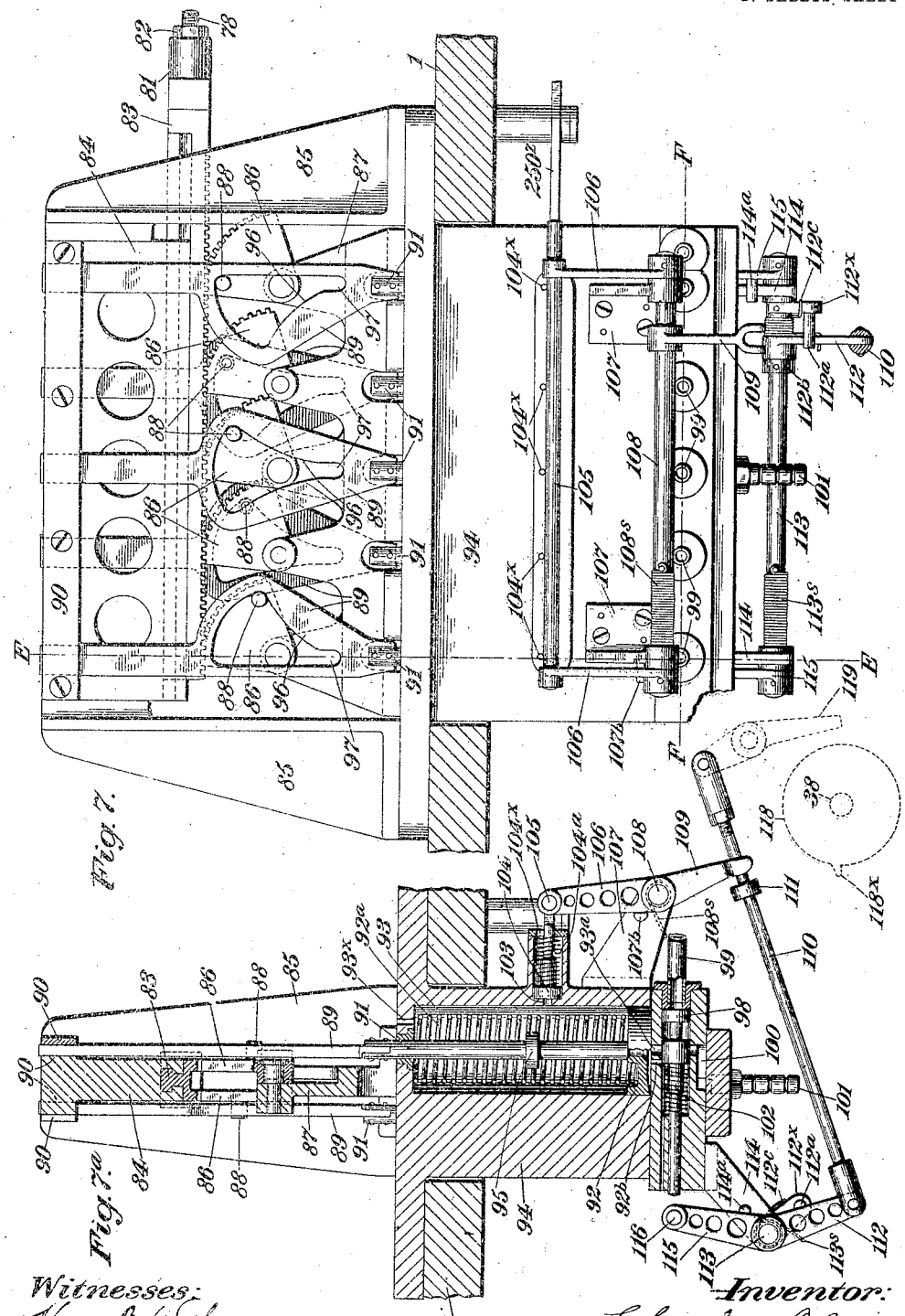

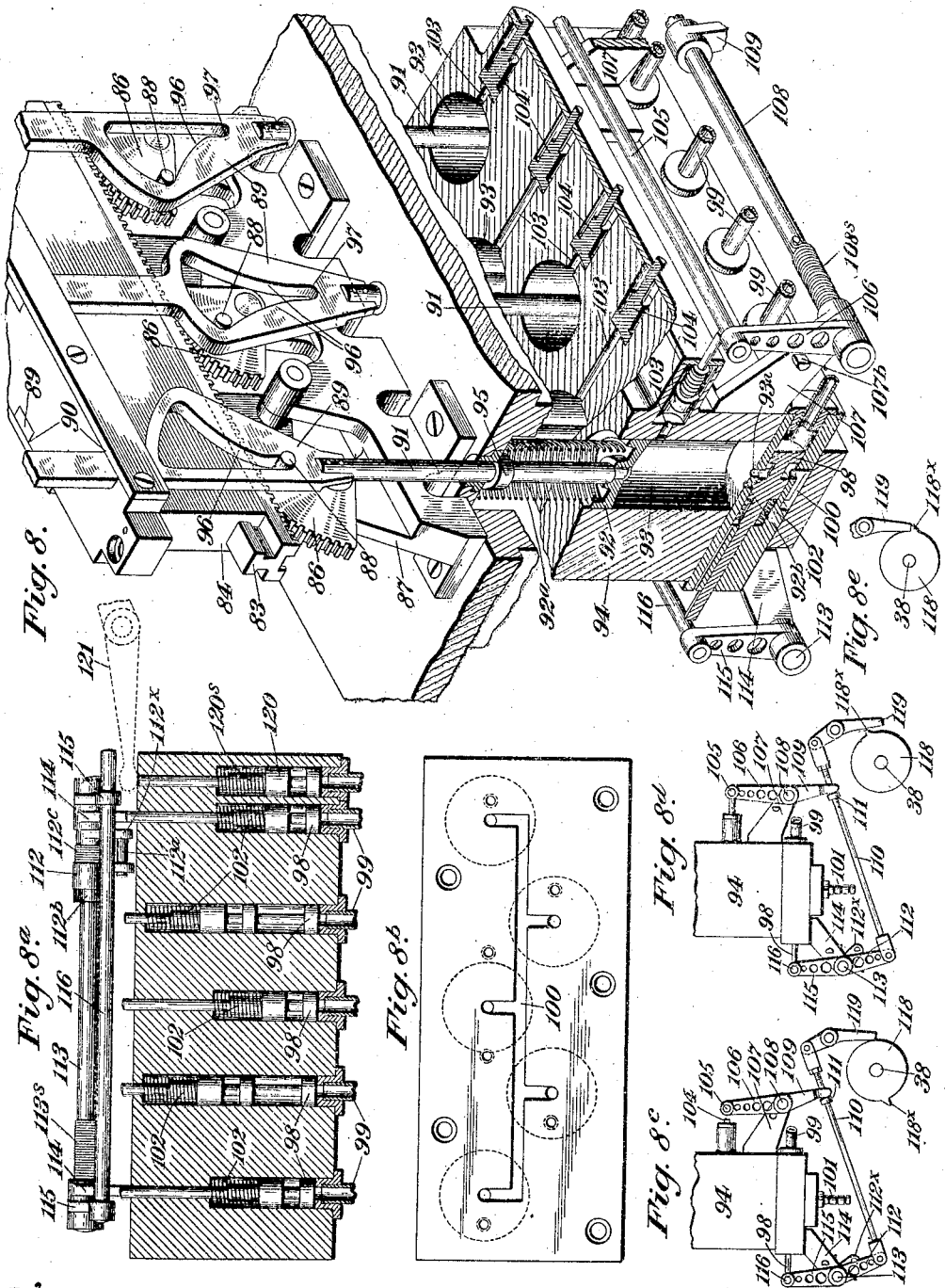

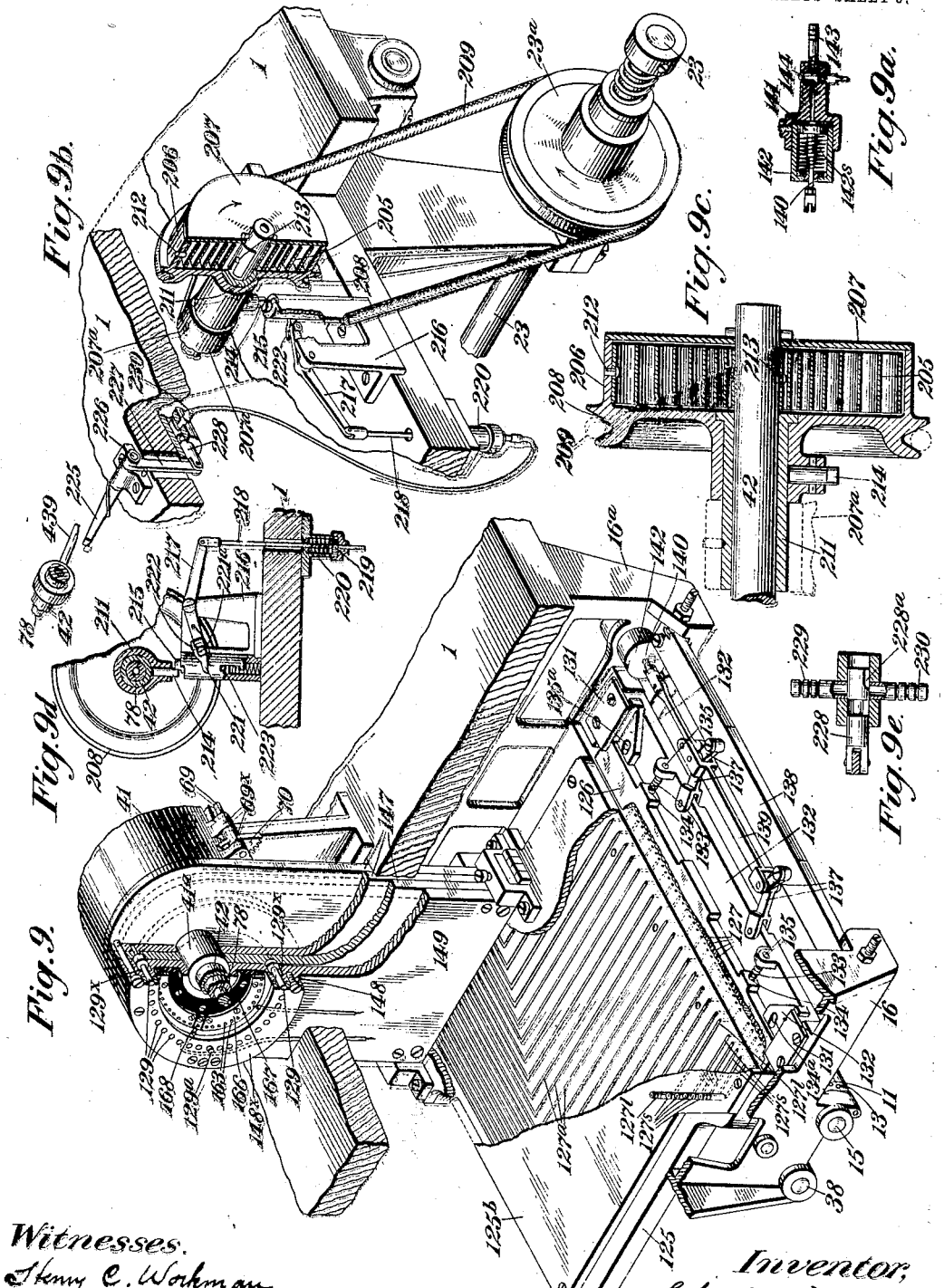

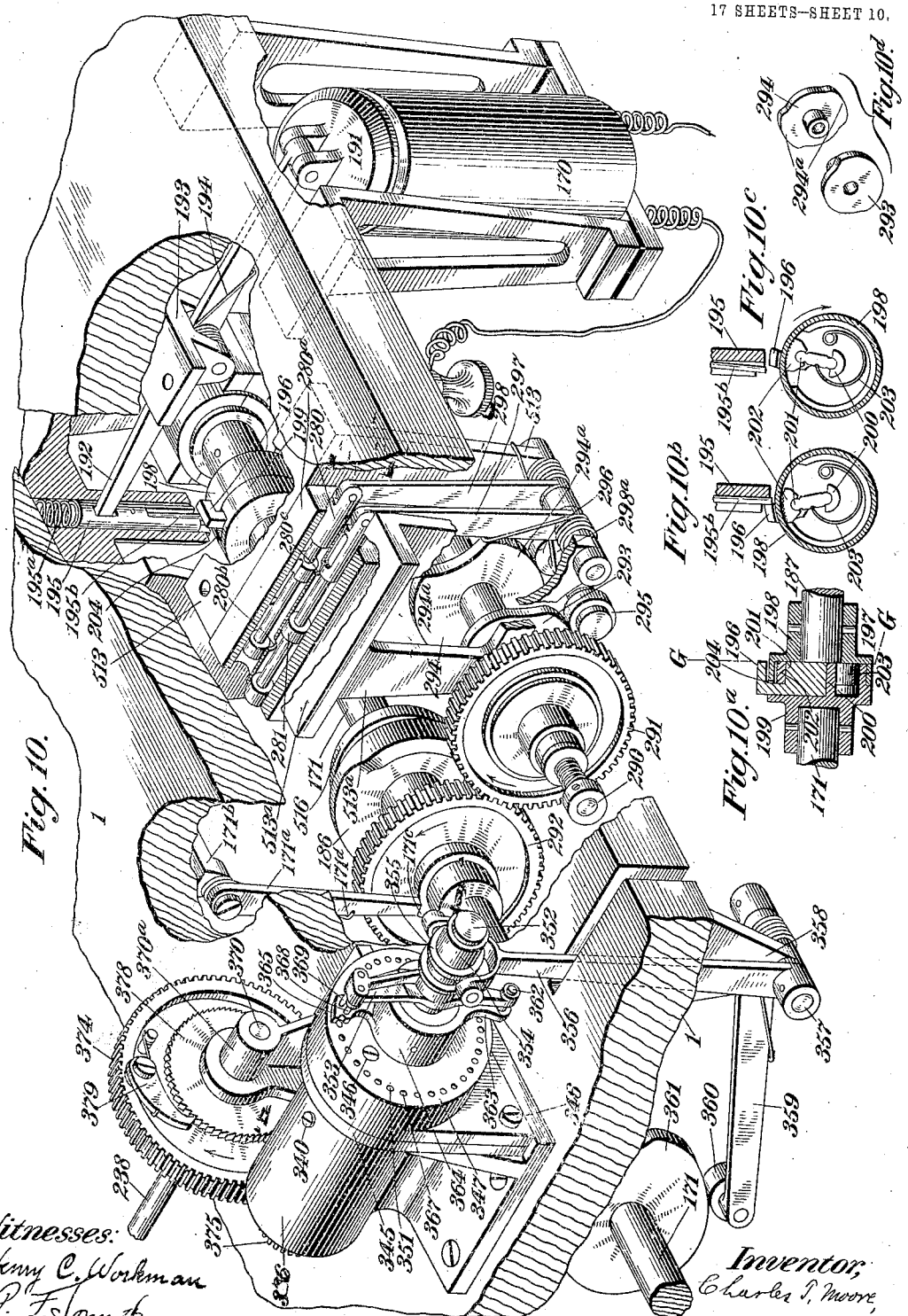

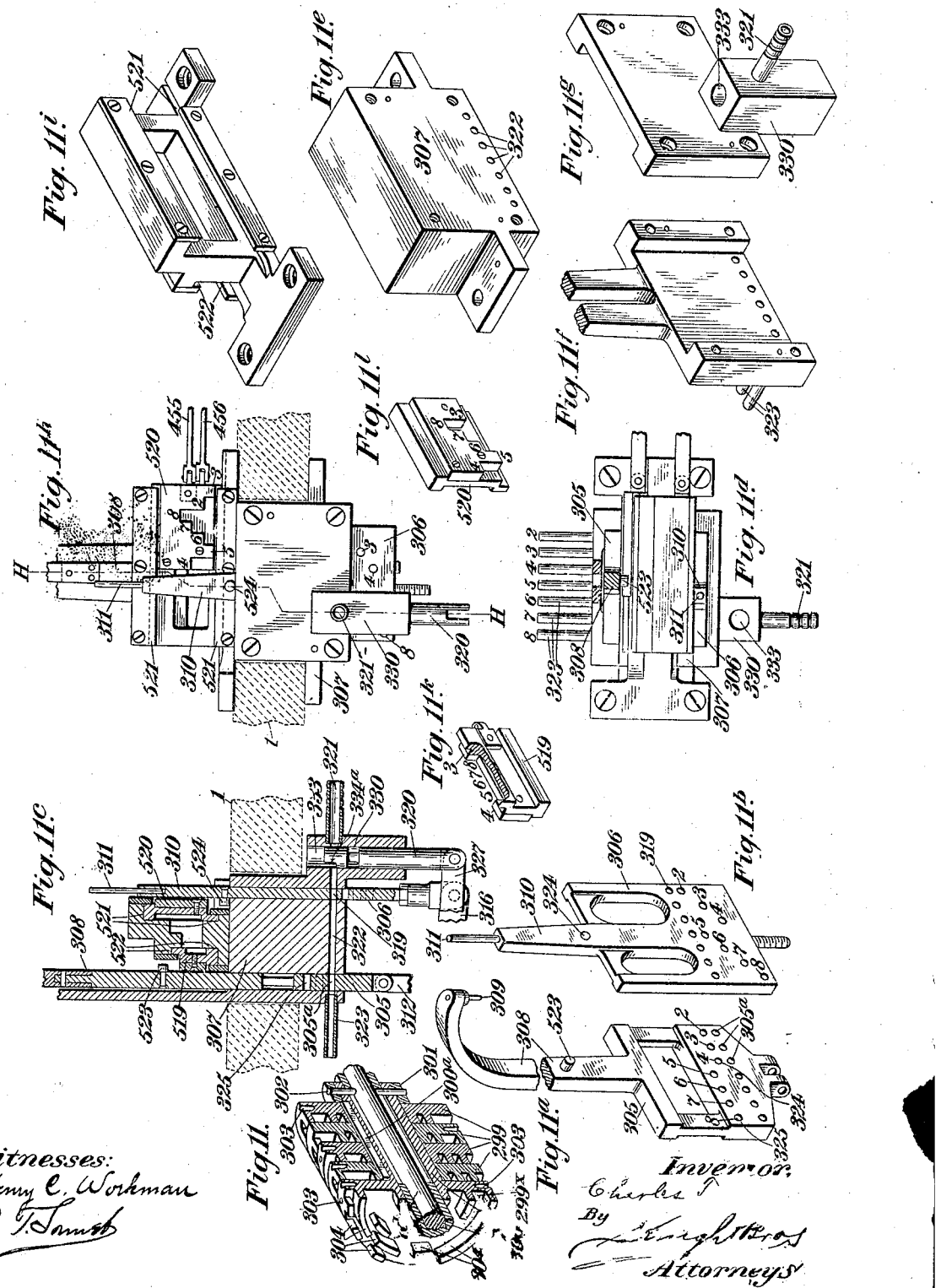

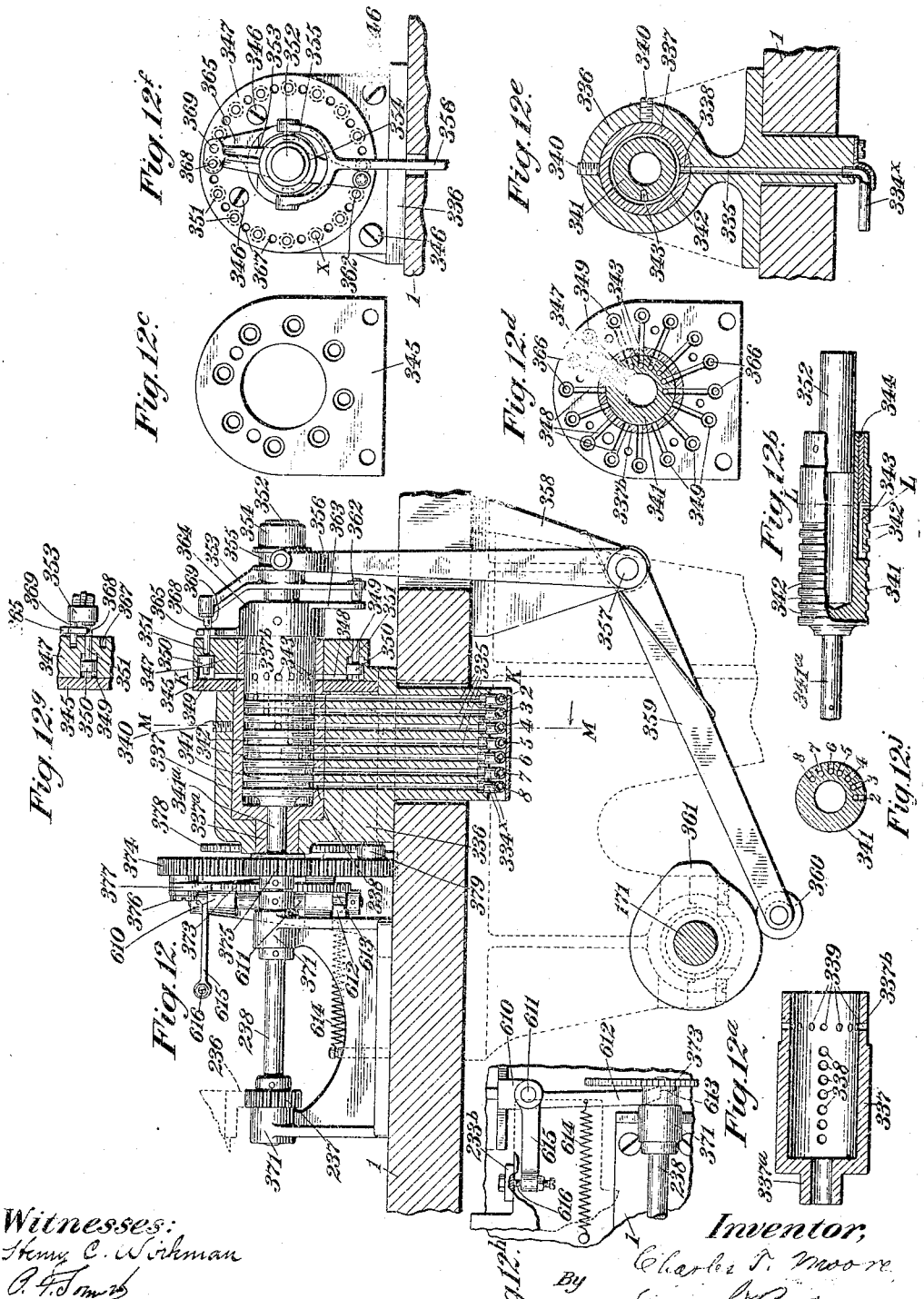

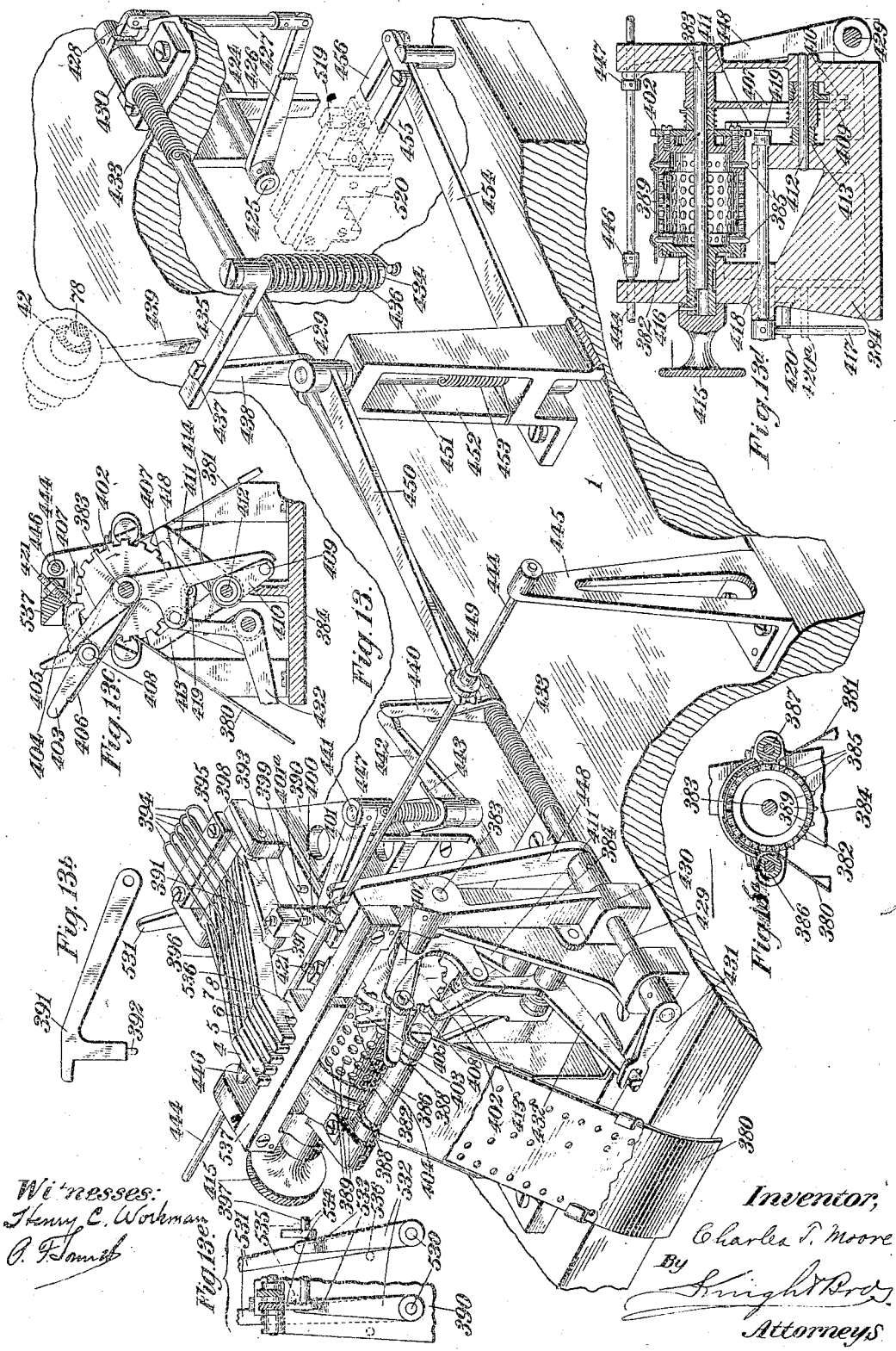

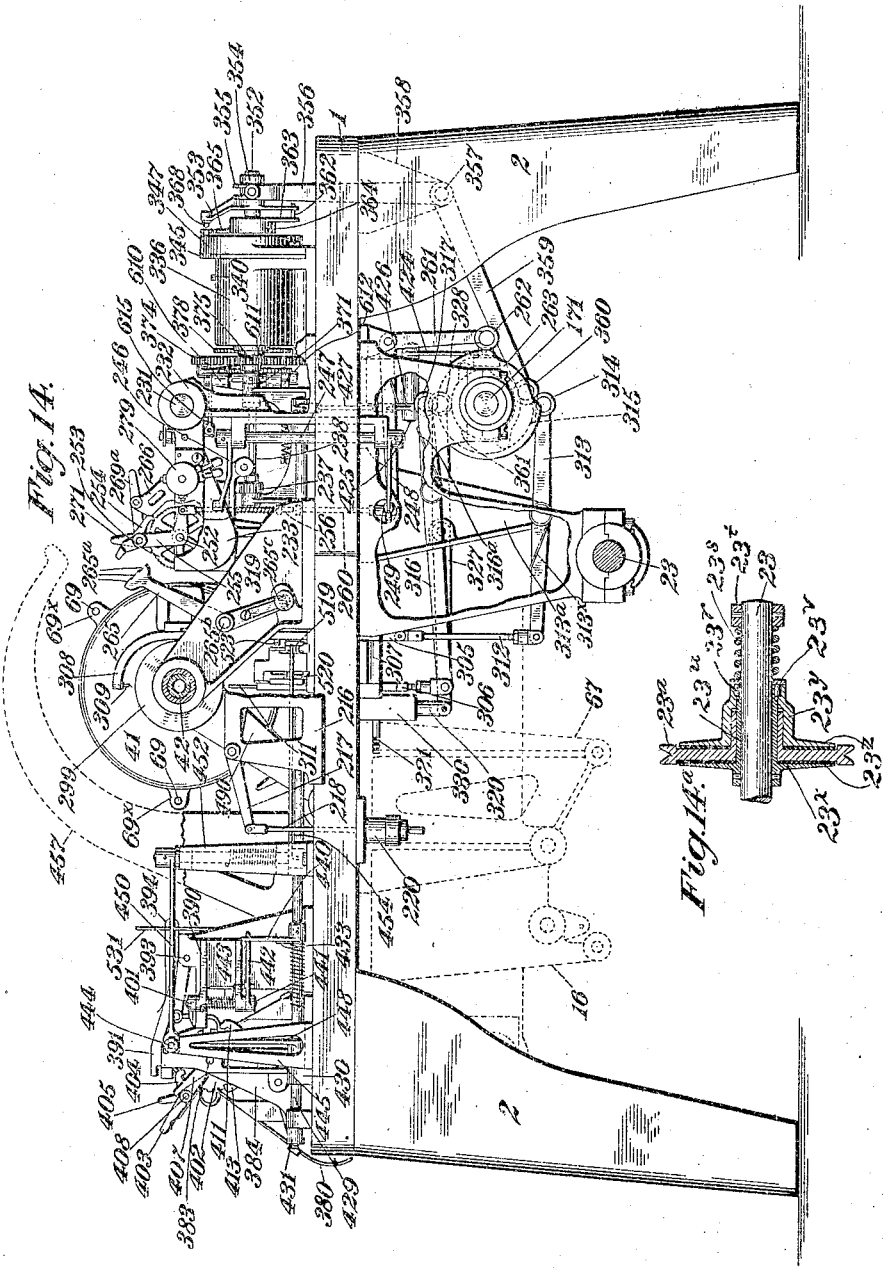

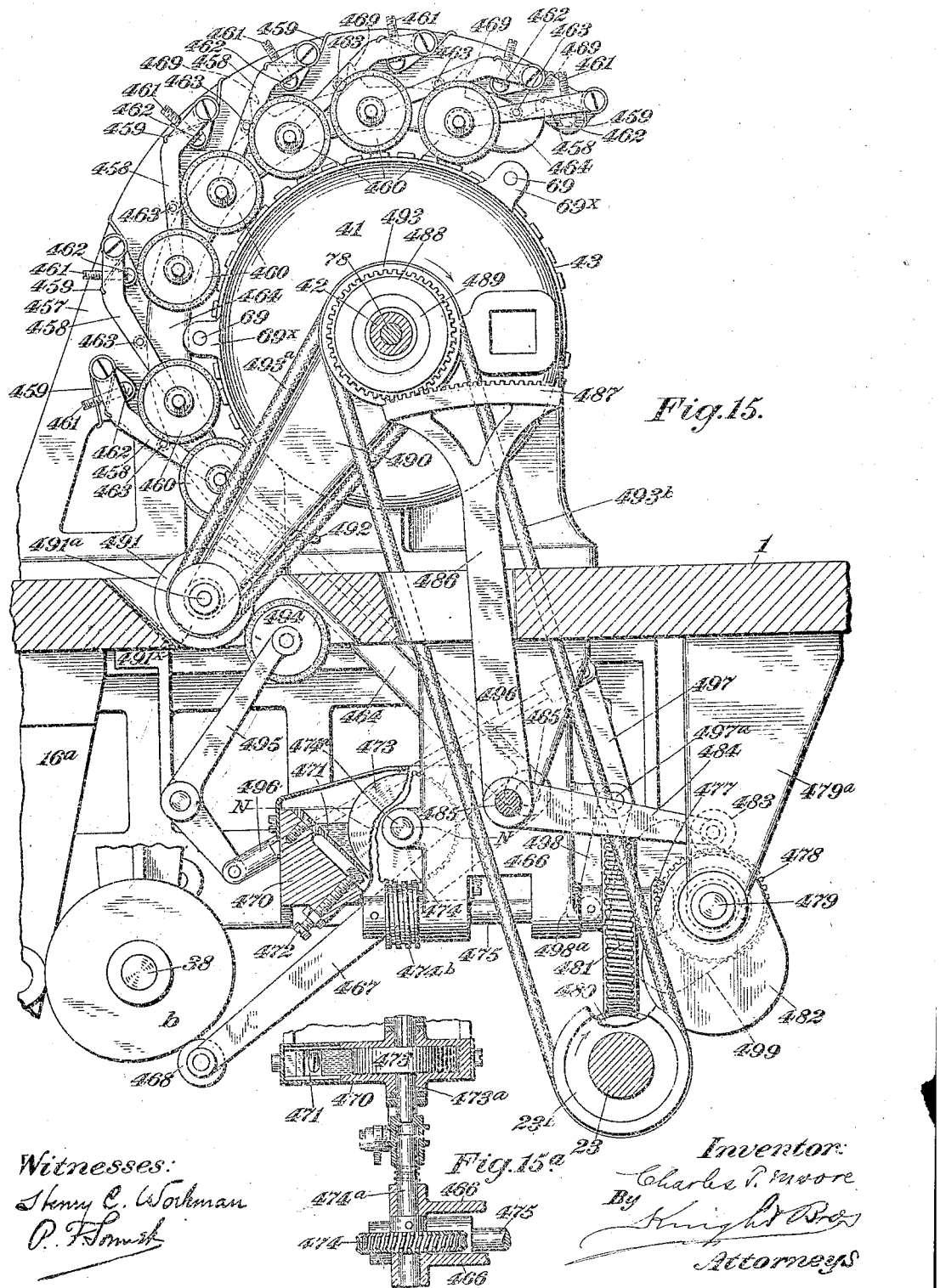

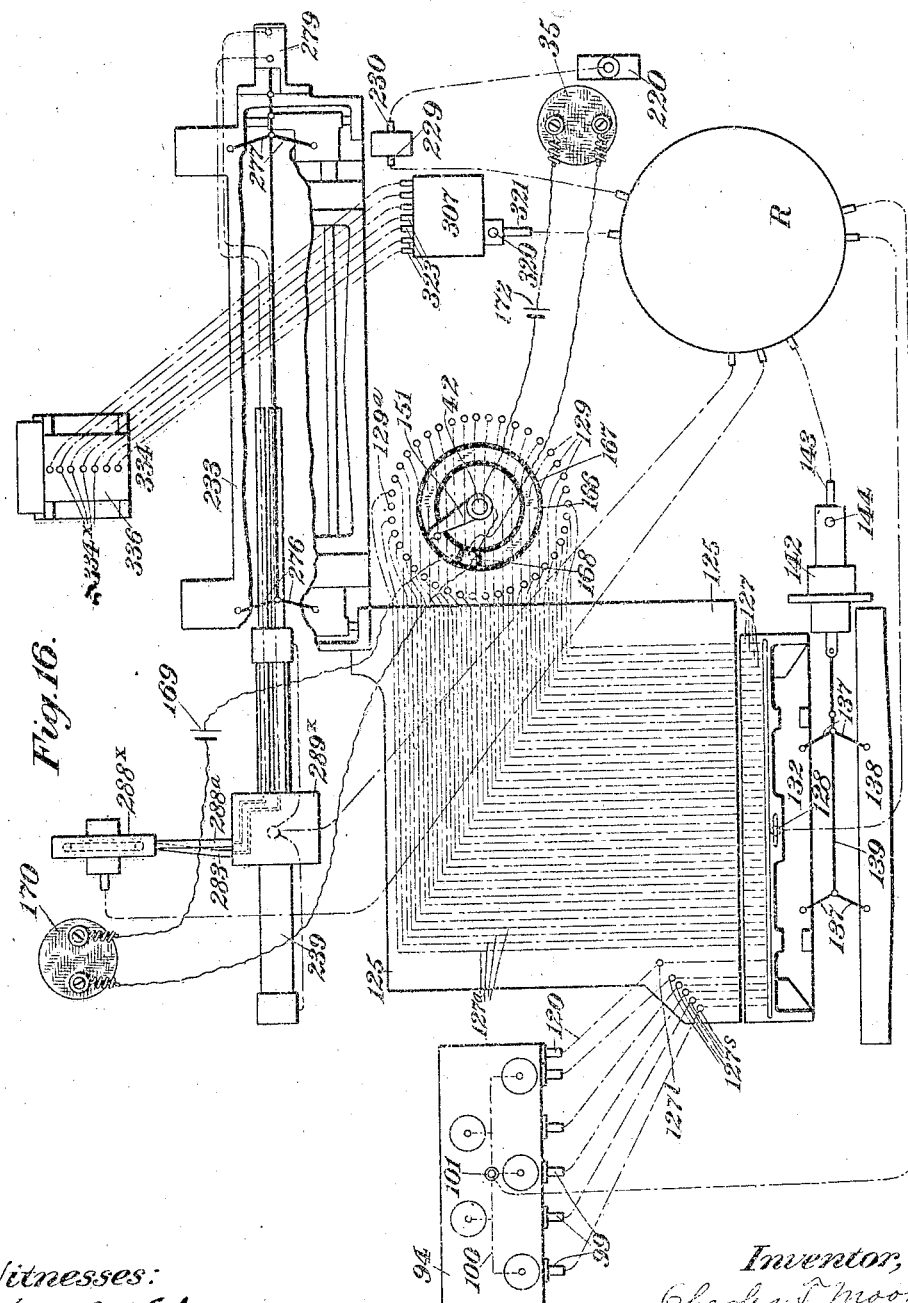

C. T. MOORE.
AUTOMATIC TYPOGRAPHIC APPARATUS.
APPLICATION FILED MAY 12, 1904. RENEWED MAR. 13, 1912.
1,115,474.
Patented Oct. 27, 1914.
17 SHEETS—SHEET 17.
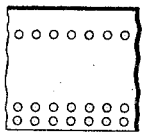
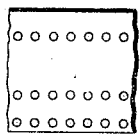
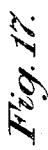
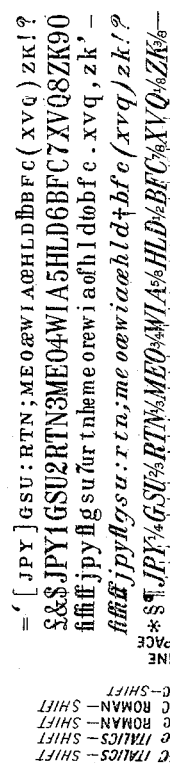
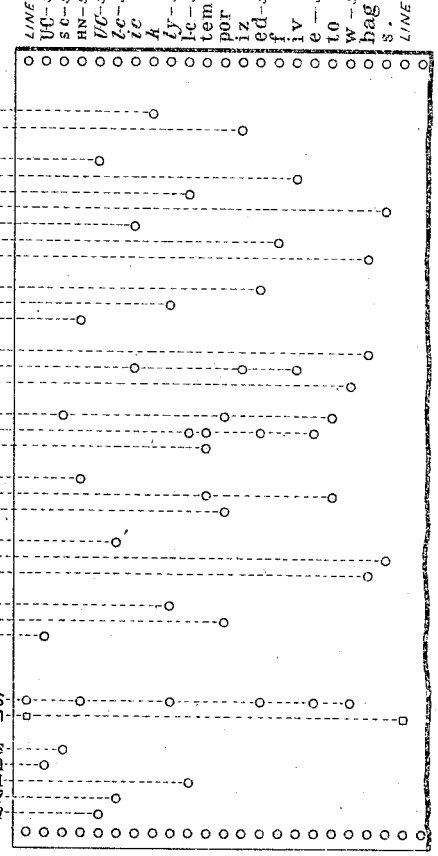
Witnesses:
Henry C. Workman
P. F. Tonnit
Inventor,
Charles T. Moore,
By Knight Bros.
Attorneys.

UNITED STATES PATENT OFFICE.

CHARLES T. MOORE, OF WASHINGTON, DISTRICT OF COLUMBIA, ASSIGNOR, BY MESNE ASSIGNMENTS, TO JAMES G. COFFIN, TRUSTEE.

AUTOMATIC TYPOGRAPHIC APPARATUS.

1,115,474.   Specification of Letters Patent.   Patented Oct. 27, 1914.

Application filed May 12, 1904, Serial No. 207,668. Renewed March 13, 1912. Serial No. 683,606.

*To all whom it may concern:*

Be it known that I, CHARLES T. MOORE, a citizen of the United States, residing at Washington, in the District of Columbia, have invented certain new and useful Improvements in Automatic Typographic Apparatus, of which the following is a specification.

My invention relates to automatic typographic apparatus of the class in which the operation is controlled by means of a composing device on which is represented typographic characters and operations forming a composition, which composition is reproduced in typographic characters by the operation of the automatic apparatus.

The apparatus forming the subject of the present invention is more particularly adapted to coöperate with a composing device in the nature of a tape or ribbon on which the characters, spaces, shifts and other features constituting the typographic composition to be produced are represented by perforations. The perforations of the composing device are arranged in a series of transverse lines some of which contain a plurality of character representations and others of which may contain only a single character-representation, according as the consecutively occurring characters in the composition follow or do not follow a predetermined order of sequence. Besides bearing character-representations the composing device, with which the machine, herein-described, is designed to coöperate, has thereon perforations representing various other features of a typographic composition which perforations control the apparatus to produce word spacing and case changing or shifting from one case or face of type to another, line representations and other representations which will be hereinafter referred to.

A composing device of the character above described is disclosed in my application for Letters Patent Serial No. 136,185, filed December 22, 1902. Said composing device consists of two members, one of which controls the operation of the typographic apparatus to perform the functions above described the other member of which controls the justification of the lines of the composition.

The machine herein-described is of the class in which fluid pressure is employed, the perforations and blank portions of the composing device or ribbon forming valves controlling the admission of the fluid pressure to various parts of the machine corresponding to said perforations. The most convenient form of fluid pressure being compressed air, the term "air" or "air pressure" as used in this specification is to be understood to mean any convenient form of fluid pressure as well as air; the invention being understood as not restricted to the use of air pressure only.

The following is a description of the invention to enable those skilled in the art to make and use the same.

In the accompanying drawings I have illustrated an apparatus embodying my invention, in the several views of which the same reference letters indicate corresponding parts. For convenience of reference I have given all the views on the same sheet the same numeral, the several views on each sheet being identified by suitable index letters.

Figure 1 shows a plan view of the apparatus. Fig. 2 is a plan view of the lower side of the apparatus. Fig. 3 is a front elevation of the apparatus. Fig. 3ª is a detail showing plan of a portion of auxiliary cam shaft and tape feed escapement with base-plate removed. Fig. 4 is a sectional elevation on line A A of Fig. 1 viewed from left of apparatus. Figs. 4ª to 4ᵈ inclusive are details showing stop-pin and contact mechanism. Fig. 4ᵉ is a detail showing section of carriage cylinder and controlling valve. Fig. 4ᶠ is a detail showing section of impression mechanism cylinder and connections. Figs. 4ᵍ 4ʰ and 4ʲ are detail sections showing portions of impression controlling mechanism. Fig. 4ᵏ is a sectional detail showing a portion of tape clamp and valve. Fig. 5 is a detail showing escapement mechanism of tape feed shaft and auxiliary cam shaft. Fig. 5ª is a detail elevation showing section of carriage and carriage feed controlling mechanism. Fig. 5ᵇ is a detail showing impression-material line feed mechanism. Fig. 6 is a vertical longitudinal section through type-wheel shaft showing type-carrier mechanism. Fig. 6ª is a transverse sectional detail through line B B of Fig. 6 and shows spiders for operating type-carrier wedges and type-carrier locking bolts. Fig. 6ᵇ is a detail section on line C C of Fig. 6 showing type-carrier wedges and locking bolts in operated position. Figs. 6ᵉ and 6ᵈ are details showing action of type-carrier wedges. Fig. 6ᵉ is a detail showing a portion of type-wheel. Fig. 6ᶠ is a partial section taken on line D D of Fig. 6ᵃ and shows type-wheel locking pins. Fig. 6ᵍ is a transverse section of the type wheel shaft and the spider frame. Fig. 7 is a front elevation of type-carrier shifting mechanism. Fig. 7ᵃ is a partial section taken on line E E of Fig. 7 looking from left side of apparatus. Fig. 8 is a detail in perspective and partial section of shifting mechanism. Fig. 8ᵃ is a partial section on line F F of Fig. 7 showing inlet valves. Fig. 8ᵇ is a detail showing bottom view of inlet valve block with cap removed showing air ducts. Figs. 8ᶜ, 8ᵈ and 8ᵉ are detail views of shifting mechanism showing action of safety lock. Fig. 9 is a detail in perspective and partial section of tape valve mechanism and positioning stops for type-carriers. Figs. 9ᵃ to 9ᵉ inclusive are details showing driving mechanism for type-wheel shaft and air connections. Fig. 10 is a detail perspective and partial section showing carriage feed controlling mechanism, impression mechanism valves and stopping and starting mechanism for main cam shaft. Fig. 10ᵃ is a detail section showing main cam shaft clutch. Figs. 10ᵇ and 10ᶜ are detail sections on line G G of Fig. 10ᵃ and shows action of clutch. Fig. 10ᵈ shows detail views of impression mechanism valve controlling cams. Fig. 11 is a detail sectional perspective of gage slides. Figs. 11ᵃ and 11ᵇ are details showing gage slides in perspective. Fig. 11ᶜ is a detail showing section of gage slide mechanism on line H H of Fig. 11ʰ. Fig. 11ᵈ is a detail and partial section showing top view of gage slide mechanism. Figs. 11ᵉ, 11ᶠ and 11ᵍ are details showing gage slide block and caps in perspective. Fig. 11ʰ is a detail showing elevation of gage-slide mechanism from right side of apparatus. Figs. 11ⁱ, 11ᵏ d are details showing justification step side guides and slides. Fig. 12 is a detail showing elevation and partial section of carriage feed-controlling mechanism. Figs. 12ᵃ to 12ᵍ inclusive are details showing parts of carriage feed controlling mechanism, Figs. 12ᵈ and 12ᵉ being section views on lines K K and M M respectively of Fig. 12. Fig. 12ʰ is a detail view showing the carriage normal positioning lock. Fig. 12ʲ is a detail section on line L L, Fig. 12ʰ looking in direction of the arrow. Fig. 13 is a detail showing justification mechanism in perspective. Fig. 13ᵃ is a detail showing transverse section of feed drum. Fig. 13ᵇ is a detail showing a stop arm of justification mechanism. Fig. 13ᶜ is a detail showing end elevation of mechanism with parts removed. Fig. 13ᵈ is a detail vertical section through justification feed drum. Fig. 13ᵉ is a detail showing throw-out means of the justification mechanism. Fig. 14 is an elevation of machine from right side with parts removed. Fig. 14ᵃ is a detail section showing friction driving pulley. Fig. 15 is a detail showing inking mechanism in elevation. Fig. 15ᵃ is a detail section on line N N of Fig. 15 showing ink font and clutch connections. Fig. 16 is a diagrammatic view of the fluid pressure connections and also of the electrical circuits employed. Fig. 17 illustrates a portion of a controller strip or ribbon marked to control the machine to produce without justification the following sentence: "John quickly extemporized five tow bags." Fig. 17ᵃ shows portion of justification strip marked with appropriate justification marks to govern machine, so that it will justify above sentence. Figs. 17ᵇ to 17ᶠ inclusive, are portions of justification strip, illustrating marks that control the different amounts of justification. Fig. 17ᵍ shows a development of a portion of a type-carrier indicating characters and non-printing or blank portion thereon.

The apparatus is driven by belt connection with any convenient source of power, such as, for instance, an electric motor.

The fluid pressure for operating the various parts of the apparatus may be generated by a suitable pump or stored in a suitable reservoir from which it is conducted by suitable connections to the appropriate parts of the apparatus.

R represents the reservoir for fluid pressure having connections leading therefrom to the various parts of the apparatus, as will be hereinafter explained in detail.

The apparatus is constructed or built upon a base plate 1 supported by legs 2. Journaled in suitable bearings upon the lower side of the base-plate are the main operating shafts. (See Figs. 2 and 3).

The main driving shaft is indicated by numeral 23. A belt pulley 23ᵃ on one end of this shaft is the medium by which it is connected to the source of power. A countershaft 187 is connected through gears 188, 189 to the driving shaft 23 and has clutch connection 197 with the main cam shaft 171. Also geared to the driving shaft is an auxiliary cam shaft 38 by means of gears 20, 21 and 22.

*Feed mechanism for the composing ribbon.*—Referring to Figs. 1, 3 and 4: Near the front edge of base plate 1, and journaled in suitable brackets rising therefrom, is a guide roller 3 provided with sprocket-teeth 4 over which the composing device or perforated tape is led into the machine, a guide-plate 5 being provided to guide the tape or ribbon to said guide-roller. The tape or ribbon is provided near its edges with a series of sprocket-holes which are engaged by the sprocket-teeth 4 on the guide-roller. A drag or friction device consisting of a bar 6 extending transversely of plate 5 and provided with a cloth or felt covered face, is mounted in arms 7, 7, at opposite ends thereof; said arms being pivotally mounted upon a rod 8 and pressed downwardly upon the guide-plate by means of springs 7ª mounted upon the rod 8 and bearing upon arms 7, 7. This spring-pressed drag 6 insures engagement of the sprocket-teeth with the sprocket-holes in the tape or ribbon, and keeps the tape or ribbon taut and smooth when passing through the valve-clamp hereinafter described. From guide roller 3 the tape or ribbon passes down through a slot 10 in the base-plate, over a feed roller 11, Fig. 2, provided with sprocket-teeth 12 similar to sprocket-teeth 4 on the guide-roller 3. A presser roll 13 is provided having grooves 14, 14, to receive the sprocket-teeth 12 of the roller 11 and is journaled to run in surface contact with the tape to keep it in engagement with the sprocket-teeth.

The feed roller 11 is mounted fast upon a shaft 15 journaled in frames 16, 16ª supported from the lower side of base-plate 1. Fast upon said shaft 15 is a sleeve carrying an escapement wheel 17 provided with escapement teeth. Mounted on the same sleeve with escapement wheel 17 is a frictional-driving gear 18 in mesh with the train of gears 19, 20, 21 and 22, thus connecting said feed roll 11 with the driving shaft 23 (Figs. 2, 3 and 4.) The feed of the tape or ribbon is governed by the said escapement wheel 17 as controlled by escapement lever 24. (See Fig. 5.) This escapement lever is pivoted on the stud 25 projecting laterally from the frame 16. Said escapement lever is formed with forked arms 24ª, 24ᵇ, the extremities of which are shaped to engage the teeth of the escapement wheel 17. Arm 24ª engages the teeth of the escapement wheel to arrest it; and arm 24ᵇ is so shaped as to be engaged by the teeth of the escapement wheel in its revolution. The teeth striking arm 24ᵇ act to cam back arm 24ª into engagement with the next tooth and arrest the escapement wheel after each escapement. By this means the escapement of only one tooth at a time is possible.

In the tail of the escapement lever is mounted a spring bolt 26, which, in its projected position, engages a stop-block 27 on the frame 16. This block holds the escapement lever from movement, keeping arm 24ª in engagement with the escapement-wheel and holding the same from movement. A spring 28 surrounds the stud on which the escapement lever is mounted and tends to disengage the arm 24ª from the escapement wheel and keeps the bolt 26 pressed against the stop block 27. Arm 24ª is of such a shape, and engages the escapement wheel at such point, that the tendency of said escapement wheel to rotate under the influence of the main driving shaft assists the action of spring 28.

Mounted to slide adjacent the face of the stop-block 27 is a plunger 29 having pivoted at its lower end a spring finger 30 which is kept in contact with the stop-block by its spring 31. Pivotally connected with the upper end of said plunger 29 is a bell-crank lever 32 which is pivoted on a stud 33 in bracket 16. The downwardly-extending arm of this bell-crank lever is provided with an armature 34 arranged adjacent an electro-magnet 35 supported on bracket 16. A spring 36 tends to urge bell-crank lever 32 upward and thus to hold the plunger 29 away from the bolt 26 and armature 34 away from the magnet. The electro-magnet 35 is energized by connections from the type-carrier-arresting mechanism, hereinafter described, the circuit of the magnet being closed when the type carrier is arrested in normal position by the normal stop-pin, as hereinafter described, it being understood that the type carrier is arrested in normal position after the completion of each cycle of movement and that a cycle of movement of the type carrier is performed for each transverse line of perforations upon the tape or ribbon. The electromagnet being energized at each arrest of the type wheel in normal position attracts the armature 34, the movement of which through the bell crank lever 32 depresses plunger 29, the finger of which strikes the bolt 26 pushing it below the stop-block 27, thereby freeing the escapement lever and permitting the same to oscillate on its pivot and allow an escapement of the escapement wheel 17 one tooth, the escapement lever being immediately returned by the camming action of the teeth of the escapement wheel against the arm 24ᵇ. By this means the feed roller 11 is given a movement of one tooth causing a feed of the ribbon one transverse line. The purpose of the spring finger 30 at the end of plunger 29 is to permit of the return movement of the escapement lever in case the plunger 29 and its finger 30 have not been withdrawn sufficiently quickly out of the path of bolt 26.

In order to enable the ribbon to be inserted in the machine and adjusted, a hand-operated feeding device is provided. (See Figs. 2 and 5). This device consists of a hand lever 24ᵉ pivoted on a stud 24ᶠ on frame 16. One end of the lever is yoke-shaped as at 24ᵍ and engages a collar 24ʰ on the hub of the escapement lever 24. A latch 24ᶜ engages the extension 24ᵈ of the yoke 24ᵍ and holds the lever 24ᵉ in its shifted position. The latch 24ᶜ is mounted on a rock shaft 24ᵏ and a finger lever 24ᵐ is provided on the other end of said rock shaft for releasing the latch.

By operating the lever 24$^e$ the escapement lever may be slid out of engagement with the escapement wheel 17, thus permitting the feed roller 11 to be turned by hand.

The movement of escapement lever 24 releases the auxiliary cam shaft 38. This shaft is provided with a one-tooth escapement wheel 37. A pivotally mounted escapement lever 39 is oscillated by the movement of escapement lever 24 through the connection 40. Normally the escapement lever 39 is in engagement with the tooth of escapement wheel 37, and when the escapement lever 24 is operated through the medium of the electro-magnet 35, as above described, the movement of said lever through the connection 40 and lever 39 releases the escapement wheel 37, and the shaft 38 begins to rotate under the influence of the train of gears connecting it with the main driving shaft 23. Immediately upon release of the escapement wheel 37 by lever 39, this lever is returned to normal position by the return movement of the escapement lever 24 and is in position to catch the tooth of the escapement wheel 37 when it comes around to initial position. In the course of its rotation, auxiliary cam shaft 38 performs five distinct functions by means of five cams $a$, $b$, $c$, $d$ and $e$ mounted thereon. The function of cam $a$ Fig. 2 is to restore the normal stop-pin which arrests the type-carrier in normal position. In order to explain the function of this cam a description of the type-carriers and their stop mechanism will first be necessary.

*The type carriers.*—Referring to Figs. 1, 3 and 6 of the drawings, there is shown a cylinder 41 mounted upon the base-plate 1 of the machine. Passing through the hubs of the heads of this cylinder is a tubular shaft 42 having bearings in said hubs and extending longitudinally of the machine. Said cylinder 41 forms a support for type-carriers 43, of which five are shown in the drawings. It will be understood however, that the number of type-carriers need not be limited to five, but that any desired number may be employed. Each type-carrier carries a set of type of the same face or case, so that, as shown in the drawings, the machine is equipped for five shifts of type, which may be, for instance, upper case roman, lower case roman, upper case italics, lower case italics and small caps. The type-carriers are guided upon the cylinder or support 41 by means of splines 44, of which there are shown three; but any suitable number may be provided. Intermediate of its length the cylinder or support 41 has a slot in which rotates a wheel 45. The said wheel 45 is pinned to shaft 42 in such a manner that it may rotate therewith but there is a slight lost motion between them so that the wheel is capable of a slight rotary movement independent of shaft. The wheel is of the same diameter as the cylinder 41 and has splines 44$^x$ in register with splines 44 of cylinder when said carrier 45 is in normal position, so that any one of the type-carriers may be shifted along the drum of cylinder on to the wheel and rotated therewith. By the rotation of the shaft 42 and carrier 43 the type characters on the type-carrier are successively brought into impression position. In order to insure the correct positioning of the type-carrier when moved on to the wheel, locking bolts 46 (Figs. 6, 6$^a$ and 6$^b$) are provided, which are mounted upon the wheel or carrier 45 so as to slide radially thereon. In the drawings three of said locking bolts are shown at equal radial distances apart. Each locking bolt is provided with a lug 47 fast thereon, and is outwardly pressed by means of a spring 48 surrounding the inner portion of the bolt and bearing at one end upon the hub of the wheel and at the other end against lugs 47. These bolts are guided in apertures in the rim and hub of the wheel as shown. Each type-carrier is provided with a socket 49 to be engaged by the ends of these locking bolts, so that when one of said type-carriers is shifted from the cylinder 41 on to the wheel 45, the tapering ends of bolts will enter said sockets or depressions and will correctly and absolutely position the type-carrier in position on the wheel. The bolts 46 are operated by means of the lugs 47 which are engaged by fingers 50 secured fast on rock-shafts 51 mounted in bearings 52 secured to the interior walls of the cylinder 41. The left head 41$^a$ of the drum or cylinder 41 is provided with an inwardly projecting hub flange 41$^b$ on which is rotatably mounted a spider 55, and on the hub flange of said spider is mounted another spider 54. (See Fig. 6$^c$). Spiders 54 and 55 are pinned fast together by a pin 56$^a$. (See Fig. 6). The ends of the arms of the spider 55 are formed with toothed segments 55$^a$ and spider 54 is formed with toothed segmental portions 54$^a$. On the rock shafts 51 are secured toothed quadrants 53 meshing with the toothed portions 54$^a$ of the spider 54. By means of the oscillation of the spider 54 through mechanism hereinafter described, the quadrants 53 will be rocked, thereby rocking the fingers 50 which bearing upon the lugs 47 withdraw the bolts 46 from the sockets or depressions 49 in the type-carriers, thereby releasing them and allowing them to be shifted and another of said type-carriers to be moved into operative position upon the wheel 45. Further locking or positioning means are provided for correctly positioning the type-carriers and bringing them into exact alinement at the impression position. Said means consist of locking pins 57 and 58 (Fig. 6$^c$) guided in a block 59 formed on the interior of the drum. The type-wheel 45 has a slight rotary movement upon the shaft 42 and the ends of said pins 57 and 58 are made tapering where they engage the apertures or sockets 60, 61 in the type-wheel or disk. By this means the locking pins 57 or 58 when they are operated by the means hereinafter described and engage the sockets or apertures 60, 61, have a camming action and correctly cam the type-wheel or disk into position to bring the type on the type-carrier into exact alinement.

Locking pin 57 is the normal locking pin and is arranged to engage the single socket or aperture 60 in the type-carrier wheel to hold it so that the type-carrier will present a blank or non-printing portion to the impression point. This locking pin also alines lugs or splines 44$^x$ on the wheel with the lugs or splines 44 (see Fig. 6$^e$) on the drum 41 to permit the type-carrier to be shifted from the drum to the wheel or vice versa. This locking-pin 57 is operated by a toggle 62 pivoted by one of its links to the pin and its other link having a bearing on a rod or shaft 64 mounted in the drum 41. The knuckle of this toggle is connected with a rod 65, the other end of which is connected to one end of an arm 66 pivoted upon a stud 67$^a$ mounted in bracket 67 on the lower side of base-plate 1 (see Fig. 2). The other end of arm 66 carries at its free end a cam roll 68 which engages cam $d$ on the auxiliary cam shaft. Locking pin 58 has similar toggle connection 63 operated by connections 65$^a$ pivoted to free end of arm 65$^b$ which is fast to rock shaft 66$^c$ having bearings in bracket 479$^a$ fast to underside of base-plate. Pinned to other end of rock shaft 65$^c$ is an arm 65$^d$ having mounted on its free end cam roll 65$^e$ which engages cam 66$^f$ on main cam shaft. The locking pins 57, 58 have a further function, viz., accurately positioning type-carrier laterally to give the proper lateral impression position of the type. The action of the locking pins when actuated by their toggle connections is to thrust the wheel laterally or endwise of its shaft 42. An abutment 41$^x$ (see Fig. 6$^a$) is provided in the left section of drum 41 adjacent the wheel and directly opposite pins 57, 58. The thrust of the pins drives the wheel against the abutment and thus brings it into correct lateral position to accurately position the type laterally.

*The shift mechanism.*—The mechanism for shifting any one of the type-carriers into position on the wheel is as follows: Mounted in lugs 69$^x$ (Fig. 1) formed on the drum 41, are rock-shafts 69 (Fig. 6$^a$) shows the machine provided with three of these rock shafts. Pinned to each of these shafts is a toothed quadrant 70 which meshes with a toothed segment 71 on spider 55. A sleeve 72 (see Figs. 6$^c$ and 6$^d$) provided with a series of wedge-shaped blades 73 is mounted on each rock shaft and is free to slide thereon, but is caused to rock therewith by means of a spline and groove engagement 72$^a$. The blades 73 are so spaced as to enter one between each two adjacent type-carriers the outer blades in close proximity to the outer rims of the two end type-carriers. In normal position the thin edges of these blades are between the type-carriers so that there is no wedging or binding action. This permits the carrier which is on the wheel to revolve to present its type to the impression point without affecting any of the other carriers. When the spider 55 is rocked by its connection with the auxiliary cam shaft, as described, the shafts 69 are simultaneously rocked by means of their toothed quadrants engaging spider 55, and the thick portions of the wedge blades 73 are brought between the type-carriers. The carriers are thus wedged or held together preparatory to the shifting movement proper. When the shift movement has been made and the proper type-carrier has been shifted into position on the type wheel, the shafts 69 are again rocked to release the rings by bringing the thin edges of blades 73 between them. The shifting movement is executed as follows: A rod 78 extends through tubular shaft 42. The portion of this rod which is within drum 41 is provided with keys 79. These keys project through slots 80 in shaft 42. The keys 79 also enter annular recesses 122, 122 (Figs. 6 and 6$^g$) in the inner surfaces of the hub portions or sleeves of spider frames 123, 123, which are slidably mounted on the shaft 42, but which do not rotate therewith. By this arrangement longitudinal movement of the rod 78 imparts a like longitudinal movement to the spider frames 123. The arms of spider frames 123, 123, of which there are three to each frame, as shown in Fig. 6$^g$, project through slots 124 in the cylinder or drum 41 and embrace the sleeves 72 at each end. (See Figs. 6$^c$, 6$^d$). These sleeves are provided with the blades 73 above described for wedging the type-carriers together. By this means when the rod 78 is moved longitudinally the type-carriers are carried with it and a shift operation is performed.

The mechanism for moving the rod 78 lengthwise in either direction to bring the proper type-carrier into position is controlled by the "shift" perforations in the controller ribbon, and is as follows: The rod 78 is attached by any suitable means as a screw-threaded socket 81 (Figs. 1, 3 and 7) and locknut 82 to a rack-bar 83 sliding in guides 84 supported in a frame 85, 85 mounted upon the base-plate 1. Meshing with said rack-bar are a series of toothed quadrants 86 pivotally mounted upon a bracket 87 rising from the base-plate 1. The number of said quadrants corresponds to the number of type-carriers or shifts for which the machine is constructed. Each of the quadrants 86 is provided with a pin 88 and each of said pins is engaged by a corresponding cam-piece 89. Said cam-pieces 89 are mounted to move vertically and are guided in their movements by their upward extensions which pass through guides 90 in the frame 84. At their lower portions each of the cam-pieces 89 is secured to a vertically moving rod 91. Each of the rods 91 is provided with a piston 92 (Figs. 7ª and 8), moving in a cylinder 93, said cylinders being formed in a cylinder-block or casing 94 mounted in the base-plate 1 of the machine. A stop 95 is formed on each of the rods 91 to limit its upward movement, and a spring 92ª arranged between the upper cylinder head and the piston effects the return movement of said rods 91 with their cam-pieces. The pistons are operated by air pressure admitted at the lower ends of their cylinders, the particular piston and cam piece to be operated being selected by a shift perforation in the controller ribbon. The cam-pieces 89 are so shaped that the cam-surfaces 96 are operative upon the upward movement thereof. Said cam-surfaces are formed at their lower portions with a slot-shaped extension 97 so that when said cam pieces are thrown to the upper limit of their movement the pins 88 rest in said slot-portions 97, and the quadrants, and thereby the rack 83 and shift rod 78, are securely locked or held from movement in either direction. The pins 88 are so positioned upon each quadrant with respect to the central line thereof that the cam-faces will oscillate the quadrants and move the rack a distance in one direction or the other according to the particular cam-piece operated, corresponding to the movement required to shift from the type-carrier then in operation to the type-carrier having a face of type which corresponds to the shift perforation in the tape: For instance, the quadrant at the extreme left of Fig. 7 has its pin 88 arranged at the extreme distance to the right of the central lines of said quadrant, so that the cam-piece for this quadrant if actuated from the position shown in the drawing, will throw the rack to the extreme limit of its movement from right to left. This would carry the type-carrier on the extreme right into position upon the type-wheel. The second quadrant from the left of Fig. 7 has its pin arranged at a less distance to the right of its central line corresponding to the movement required by said quadrant to shift from one type-carrier to the adjacent type-carrier, so that if the second cam-piece from the left of Fig. 7 were operated from the position shown in said Fig. 7, the rack would be moved in the same direction as by the operation of the first cam-piece, but to an extent less by the distance from one type-carrier to the next. This would bring the second type-carrier from the right into operative position upon the type-wheel. The middle quadrant has its pin arranged upon its central line, so that movement of the corresponding cam-piece would, from the position shown in Fig. 7 move the rack in the same direction as the cam-piece to the left thereof but to a still less extent, bringing the third or middle type-carrier into position upon the type-wheel. The fourth quadrant from the left of Fig. 7 has its pin arranged to the left of the central line of the quadrant and the operation of the corresponding cam-piece would from the position of the parts in Fig. 7, move the rack a still less extent in the same direction bringing the fourth type-carrier into position upon the type-wheel. The fifth or end quadrant on the right of Fig. 7 has its pin arranged to the extreme left of the central line of the quadrant and in the position shown in Fig. 7 the movement of the corresponding cam-piece would not affect the position of this quadrant or the rack, the parts in the position shown in this view being such that the end type-carrier at the left is in position upon the type-wheel.

From the above it will be seen that no matter which type-carrier is in position upon the type-disk or wheel the movement of any of the cam-pieces caused by the corresponding shift perforation in the tape coming into operative position would throw the rack and the rod the proper distance to bring the type carrier having the type corresponding to said shift perforation directly and immediately into position upon the type-disk or wheel.

The cam pieces are operated by fluid pressure acting on pistons 92 to which the cam pieces are connected by rods 91. These pistons work in cylinders 93 formed in a block or casing 94 suitably supported in base plate 1. Each of cylinders 93 is provided with an admission port 93ª connecting each cylinder with a channel or passage 100 Fig. 8ᵇ which passes below all the cylinders. A connection 101 leads from the passage 100 to the reservoir R. (See Fig. 16.) Pressure is thus supplied to the cylinders 93 for actuating the pistons 92 and the cam pieces.

The particular piston and cam piece to be operated, and the "shift" to be performed thereby, is determined by the particular "shift" designated on the controller ribbon. When a "shift" perforation comes into position in the ribbon clamp 125ª, 132 hereinafter described, and this clamp has operated to open the passages 127 the pressure fluid passes through the perforations in the ribbon to the "shift" connection 127ª which is uncovered by the "shift" perforation then in position. From this connection the pressure fluid passes to a valve connection 99 (Figs. 7ª, 8, 8ª and 16), where it operates a corresponding valve 98 which controls the passage of the pressure fluid to a cylinder 93. The valve 98 is arranged beneath each cylinder 93 and each of these valves is provided with a spring 102 acting to keep the valve normally closed.

When a valve 98 is operated as described the port 93ᶜ in the corresponding cylinder 93 is opened and the piston 92 therein is driven upward by the pressure coming from the reservoir through connection 101 and channel 100. The corresponding cam piece 89 is thus moved upwardly and makes the designated shift through the quadrant and rack mechanism described. Stops 95 formed on the piston rods 91 prevent the pistons from being driven too high, these stops being arranged so they will strike the upper cylinder head when the pins 88 on the toothed quadrants 86 are seated in the straight portions 97 of the cam pieces in which position a complete "shift" is made.

In order to insure a complete shift of the type-carrier already in position from the type-wheel on to the drum, and the complete shift of a new type-carrier from the drum on to the wheel, a safety stop mechanism is provided. This safety stop mechanism acts on the auxiliary cam shaft which operates the normal locking pin 57, the radial locking bolts 46, the wedge shaped blades 73 and the raising and lowering of ink rolls, and arrests its movement at a point in its rotation before it can effect the return to normal positions of these mechanisms. To this end a disk 118 is secured fast upon the auxiliary cam shaft shown in dotted lines in Fig. 7ª and in full lines in Figs. 1, 3, 8ᶜ, 8ᵈ and 8ᵉ. This disk is provided with a stop tooth 118ˣ in such a position with relation to a stop lever 119 pivotally mounted upon the frame of the machine that it will be engaged by the stop lever and the auxiliary cam shaft arrested at a point after the cams on this cam shaft which operate ink roll frame, the locking pin, the locking bolts and wedge shaped blades above referred to have acted, but before the said mechanisms have been returned to normal positions. The position of tooth 118ˣ as shown in Fig. 7ª represents its normal or initial position. Fig. 8ᶜ shows the tooth 118ˣ moved slightly from initial position and stop lever 119 in position to engage said tooth. Fig. 8ᶜ shows said tooth engaged by the stop lever and arrested and Fig. 8ᵈ shows the stop tooth after being released from the stop lever and continuing its rotation. The auxiliary cam shaft also operates the ribbon clamp, the cam for accomplishing which is so positioned as to keep the ribbon clamped and the channels 127 open during the movement of the tooth 118ˣ from initial position to the position where it is engaged by the stop lever 119. The fluid pressure is thus kept acting upon a valve 98 and the corresponding cylinder port 93ª is thus kept open and the corresponding piston 92 is held up by the pressure admitted through said port until the stop mechanism is released in the manner hereinafter described.

Stop lever 119 is thrown into position so that its lower end will engage stop 118ˣ by the following mechanism: A rod 110 is pivoted at one end to the upper end of stop lever 119 and at its other end to an arm 112 loosely mounted on a rock shaft 113, journaled in arms 114 secured upon the lower portion of the cylinder casing or frame 94. A collar 112ᵇ secured upon the rock shaft 113 holds the arm 112 in position longitudinally of the rock shaft. An arm 112ˣ is pinned fast to the rock shaft 113 adjacent the arm 112 and is provided with a laterally projected stop pin 112ª which extends in front of arm 112. A spring 112ᶜ is arranged on the shaft 113 one end of which bears upon the arm 112ˣ and the other end bearing upon the arm 112, the action of this spring keeps arm 112 in contact with the stop pin 112ª of arm 112ˣ. At each end of the rock shaft 113 is pinned an arm 115, these arms carry a bail rod 116 in their upper ends in position to be engaged by the stems of valves 98. A spring 113ˢ surrounds the rock shaft 113 and is fast thereto at one of its ends and with its other end bears upon one of the arms or supports 114; this spring tends to keep the arm 115 against stop 114ª on one of the brackets or supports 114. When the arm 115 is against the stop 114ª the bail rod 116 is in position to be struck by the stem of any of the valves 98 when the latter are actuated in the manner before described. The first movement of any of the valves 98 closes an exhaust port 92ᵇ in the cylinders 93. This movement brings the valve stem against the bail rod 116, a sufficient clearance between the end of the valve stem and the bail rod being provided as seen in Fig. 7ª to permit of the closing of the exhaust port 92ᵇ before the valve stem engages the bail rod. The further movement of the valve carries the bail rod with it, rocks shaft 113 against spring 113ˢ and tends to move arm 112ˣ and its stop 112ª away from arm 112; but this last named arm follows arm 112ˣ by the action of spring 112ᶜ and rocks the stop-lever 119 from its position indicated in dotted lines, Fig. 7ª into the position shown in Fig. 8ᶜ to engage the tooth 118ˣ and arrest the auxiliary cam shaft.

A valve 98 being held open, and the parts being in the position as described, a piston 92 is driven upwardly against its spring 92ª until it clears a port 103 in the side of the cylinders 93. These ports are so arranged that when cleared by the pistons 92 the stop collars 95 will arrest further movement of the pistons, and also the cam pieces 89 will have been moved upwardly so that the studs 88 on the toothed quadrants 86 will be in the straight parts 97 of the cam pieces, thus insuring a full and complete shift movement. Since the stop lever 119 is thrown in by the movement of a valve 98, the auxiliary cam shaft is prevented from rotating past the point where, among other operations, it would shut off the pressure coming through a "shift" perforation by releasing the ribbon clamp and closing the clamp passages 127. Pressure thus being maintained upon valve 98, the port 93$^a$ is kept open maintaining pressure in cylinder 93 until piston 92 clears port 103. When one of these ports has been cleared by piston 92 a stop-release mechanism is operated as follows: Ports 103 communicate with corresponding lateral cylinders 104$^a$ having spring seated pistons 104 therein. The stems of these pistons are arranged to strike a bail rod 105 carried by arms 106 mounted fast on a rock shaft 108 carried in bearing plates 107, 107 secured to cylinder block or casing 94. A spring 108$^s$ is fastened by one end to the rock shaft and with its other end bears against one of bearing plates 107. This spring tends to keep arm 106 against a stop 107$^b$ on plate 107 in which position a slight clearance is preserved between bail rod 105 and pistons 104. Mounted fast on rock-shaft 108 is an arm 109 provided with a forked end which bestrides rod 110, in position to engage a collar 111 thereon. This stop-release mechanism acts as follows: As soon as a port 103 is cleared, piston 104 is actuated and through bail rod 105, rock shaft 108 rocks arm 109 which strikes collar 111 and throws out stop lever 119 from its locking position seen in Fig. 8$^c$ to normal position seen in Fig. 8$^d$, thus permitting the auxiliary cam shaft to complete its rotation. It will be noted that arm 109 moves rod 110 and arm 112 against the action of spring 112$^e$. Arm 112$^x$ follows the movement of arm 112 and bail rod 116 returns valve 98 to close port 93 and open exhaust port 92$^b$ as soon as the auxiliary cam shaft has rotated to carry the stop tooth 118$^x$ past the stop lever (see Fig. 8$^d$) the ribbon clamp is closed and pressure is shut off from valves 98; and thus bail rod 116 does not have to return these valves against the fluid pressure. It will be noted that cylinders 93 are provided with upper exhaust ports 92$^a$, and lower exhaust ports 92$^b$; and that cylinders 104$^a$ have exhaust ports 104$^z$ leading to the atmosphere.

The above safety stop device does not actually arrest the auxiliary cam-shaft when the machine is operating properly, the stop lever 119 being returned to normal position before being engaged by the tooth 118$^x$. In case of defective operation the stop device arrests the cam shaft as described, until the shift and other operations hereinafter described have been perfected.

*Character selecting mechanism.*—At the same time a shift is made and a type-carrier is positioned and locked upon the type wheel, the character selecting mechanism operates. The controller ribbon passes between a clamping device comprising a stationary block or plate 125 and a movable clamp member 132. (See Figs. 2, 4 and 9). The stationary plate or member 125 is supported in frames 16, 16$^a$, and the movable member 132 slides on guides or flanges 132$^x$ formed on frames 16, 16$^a$. A stationary adjustable bar 138 is also supported on flanges 132$^x$ and is connected to the movable clamp member 132 by toggles 137. A tie rod 139 connects the toggles 137 by their knuckle joints and this tie rod is connected in turn to a piston 141 (Fig. 9$^a$) by a connecting rod 140. This piston works in a cylinder 142 mounted in frame 16$^a$. A spring 142$^s$ acts normally upon the piston 141 to keep the toggles flexed, as shown in Figs. 9$^a$ and 9, and the clamp member 132 away from the member 125. (See Fig. 4). Cylinder 142 is connected to the source of pressure supply or reservoir R (see Fig. 16) by a connection 143. The admission of pressure to cylinder 142 is controlled by a valve 144 which is operated by a cam $c$ on the auxiliary cam shaft through a lever 145 pivoted at 146, the rear end of which is engaged by the cam and the front end of which is pivotally connected to a rod 144$^a$ connected with valve 144. (See Fig. 4).

Slidably mounted upon the movable clamp member 132 is a bar 126, the ends of which work in guides formed by cap plates 131. The bar 126 has spring connection with movable clamp member 132, the springs 133 being held in position by means of pins 134, 134 on the bar 126 and corresponding pins 135, 135 on member 132. The action of the springs tends to keep bar 126 projected beyond member 132 as shown in Fig. 4, the amount of projection being limited by means of pin and slot connection 134$^a$, 135$^a$ between the bar 126 and member 132. The movement allowed by the pin and slot connections is sufficient to break registry between a connection 128 for fluid pressure in member 132 and a channel 132$^a$ formed in bar 126. (See Figs. 4 and 4$^b$). In bar 126 are formed a series of ports 127 which lead from the channel 132$^a$. These ports are spaced apart to correspond to and register with a series of ports and channels 127$^a$ formed in block or plate 125 the stationary clamp member. The ports and passages 127 and 127$^a$ also register with the character, space, shift, line and other perforations formed in the controller ribbon or tape. Where a perforation in the ribbon registers with a port 127, 127ᵃ and the ribbon is clamped between the clamp members by the action of the toggles 137, 137 as described, communication is established between the pressure reservoir R and corresponding selecting mechanisms (hereinafter explained) through connection 128 channel 132ᵃ, port 127, the perforation in the ribbon, channels 127ᵃ. Where a blank in the ribbon comes opposite any of the ports 127, 127ᵃ these ports and passages are closed—the ribbon thus acting as a valve to open or close the ports and channels and select the character, space, shift or other function designated by the perforations in the ribbon.

It will be noted that the action of toggles 137 thrusts clamp member 132 toward member 125ᵃ. Bar 126 first comes in contact with the ribbon between the clamp members, and on further movement of clamp member 132, bar 126 yields by reason of spring connections 133. When clamp member 132 has moved far enough to securely clamp the ribbon bar 126 will have been pressed back to bring channel 132ᵃ into registry with connection 128 and air or other pressure fluid can pass through to operate the several mechanisms designated by the perforations on that transverse line of the ribbon between the clamp members. On return of clamp member 132, the first action is to shut off the air pressure by the breaking of registry between connection 128 and the ports 127, the pin and slot connections 134ᵃ and 135ᵃ then withdraw bar 126 to permit of sufficient clearance to allow the ribbon to be fed forward for the next transverse line of perforations when the operations are repeated. Of the ports 127, 127ᵃ the first five, designated 127ˢ, lead to the connections 99 to operate valves 98 for controlling the "shift" operations as above described. The sixth, marked 127ᴸ, leads to a connection 120 where it operates a valve and controls mechanism to execute a "line" movement by causing the carriage carrying the impression-receiving material to return for the commencement of a new line of impressions as will be presently explained.

The channels 127ᵃ may be either individually separate conduits or may be conveniently formed, as shown in the drawings by channels cut in block or plate 125, some being arranged on the upper side and some on the lower side in order to provide space for them. These channels are inclosed by upper and lower plates 125ᵇ and 125ᵃ respectively, the joints between these plates and block 125 being tight fitting in all parts to prevent leakage of the air or other pressure fluid across from one channel to the next. Packing may be interposed between the plates if desired to insure against leakage. With the exception of the first six at the left of the series, these channels 127ᵃ are led to a corresponding series of small cylinders 129ˣ formed in a plate 148 secured on the end of drum 41. These cylinders 129ˣ are arranged in a circle concentric with the drum and have mounted therein stop pins 129. One end of these stop pins forms a piston, which works in its cylinder 129ˣ, whereas the other end forms a stem. The piston portions of these stop pins work friction tight in their cylinders and their rear edges are chamfered off to allow admission of air behind them when in retracted position. (See lower part of Fig. 6). The throw of these stop pins is such that when moved forward by fluid pressure, their stem portions protrude in the path of an arm 151 rotating with the type-wheel shaft 42 to arrest the type-wheel in position that the type-carrier thereon will present a character or space corresponding to the protruded stop-pin to the impression point. An outer circular plate 148ˣ is secured on plate 148 to form a sort of stuffing box for the pins 129. In normal position the ends of the pins are flush with the face of plate 148ˣ.

In order to accommodate all the air channels 127ᵃ, plates 147, 147, 147 are provided, in the faces of which the extensions of channels 127ᵃ are cut and the plates are secured one upon the other and secured upon the end of drum 41, being supported by a central projecting portion 41ᵃ as shown in Fig. 6. The general arrangement of the channels 127ᶜ is shown diagrammatically in Fig. 16, wherein it will be seen that each passage 127ᵃ connects with a stop-pin cylinder 129ˣ and that each stop-pin cylinder except one is so connected. This exception is the "normal" stop pin 129ᵃ, the purpose of which will be explained.

The mechanism by which the stop pins arrest the type carrier, and the means for restoring the stop pins are as follows: Mounted fast upon the shaft 42 so as to rotate therewith (upon which shaft also the type-wheel 45 is mounted) is an arm 150. (See Figs. 4ᵃ and 6). Adjacent said arm and mounted loosely upon said shaft 42 is an arm 151. Each of said arms is provided with a tail 150ᵃ and 151ᵃ respectively. In arm 151 is mounted a pin 151ᵇ against which spring 153 fast to arm 150 acts, tending to keep a pin 154 fast in tail 151 in close contact with tail 150ᵃ of the arm 150. The tails of the two arms are kept together by these means and thus their other ends are maintained a definite distance apart. The arms 150, 151 travel in unison, the arm 150 being fast on shaft 42 as above described, and the arm 151 being maintained in contact with said arm 150 by means of the pin 154 and spring 153. One of the stop-pins 129, indicated at 129ᵃ in the Fig. 9 is the "normal" stop-pin and is held in projected position by means of a spring 155, (see Fig. 4ᵈ), it being understood that this normal stop-pin is not controlled by the fluid pressure or by the perforations in the controller-tape. This pin determines the normal position of the type-wheel and the type-carrier thereon in which position a blank space on the type-carrier is presented to the impression point. A pin restoring arm 156 having a sleeved hub-portion 157 is mounted upon the hub portion 158 of arm 151, having a bearing on shaft 42, said pin-restoring arm 156 being slidable on the sleeve 158 and having connection with the arm 151 by means of a pin 152 slidably mounted in tail 156ᵃ of said arm 156 and fast in the tail 151ᵃ of arm 151, so that said pin-restoring arm rotates in unison with the arm 151. At its extremity said arm 156 is provided with a pin-restorer 159 which is adapted to engage with the stop-pins 129 and 129ᵃ. A collar 160 is formed on the hub of the pin restoring arm 156 and by means of a yoke connection hereafter described, said pin-restoring arm is moved toward and withdrawn from the pins 129 and 129ᵃ so that its pin-restorer depresses said stop-pins 129 and 129ᵃ and allows the arm 151 to pass as it is carried around by the rotation of shaft 42.

Mounted on arm 150 is a small bell crank 161 (see Fig. 4ᵇ and 4ᶜ) which carries in one of its arms a slidably mounted contact pin 162 in position to make contact with any of a series of pins 163 mounted within a central depression or recess of plate 149. (See Fig. 6.) These pins are arranged in a circle concentric with the stop-pins 129 and 129ᵃ. Contact pin 162 is provided with a head against which presses a spring 162ˢ tending normally to keep pin 162 depressed but permitting it to yield on making contact with any pin 163. Bearing against the other arm of the bell crank is a pin 161ˣ slidably mounted in arm 150. This pin 161ˣ is arranged in position to engage a screw stud 164 (Fig. 4ᵃ) threaded in arm 151. A spring 165 bears against this arm of the bell-crank and keeps it normally in the position shown in Fig. 4ᵇ with contact-pin 162 away from pins 163. When in the rotation of shaft 42, arm 151 brings up against a projected stop-pin and its movement arrested, arm 150 continues its movement (by reason of its spring connection with arm 151) and the pin 161ˣ rocks the bell-crank 161 to the position shown in Fig. 4ᶜ in which contact is made between contact-pin 162 and a pin 163. The pins 163 project from a broken ring 166 which is mounted in the recessed portion of plate 149 and insulated therefrom by insulating material 167, said broken ring being thus insulated from the machine. At the break in the ring is a piece 168 having one contact pin projecting therefrom, said piece being insulated both from the machine and from the broken ring 166. The broken ring with the contact pins thereon forms part of an electrical circuit in which is included a source of electrical energy 169 and an electro-magnet 170 (Fig. 16). The electro-magnet 170 (see Figs. 2 and 10) controls the main cam-shaft 171 as hereinafter described. The insulated contact-piece 168 is connected in the electrical circuit including a source of electrical energy 172 and the electro-magnet 35 (see Figs. 5 and 16) which controls the feed of the controller tape or ribbon and the escapement of auxiliary cam-shaft 38. Said contact-piece 168 is in a position with relation to the normal stop-pin 129ᵃ so that the electrical circuit including the electro-magnet 35 is closed upon the arm 151 bringing up against the normal stop-pin 129ᵃ. Since the pins 163 all project from the same ring-piece 166 they are all part of the same electrical circuit, and the same results would follow if the pins 163 were omitted and ring-piece 166 were a plain strip. Pin 162 would then contact with the ring-piece 166 itself. Similarly the pin on piece 168 may be omitted.

The pin restoring arm 156 is actuated by means of a pivoted lever 173 (see Figs. 2, 3 and 4) mounted upon a pivot 174 on the frame of the machine. At its upper end said lever 173 is provided with a yoke 175 embracing the collar 160 on the hub 157 of the pin-restoring arm. The lower end of said lever 173 extends through the base-plate 1 of the machine and contacts with pivoted arms 176 and 177, said pivoted arms having connection respectively with the auxiliary cam-shaft 38 and the main-cam shaft 171. Pivoted lever 176 has connection at its other end with a connecting rod 178 (see Figs. 2 and 3ᵃ,) connecting with an arm 179 fast on the rock-shaft 180 mounted in bearings on frame 16ᵃ to the lower end of which is fast an arm 181 having on the end thereof a cam-roll 182 in engagement with the cam surface of cam a on the auxiliary cam-shaft. This cam through the connections above described, operates the pin-restoring arm 151 when the same is arrested by the normal stop-pin. When thus arrested contact is made through the bell-crank 161 with the contact-piece 168 causing the electro-magnet 35 to be energized by the closing of the circuit and through the mechanism hereinbefore described operating the controller ribbon feed. The pins 163 in the broken ring 166, as before stated when contact is made with bell-crank 161 closes the circuit of the electro-magnet 170 and thereby control the movement of the main cam-shaft 171. The character stop-pins 129 are returned by the pin-restorer through the medium of the arm 177, this arm being mounted upon a rock-shaft 183, on the lower end of which is fast an arm 184 bearing at its extremity a cam roll 185 which engages the cam face of the cam 186 on the main cam shaft 171. (See Fig. 2.) When the arm 151 is arrested by any of the character stop-pins 129 and contact is made by the bell-crank 161 with any of the contact pins 163, the circuit through electro-magnet 170 is closed. This magnet controls a clutch hereinafter described, which clutches the main cam-shaft 171 with the counter-shaft 187 which is in turn connected by gears 188 and 189 to the main driving shaft 23. Said clutch referred to is clearly shown in Figs. 2, 10, 10$^a$, 10$^b$ and 10$^c$ of the drawings.

To the armature 191 of the electro-magnet is connected a lever 192 pivoted in a bracket 193 projecting from the lower side of the base-plate 1. A spring 194 tends normally to keep the armature 191 away from the magnet 170 when the said magnet is not excited. The free end of arm 192 engages a spring-bolt 195 mounted in bearings in plate 1 of the machine, and the tendency of spring 195$^a$ is to maintain said bolt 195 in the depressed position so that it stands in the path of a finger 196 forming part of the clutch 197. The clutch 197, as before explained, connects the main cam-shaft 171 with the counter-shaft 187. The construction of this clutch is as follows: To the end of counter-shaft 187 is secured fast a flange member 198 and to the adjacent end of the main cam-shaft 171 is secured a similar flange member 199. These flange members together form a casing for receiving the clutch mechanism itself. The clutch mechanism consists of the finger 196 having its inner end mounted in a bearing 200 forming part of the flange member 199, the lower end of this finger 196 being rounded to form a smooth bearing on the part 200 to allow of free oscillation. The bearing 200 is eccentrically mounted with respect to the shaft 171 and flange member 199. On a shoulder-portion 201 of the finger 196 is carried a block-piece 202, the outer edge of which is scored or serrated and its curvature conforms to the inner periphery of the flange member 198. A spring 203, one end of which is secured to the stud on the inside of flange member 198 bears with its other end against the side of the finger 196 tending to urge it and the block 202 mounted thereon into contact with the inner periphery of the flange 198. The outer portion of the finger 196 projects through a slot 204 in the rim of flange member 199. The operation of said clutch-mechanism is as follows: Normally the bolt 195 is in depressed position and stands in the path of finger 196, thereby pressing the same against the action of the spring 203 in the position shown in Fig. 10$^b$. Owing to its eccentric pivoting the finger 196 when thus pressed back against the action of its spring keeps the block 202 mounted thereon out of contact with the inner periphery of flange member 198. This permits independent rotation of shaft 187. As soon as electro-magnet 170 becomes energized by the arresting of the arm 151 against a stop-pin and closing of the circuit through contact pin 162 on the bell-crank lever 161 and the contact pin 163 on the broken ring, the armature 191 of said magnet is pulled toward said magnet, thereby raising the bolt 195 against the action of its spring 195$^a$ out of the path of the finger 196, thus permitting spring 203 to urge said finger, and the block 202 carried thereby, into contact with the inner periphery of flange member 198. The rotation of the shaft 187 and its flange member 198 is in the direction shown by the arrow and by the rotation of this counter-shaft the grip between the block 202 and flange member 198 is increased the finger 196 acting in the manner of a toggle. Thus an absolute clutch tightening with the strain put upon it, is obtained between shafts 187 and 171. As soon as stop-pin is restored by cam on main cam-shaft arm 151 steps ahead of arm 150 (because of spring connection) a distance limited by pin 154 as before stated, this partial rotation being sufficient to allow bell-crank 161 and its contact pin 162 to raise and break. The circuit of the electro-magnet 170 at the contacts 162 and 163 and the spring 194 immediately returns the bolt 195, (its action being assisted by the spring 195$^a$) into the path of the projecting end of the finger 196, thereby owing to the rotation of the shafts withdrawing the block 202 out of engagement with the flange member 198 and disconnecting or unclutching the main cam-shaft 171 from the counter-shaft 187. The face of bolt 195 which comes in contact with the finger 196 is provided with a spring 195$^b$ which acts as a cushion between the finger and the bolt when they come into contact. To retain cam shaft in its arrested position arm 171$^a$ pivotally mounted to a bracket 171$^b$ on underside of base-plate acts against tooth 171$^c$ fast on cam shaft, said arm being cammed out of its path by tooth just before end of cam-shaft rotation. Spring 171$^d$ acting against arm 171$^a$ causes said arm to engage radial side of said tooth after its passage and prevents a back rotation or re-bound of cam-shaft. It is understood that tooth 171$^c$ is so positioned in relation to retaining face of arm 171$^a$ when cam-shaft is in its normal position that the arm acts as a retaining pawl for the same.

The action of the stop-pins to arrest the movement of the type-wheel and the action of the pin-restorer will now be described: Starting from the normal position in which the arm 151 is arrested by the normal stop-pin 129ª contact is made with the insulated contact-piece 168. This closes the circuit of electro-magnet 35 and controls the escapement wheel governing the controller tape feed-mechanism and releasing the auxiliary cam-shaft. This cam-shaft, starting to rotate under the influence of the main driving shaft 23 through the train of gears connecting it with that shaft as described, operates the pin-restorer through the connections before described and the normal stop-pin is depressed, whereupon the spring connection between arms 150 and 151 urges arm 151 over the normal stop-pin and retains it in depressed position. The type-wheel is not released at this point being held by the normal lock-pin 57. This lock-pin is operated, as above described, by toggles having engagement with the auxiliary cam-shaft and said lock-pin is not withdrawn from the type-wheel until the auxiliary cam-shaft has about completed its rotation and all the operations governed by it have been performed. By the operation of the electro-magnet 35 the feed mechanism for the controller tape has been actuated as above described, and a new line of perforations is brought into position in the valve-clamp. When the auxiliary cam-shaft has about completed its revolution the lock-pin 57 is withdrawn and the type-wheel is free to rotate. In the meantime, the stop-pins corresponding to the characters, spaces, etc., have been projected by the action of the air pressure through the channels above described, and the arms 150 and 151 step forward to the first projected stop-pin; whereupon the type-wheel is arrested, the circuit through magnet 170 is closed and the main cam-shaft is clutched (through the clutch-mechanism above described and the counter-shaft) to the main driving shaft. The character lock-pin 58 is projected and accurately positions the type-wheel to present the type in absolute alining position to the impression point. The carriage mechanism for impressing characters and for carrying the impression-receiving material (hereinafter described), is actuated through the medium of the main cam-shaft and carriage is fed past the impression point a distance equivalent to the unit value of the character just impressed. As soon as the electrical contact between the contact pins 163 and the bell-crank 161 has been broken by the restoring of the projected stop-pin and the stepping forward of the arms 150, 151, the electrical circuit of the electro-magnet 170 is broken and the bolt 195 is projected into the path of the clutch-finger 196 and the main cam-shaft 171 is arrested.

The type-wheel shaft 42 is not driven directly from the main driving shaft 23 but is driven by means of a spring 205 (see Figs. 9ᵇ and 9ᶜ) mounted in a spring-case 206. This spring is automatically wound at each revolution of the type-wheel shaft. The spring and spring-case are mounted upon the type-wheel shaft 42. The spring-case 206 is formed with a sheave 208 arranged to have connection by means of a belt 209 with a friction pulley 23ᵃ mounted on the main driving shaft 23. The friction pulley 23ᵃ (see Fig. 14ª) consists of disk 23ˣ fast on shaft 23 and having sleeved portion 23ᵘ upon which sheave 23ᵃ is loosely mounted, said sleeve also carrying disk 23ʸ. Pins 23ʳ fast in sleeved portion of 23ʸ act as keys to make disks 23ˣ and 23ʸ rotate together. Thus sheave 23ᵃ and disk 23ʸ are capable of motion along axis of sleeve 23ˣ. Between each disk 23ˣ, 23ʸ and sheave 23ᵃ a material such as felt or billiard cloth acts to create friction. Loosely mounted on shaft 23 and abutting against hub of disk 23ʸ is washer 23ᵛ, spring 23ˢ acting against said washer and collar 23ᵗ fast on shaft 23 tends to thrust disk 23ʸ toward disk 23ˣ thus pressing friction material 23ᶻ against the sides of sheave 23ᵃ. The spring-case 206 is loosely mounted upon a bushing 211 (see Fig. 9ᶜ) held in a bracket 207ª secured on base-plate 1, the bushing forming a bearing for the shaft 42. One end of the spring 205 is secured to the inner periphery of said spring-case 206 by a pin 212 and the other end of said spring is secured to the shaft 42 by a pin 213.

In the hub-portion of the spring-case 206 is mounted a pin 214 in position to engage a spring-bolt 215 (see Figs. 9ᵇ and 9ᵈ) mounted in a bracket 216 on the base-plate 1. Pivotally mounted upon said bracket 216 is an arm 217 one end of which is connected to the stem 218 of a spring piston 219 mounted in a cylinder 220 on the lower side of base-plate 1. Piston 219 is actuated by the fluid pressure as hereinafter described. The other end of said arm 217 is provided with a jointed finger 221 kept in position by spring 221ª and having a lug 222 bearing against the upper edge of lever 217 and preventing movement of said finger in an upward direction. The finger 221 is in position to strike a lug 223 projecting laterally from one side of the bolt 215. On rod 218 being actuated finger 221 strikes lug 223 and depresses bolt 215 against the action of its spring. Finger 221 then immediately slips off lug 223 and bolt 215 then returns to normal position in the path of pin 214 and arrests it, thereby preventing the spring-case from making more than one revolution. In the return of arm 217 to normal position the finger 221 will strike against the under side of lug 223, the finger yielding against the action of its spring until it has passed the lug when it resumes its normal position, lug 222 thereon bringing up against lever 217.

When either lock-pin 57 or 58 is withdrawn from the type-wheel allowing the type-wheel shaft to rotate under the influence of spring 205, an arm 439 (see Figs. 1 and 9ᵇ) mounted fast upon shaft 42 comes into engagement with an arm 225 fast on one end of a spring mounted rock shaft 226 having bearings on top of plate 1. On the other end of rock-shaft 226 is a downwardly projecting arm 227 pivotally connected to a valve 228 mounted on the lower side of base-plate 1. This valve is shown in detail in Fig. 9ᵃ. A connection 229 leading to the valve connects with the fluid pressure supply, and a connection 230 on the opposite side of the valve leads, as shown in Fig. 9ᵇ, to piston 219. The arm 439 is so positioned that it strikes arm 225 on the last portion of the rotation of shaft 42. Arm 225 operates valve 228 and admits fluid pressure to piston 219. The piston is actuated and bolt 215 is withdrawn releasing the spring-case, as described. The spring-case is driven by its belt connection 209 with friction pulley 23ᵃ and the spring 205 is re-wound in readiness for the next actuation of the type-wheel. Valve 228 is cut away, as shown at 228ᵃ (see Fig. 9ᵃ) on the exhaust side to prevent back pressure in the valve chamber.

*The carriage for the impression receiving material.*—A carriage is provided for carrying the impression-receiving-material which receives the impressions from the type on the type-carriers. This carriage is moved progressively past the impression point by means of fluid pressure and is guided in its movements upon a rod 231 mounted in brackets 232 upon plate 1 of the machine. (See Figs. 1, 4 and 5ᵃ). Ears 233 forming part of the carriage frame are threaded on the rod 231. The forward part of the carriage is supported by a rod 234 on which run rollers 235, 235 mounted in bearings on the frame of the carriage. In the lower side of the carriage frame is provided a rack 236 adapted to engage a pinion 237 (see Figs. 4, 5ᵃ and 12) on a shaft 238 mounted in brackets on the top of plate 1. The carriage is, as above stated, driven by air pressure admitted to an air cylinder 239 (see Figs. 1 and 4ᵉ) mounted upon the top of plate 1. In said cylinder moves a piston 240 (see Fig. 4ᵉ) the rod 241 of which is attached at its outer end to lug 257 on the frame of the carriage. Air from the main supply is admitted to this cylinder through a connection 242, the supply being controlled by a valve 243 which controls the admission of the pressure to one or other side of the piston 240. The passages through which the fluid pressure is admitted to one or other side of the piston 240 are shown at 244 and 245 (see Fig. 4ᵉ). The normal position of the carriage is at its limit of movement toward the right and the air is normally admitted through the passages 244, 244ᵃ to the right side of the piston 240 to drive the carriage in a direction to print a line of impressions. Valve 243 is normally held by spring 243ᵃ, so the carriage is driven in this direction.

The carriage is fed by fluid pressure acting on piston 240 step by step at distance equal to the unit value of each character and space after each impression and the machine continues to print until a line hole appears in the ribbon. This hole occupies the first position in order of sequence in the line of perforations. (See Fig. 17). The line hole is preferably given a different shape or outline from the other perforations in order that it may be readily identified and the line divisions readily seen on the ribbon. Thus, the "line" hole is shown on the drawings as square, the others being circular. Any desired shape may be used for the "line" holes whereby they may be identified. With the line hole always occurs a "space" hole. This "space" hole in the ribbon causes the "space"-pin to be set and allows the carriage to feed ahead to first impression position in the line. In its extreme position at the right of its travel the feeding mechanism for feeding the impression-receiving material to bring a new line into position to receive the new line of impressions is actuated. This feeding mechanism is hereinafter described. The "line" hole being in position the air passes through duct 127¹ (see Fig. 9) to a piston 120 in the shift-cylinder casing 94, said piston being situated alongside the shift valves 98 before described. (See Figs. 7, 8, 8ᵃ). Piston 120 is actuated by the pressure coming through the "line" hole against the action of its spring 120ˢ and its stem strikes and rocks a bell-crank 121 pivotally mounted at 121ˣ upon the lower side of base-plate 1. (See Figs. 2 and 8). This bell-crank has pivotal connection with an arm 121ᵃ (see Figs. 1 and 4) mounted on a rock-shaft 121ᵇ passing upwardly through the base-plate and carrying an arm 121ᶜ at its upper end. This arm has pivotal connection with valve 243 (see Fig. 4ᵉ) above mentioned, which controls the direction of pressure admitted to the piston 240 which drives the carriage.

The movement communicated to valve 243 by the above described mechanism is against the action of its spring and admits pressure from the supply R through passages 245, 245ᵃ to the other side of the piston causing it to return the carriage to initial or starting position for a new line of print.

Exhaust ports 244ˣ and 245ˣ are provided connecting passages 244 and 245 respectively with the atmosphere. The valve 243 is so formed and these ports are so arranged that when this valve is thrown in either of its positions to admit pressure to drive or return the carriage the air or other pressure fluid in front of piston 240 will quickly exhaust through one or other of these exhaust ports. Reverting to the safety device before described in connection with the shift mechanism (see Fig. 8ª), it will be seen that the arm of this bell-crank which is struck by stem of piston 120 is arranged between said stem and bail rod 113, so that when the bell-crank is operated, it strikes the bail rod and throws in stop lever 119 to arrest auxiliary cam shaft by means of tooth 118ˣ on disk 118. This prevents the cam shaft from completing its rotation before the carriage has been fully returned to starting position, the lock being held in position until released by carriage.

Mounted in bearings on bracket 232 (see Figs. 1, 2, 3 and 14) at right side of machine is a rock shaft 247 having fast to its upper end arm 246 whose free end is in path of an adjustable stud 233ª fast on right side of carriage frame. On the lower end of said rock-shaft is fast an arm 248 having pivotally mounted to its free end a connecting rod 249 extending below the base-plate and having connection with an arm 250. This arm 250 is pivotally mounted on stud 250ª and has a pin and slot connection with arm 250ˣ of a bell-crank pivotally mounted on stud 250ʸ. The other arm 250ᶻ of bell-crank is in position to engage extension of bail rod 105 hereinbefore mentioned. When carriage on its return almost reaches its normal position, stud 233ª strikes the arm 246, rocking shaft 247, and through connections, causes arm 109 (Figs. 7 and 8ᶜ) to strike collar 111 of rod 110, thus releasing tooth 118ˣ as shown in Fig. 8ᵈ. The further revolution of auxiliary cam shaft shuts off supply of fluid pressure to piston 120 and spring 243ª reverses valve and allows fluid pressure to act on piston 240 to cause the carriage to advance for next impressions. Means are also provided for locking the carriage in normal or starting position. Mounted in bracket 610 on base-plate (Figs. 1, 4, 12 and 12ʰ) is a rock-shaft 611 having fast to its lower end an arm 612. On the front face of ratchet wheel 373 is a lug 613 so arranged as to be in path of arms 612 when said arm is in position shown in Fig. 12ʰ. Fast to upper end of rock shaft 611 is an arm 615 which carries at its free end an adjustable stud 616, said stud being positioned to coöperate with lug 233ᵇ, on left end of carriage. When carriage is traveling after each impression arm 612 under the impulse of its spring 614 is held out of the path of lug 613 and so remains until "line" mark in tape causes carriage to reverse and almost reaches its starting position. At such a time lug 233ᵇ strikes stud 616 and through arm 615 and its rock shaft throws arm 612 in path of lug 613, thus limiting the return movement of the carriage and coöperating with stop-pin 351 and its mechanism to positively lock carriage.

The carriage is provided with means for feeding the impression-receiving material forward for each new line of impressions. A pair of sprocket rolls 251 (see Figs. 1, 5ª and 5ᵇ) is mounted upon a shaft 252 having bearings in the impression ram. The sprocket teeth of these rolls engage sprocket perforations in the sheet of impression-receiving material and insure a positive feed. At one end of the carriage and fast on said shaft 252 is a ratchet wheel 253. (See Fig. 5ᵇ). Engaging this ratchet wheel is a spring pressed pawl 254 pivotally mounted upon a bell-crank 255 which is loosely mounted on the shaft 252. To the lower end of the bell-crank 255 is attached a rod 256 passing up through a bearing in the portion 257 on the carriage-frame. Between a collar 258 pinned fast to the rod 256 and the portion 257 on the carriage-frame is held a spring 259 tending to maintain the rod 256 in a downward position. The rod 256 when the carriage is returned after a line of impressions is completed to begin a new line, is brought over a rod 260 (see Figs. 5ª and 14) passing through a bearing in plate 1 and having its lower end pivotally engaged with a bell-crank 261 mounted on the lower side of plate 1. The other arm of this bell-crank 261 is provided with a cam-roller 262 held in engagement with the face of a cam 263 on the main cam shaft 171; so that when the main cam-shaft is permitted by the action of the electro-magnet 170 to rotate in the direction shown by the arrow the cam-roller 262 falls into the low part of cam 263 under the pressure of spring 264, and rod 260 is thus pushed upwardly, pushing in turn rod 256 against the action of spring 259 and rocking the bell-crank 255 carrying the pawl 254, retracting said pawl over a given number of teeth to control the line feed movement of the impression-receiving material. This feed will occur but once in a line of printed matter that is when the carriage is in its extreme right position. At the beginning of every line of print in the controller ribbon a word space hole is perforated. This allows the main cam shaft to be released and insures the feed-up of the paper when a blank space on the type-carrier is opposite impression surface. The feed of the carriage for a word space is sufficient to carry rod 256 out of line of rod 260, so that when cam shaft next revolves no feed-up of paper occurs. As soon as the cam 263 in the course of its revolution brings its high part in contact with the cam-roller 262, the rod 260 is retracted and under the influence of spring 259 the bell-crank 255 carrying the pawl 254 turns the ratchet wheel and with it the shaft 252 carrying the sprocket-rollers 251, thereby feeding the impression-receiving material up the space of one line. The line-space feed is controlled and varied by means of a stop 265 having a series of steps 265ª therein, as shown, in position to engage the end of arm 255 and arrest the same. This stop is pivoted to a bracket 319 by pivot 265ᵇ. At its lower end stop 265 is provided with a spring bolt 265ᶜ fitting into a series of holes 265ᵈ on the side of the bracket 319 and corresponding to the stops 265ª. By this means the stop 265 may be adjusted to bring any of the stops 265ª in the path of arm 255 and give a corresponding change of line feed.

Overthrow of the ratchet wheel 253 is prevented by means of a stop 266 forming part of the impression-frame against which the pawl 254 is brought up on the return movement of bell-crank 255. The end of pawl 254 is beveled at 254ª and engages a similar bevel surface on the stop 266, this bevel surface acting to cam positively the pawl 254 into absolute engagement with the teeth of ratchet 253 and prevent any tendency to slip or overthrow. Pressure rollers 267, 267 and 268, 268 are provided to maintain the impression-receiving material in engagement with the sprocket-teeth. These pressure-rollers are mounted in spring-pressed arms 269, 269 and 270, 270 pivotally mounted in the parts 266 and 270ª of the impression-frame. The arm 269 is provided with the extended end 269ª to form a finger-piece for raising the presser-roller 267 off the sprocket-roll 251, and arm 270ᵇ (see Fig. 4) is used to raise rollers 270, 270. A finger-piece 271 is also provided for the pawl 254 whereby the same may be raised up and out of engagement with the ratchet 253 when it is desired to insert a new sheet of impression-receiving material or to turn the sprocket-rolls 251. A spring pressed retaining pawl 283ˣ is held against ratchet-wheel 253 by a spring to prevent the ratchet following pawl 254 as it is carried back for new feed.

*The impression mechanism.*—The platen 272 (see Figs. 1 and 5ª) over which the impression-receiving material is passed has on its face a yielding material or "blanket" and forms part of a frame 273 mounted to be reciprocated toward and from the type-carrier by the impression mechanism hereinafter described. This frame slides on pins 274 fast in carriage frame. It will be understood that the shaft 252 carrying the sprocket-rolls 251 and the line-feed mechanism is mounted in bearings in the frame 273. The platen 272 is reciprocated by means of toggle-levers 276—277 one end of each of which is pivotally connected to studs 276ª, 277ª set screwed in the carriage-frame and other end of each is connected to the platen-frame 273. Studs 276ª and 277ª are eccentrically formed for the purpose of adjusting the impression face of platen to accommodate varying thicknesses of impression material, by throwing the pivotal points of toggles toward and away from the platen. Gages 276ᵇ, 277ᵇ fast to top of studs are provided for setting both studs alike. Set screws 276ᶜ, 277ᶜ hold studs in adjusted position. The knuckles of said toggles are connected by means of a tie-rod 278 whereby both toggles operate in unison, so that both ends of the frame 273 are moved by the same amount. These toggles are operated by fluid pressure admitted from reservoir R to a cylinder 279 in which acts a piston 286 having stem 286ª connected by means of link 286ᵇ to rod 278. (See Figs. 1, 4ᶠ and 16.) The admission of the pressure to said cylinder is controlled by valves 280, 281 arranged in a valve block 280ª secured on the lower side of base-plate 1. (See Figs. 2, 4ᵍ, 4ʰ and 10). These valves are mounted in chambers which lie side by side, the partition between said chambers being provided with ports 280ᵇ and 280ᶜ. Valve 280 is provided with three pistons 280ᵈ, 280ᵉ and 280, so spaced apart upon the valve stem that they open and close the ports 280ᵇ, 280ᶜ as the valve is reciprocated. The valve piston 280ᵉ is cut away at 280ᶠ allowing the pressure fluid to pass from the space between the pistons 280ᵈ and 280ᵉ to the port 280ᶜ so that both ports 280ᵇ and 280ᶜ are open to the fluid pressure coming from the reservoir R through connection 280ˣ. The valve 281 is provided with three pistons 281ª, 281ᵇ and 281ᶜ. Valve 281 in one of its positions as shown in Figs. 4ᵍ and 4ʰ uncovers passage 287, allowing the pressure-fluid to pass therethrough to a passage 288 formed in a block 288ˣ, thence through connection 288ª to a passage 289 formed in a block 289ˣ secured upon the base-plate 1 of the machine. The passage 289 is provided with an extension 289ᵃ (see Figs. 4ᵉ and 4ʲ) projecting beyond the block 289ˣ, in which is telescopically mounted a tube 289ᵇ forming an extension of the passage 289 and leading to one side of the piston 286 connected to the toggle tie-rod 278. It will be understood that the tube 289ᵇ is provided with suitable packing to make a tight joint with the sleeve 289ª. In the throw of valve 281 in the other direction, the passage 287 leading from the chamber 280ᵇ is closed by the piston 281ᶜ and passage 282 is uncovered by the piston 281ᶜ, thus throwing the fluid pressure coming through connection 280ˣ from the reservoir into the passage 282, which communicates with a connection 283 leading to a passage 284, formed in the block 289ˣ. This passage is provided with a similar extension 285 in which is slidably mounted a tube 285ª leading to the opposite side of piston 286. (See Fig. 4ʲ). Thus by the reciprocation of valve 281, pressure is applied to each side of the piston 286 alternately, causing a throw of the toggles in each direction and an impression movement each time the toggles pass their dead centers. The tubes 289$^b$ and 285$^a$ slide in their respective sleeves or extensions as the carriage travels to make a line of impressions. Valve 281 exhausts at each throw through the ends of the chamber 280$^b$, thereby relieving the piston 286 of any back pressure. The piston 281$^c$ is cut away at 281$^d$ to permit of exhaust through the passage 282 to the atmosphere.

The valves 280, 281 are operated from the main cam shaft 171 through the medium of a counter-shaft 290 (Figs. 2, 4 and 10) journaled in brackets 513, 513$^a$ on the underside of base-plate 1 and having a gear connection with shaft 171 through gear 291 meshing with gear 292 on the main cam-shaft. Gear 291 is a friction gear, and slips when shaft 290 is held from rotation by an escapement lever 510 which engages a two-tooth escapement wheel 511 mounted upon the shaft 290. The escapement lever 510 is mounted fast upon one end of a rock shaft 512, having bearings in the bracket 513. On the other end of said rock shaft is fast an arm 514 carrying at its extremity a cam-roller 515 in position to engage a cam 516 secured upon the main cam-shaft 171. A spring 517 surrounds the rock shaft 512 and bears with one end against the arm 514 and with its other end against the bracket 513, the spring tending to keep the escapement lever 510 in engagement with one of the teeth on the escapement wheel 511. The cam 516 acts to raise the escapement lever 510 out of engagement with the escapement tooth on the escapement wheel 511 and to permit shaft 290 to be driven through the friction gear 291 for one-half of a revolution, the shaft 290 being arrested after having made a half revolution by the escapement lever 510 engaging the other tooth on the escapement wheel.

Secured upon the shaft 290 are two cams 293 and 294. Cam 294 is provided with two lobes 294$^a$, 294$^a$ which operate valve 280 and cause an actuation thereof twice in every revolution of shaft 290, the valve 280 being pivotally connected with one arm 298 of a bell-crank, the other arm 298$^a$ of which carries a cam roller 296, which engages cam 294. Valve 281 is operated once during every revolution of the main cam-shaft by means of a cam 293 which carries a cam roller 295 on one arm of the bell-crank 297, the other arm of which is pivotally connected with the valve 281. The actuation of valve 280 operates to allow pressure from the reservoir to be transmitted to either side of the piston 286 for driving the impression mechanism.

Since the cylinder 279 in which the piston 286 operates is mounted upon the carriage and travels therewith, there would be a tendency for the fluid pressure admitted to the left side of said piston to oppose the travel of the carriage from right to left. Immediately after the impression mechanism has been actuated valve 280 as above stated, closed the ports 280$^b$ and 280$^c$, thereby shutting off the air-pressure.

*The carriage-feed controlling mechanism.*—The feed of the carriage past the impression point is controlled in accordance with the unit value of the character last impressed, and this control is effected by the following mechanism: A series of gage-disks 299 (see Fig. 11) are provided and mounted to rotate in unison with the type-wheel shaft 42. There are as many of these gage-disks provided as there are type-carriers, each type-carrier having a gage-disk corresponding thereto which represents by the stops and holes formed thereon the unit values of the characters on the type-carrier to which it corresponds. As shown, these gage-disks are secured fast to the rod 78 which passes through the tubular type-wheel shaft 42 so that by the operation of the shift mechanism hereinafter described, the gage-disk corresponding to the type-carrier will be simultaneously brought into operative position when its corresponding type-carrier is shifted on to the type-wheel. To this end the first gage-disk 299$^x$ to the left, as shown on the drawings, is formed with a sleeve 300 which has its bearing upon the tubular shaft 42 said shaft being slotted a sufficient distance to allow of the longitudinal movement of the gage-disks to bring any one of them into operative position. The remaining gage-disks 299 are mounted upon the sleeve 300 and are held in contact with each other by means of a collar 301. A pin 302 passes through said collar and the sleeve 300 and the shaft 78, and thus secures all the gage-disks to said shaft, so that when said shaft is moved by the shift mechanism the disks are moved therewith. When shaft 42 is rotated the gages rotate therewith and as each character in the type-carrier is brought into position for impression the corresponding parts of the gages are brought into operative position for coöperation in feeding the carriage. A feather 300$^a$ holds each disk in a definite relation to disk 299$^x$.

The construction of each of the gage-disks is similar, the stops or gages thereon being different to correspond with the different unit values of the type of the several type-faces of the corresponding type-carriers. A description of one of the gage-disks therefore, will suffice for an understanding of them all. The gage disks are provided with a series of holes 303 in their peripheries and a series of lugs 304 projecting from one of their side faces. The peripheries, the holes and the lugs, form stops corresponding to the unit values of the characters on the type-carrier which corresponds to the disk. Coöperating with these stops are a pair of gage-slides 305, 306. (See Figs. 11ᵃ and 11ᵇ.) These slides are mounted to move in a block 307 (see Fig. 11ᶜ) inserted in the plate 1 of the machine. Gage-slide 305 is provided with an upwardly extending stem 308 bent over at its top and provided with a downwardly projecting pin 309. Gage-slide 306 is provided with an upwardly extending stem 310 from which projects upwardly a pin 311. Gage-slide 305 is arranged to coöperate with the periphery and also with the peripheral holes 303 of whichever of the gage-disks is brought into operative position beneath it; and gage 306 is arranged to coöperate with the lugs 304 of the same gage-disk. Pivotally connected with the gage-slide 305 is a rod 312 (see Figs. 2, 5ᵃ and 14) to the lower end of which is pivotally connected a lever 313 pivoted upon a bracket 313ᵃ depending from the lower side of plate 1. A spring 313ˣ surrounding the pivot on which arm 313 is mounted bears downwardly upon this arm and tends to pull down gage-slide 305 so that its pin 309 will engage the periphery or one of the holes 303 of the gage-disk which has been shifted beneath it. A cam roller 314 is mounted on the other end of arm 313 to engage a cam 315 on the main cam shaft 171. Cam 315 returns gage-slide 305 to normal position by its engagement with cam roll 314 on arm 313 and the connection of the latter through rod 312 with the gage-slide. Gage slide 306 is operated by similar connections, viz: the pivotally mounted arm 316 connected with gage-slide 306, cam roller 317 on said arm engaging cam 318 on main shaft 171, and spring 316ᵃ on the pivot of arm 316 tending to force gage-slide 306 upwardly to bring its pin 311 into contact with a stop-lug on the stop-disk shifted into position above it. The cam 318 acts to return the gage-slide 306 to normal position.

In the lower portion of gage-slide 305 is a series of ports 305ᵃ; and in the lower portion of gage-slide 306 is a similar and corresponding series of ports 319. Both series of ports 305ᵃ and 319 are arranged in a horizontal line. In the normal position of slides 305 and 306 the respective ports 305ᵃ are alined opposite corresponding ports 319. A valve 320 mounted in block 307 below the plate 1 controls the admission of air from the reservoir R through connection 321 to the ports 305ᵃ and 319. Passage 322 in block 307 connects ports 319 with 305ᵃ and a series of connections 323 lead from ports 305ᵃ to a space unit stop mechanism, hereinafter described, for controlling the carriage-feed. The passage of air to the several connections 323 is controlled by the movements of gage-slides 305, 306. Each of the connections 323 corresponds to a different unit value. Referring to Fig. 11ᵈ; the first connection on the right represents two units, the next three units, and so on up to eight units, as indicated by the numerals 2, 3, 4, etc. When the slides 305, 306 coöperate to establish communication from the reservoir and connection 321 through the two-unit connection, the space-unit stop mechanism is operated to allow of a carriage feed of two units. There are no characters having a value of less than two units and none having a value of more than eight units. Characters such as "i", "j" lower case, and the punctuation marks are two-unit characters; and Æ and Œ upper case, have the largest unit value, these being eight unit characters. The normal word-space has a value of three units. These unit values may be varied to suit requirements, it being understood that the relative unit values of the several characters remain substantially the same.

Gage-slides 305, 306, control the several connections 323 by the following means: A row of three holes 324 (see Fig. 11ᵃ) is provided in gage-slide 305 on a line above the row of holes 305ᵃ and a row of four holes 325 is provided on a line above the row 324. These rows are spaced apart a distance equal to the extent of movement of slide 305 from its normal position to the position in which pin 309 rests upon the periphery of the gage-disks 299, and from the latter position to the position in which the pin 309 rests in one of the holes 303 in said gage-disks. That is, when gage-slide 305 drops from its normal position to the position in which its pin 309 rests on the periphery of a gage-disk, the row of holes 324 is brought in registry with connections 323 and passages 322. This will be termed the first position of gage-slide 305. When the gage-disk beneath pin 309 is in such position that the pin drops into a hole 303, the row of holes 325 will be brought in registry with connections 323 and passages 322. This will be termed the second position of this gage-slide. The numerals 2, 3, 4, etc., in Fig. 11ᵃ represent the unit values corresponding to these holes and also indicate the holes which register with the correspondingly numbered connections 323. In gage-slide 306, (see Fig. 11ᵇ), are holes marked 2, 3, 4, 5, 6, 7 and 8, which correspond to the similarly numbered connections 323, and register therewith and with the similarly numbered holes in gage-slide 305. These holes in gage-slide 306 are arranged in rows, as shown, viz: holes 2 and 5 in the first row which correspond to the first position of gage-slide 306 in which the pin 311 brings up against those lugs 304 which are farthest from the center of the gage-disks. Holes 3 and 6 are arranged in the second row, corresponding to the second position of the gage-slide, holes 4 and 7 in the third row, corresponding to the third position of the slide, and hole 8 in the fourth row, corresponding to the fourth position of the slide.

The slides 305, 306 coöperate as follows: The valve 320 which governs admission of air from the reservoir R and connections 321 through the slides and passages 322 to connections 323 is operated from the main cam-shaft 171 by a cam 326, with which is engaged a lever 327 pivoted on bracket 313ª, a cam roll 328 on the end of which engages cam 326. The opposite end of lever 327 has pivotal connection with valve 320. (See Figs. 2, 5ª and 11ᶜ). When a two-unit character for instance, has been printed, a gage-disk 299 is in position such that gage-slide 305 brings up in its first position with its pin 309 resting on the periphery of a gage-disk; and slide 306 brings up in its first position with its pin 311 against a lug 304 on the same gage-disk. These movements place the row of these holes 324 in gage-slide 305, in line with the passages 322 and connections 323, and the row of holes in slide 306 which contains holes marked 2 and 5. The hole 2 in slide 306 thus registers with the passage 322, hole 2 in slide 305 and connections 2 of the connections 323. Thus an air passage is opened right through from connection 321 to connection 2 of the series 323 and to the carriage feed-controlling mechanism. In this position of the gage-slides the hole 5 in slide 306 comes opposite a blank space in the line of holes 324 of gage-slide 305, there being only three holes in this line, and hole 5 in slide 306 being in the fourth position from the right of the slide, as shown in Fig. 11ᵇ.

When a three-unit character has been impressed and a carriage feed of three units is required before the impression of the next character, the gage-disk is so positioned that slide 305 is arrested in its first position and slide 306 is arrested in its second position. This brings hole 3 in slide 306 in registry with hole 3 in slide 305 and establishes an air passage from connection 321 to connection 3 of the connections 323. Hole 6 in slide 306 which is in the same row as hole 3 is not in registry with any of the holes in slide 305 in this position of the slides because it comes opposite the blank space in row 324, being in the first position from the right of slide 306 ad there being only three holes in row 324 of slide 305.

For a four-unit character the gage-disk controls the positions of the gage-slides so that slide 305 takes the first position and slide 306 takes the third position. This brings hole 4 of slide 306 in registry with hole 4, row 324 of slide 305 and opens a passage through connection 4 of the series 323.

For a five-unit character the gage-slides are positioned by the gage-disk so that slide 305 takes the second position bringing row of holes 325 in line with passages 322 and connections 323. Slide 306 takes its first position bringing the row containing holes 2 and 5 in line with passages 322 and connections 323. Hole 5 in slide 306 thus registers with hole 5 in row 325 of slide 305 and communication is established through these holes from connection 321 to connection 5 of the series 323.

For a six-unit character slide 305 takes its second position and slide 306 takes its second position, bringing hole 6 and slide 306 in registry with hole 6 and slide 305 and with connection 6 of the series 323.

For 7 and 8 unit characters the positions of the slide will be apparent from the above description, and further detailed explanation is deemed unnecessary.

The valve 320 is controlled and operated at the proper time or when slides 305 and 306 are brought to operative position to admit air pressure from the reservoir by means of its cam connection with main cam-shaft 171 as described. The chamber 330 of this valve (see Fig. 11ᶜ) is open at the top at 333 to the atmosphere and valve 320 is cut away at its end 334ª. The purpose of this is that any back pressure of the air against stop-pins hereinafter described may exhaust through 323 as pin is restored both sides being in normal position.

The carriage feed is controlled in accordance with the unit values of the characters by the following mechanism: From connection 323 the air is led to the carriage stop mechanism 334. (See Fig. 16). This mechanism (see Fig. 12) is provided with a series of connections 334ˣ corresponding to the series 323, and is mounted upon the plate 1 at the rear. (See Fig. 1). The construction of this mechanism is shown in Figs. 10, 12 to 12ᵉ. The series of connections 334ˣ for the admission of air are connected respectively with the connections 323 and are numbered 2, 3, 4, 5, 6, 7 and 8 to indicate the connections corresponding with like numbered connections in the series 323. Connections 334ˣ communicate respectively with passages 335 formed in a casting 336 mounted in plate 1. This casting is chambered to receive a sleeve 337 (see Fig. 12ª) which is provided with a series of longitudinally arranged ports 338 and a series of circumferentially arranged ports 339. Set screws 340 are placed in the casting 336 and bear upon sleeve 337; and by these means the sleeve may be accurately adjusted to bring its ports 338 in registry with passages 335. Within sleeve 337 is mounted a ribbed cylinder 341 (see Fig. 12ᵇ) having a journaled portion 341ª which has bearing in the neck portion 337ª of sleeve 337. The cylinder 341 is so mounted within sleeve 337 that the channels 342 between the ribs register with passages 335. Opening into each of the channels 342 are passages 343 longitudinally arranged within the cylinder 341 and connecting channels 342 with the circumferential ports 339. These passages 343 are conveniently made by boring longitudinally into the cylinder from the end and inserting a plug 344 to close the ends, as shown in Fig. 12ᵇ. Passages 343 are arranged circumferentially around the cylinder and connect each of the chambers 342 with one of the ports 339 in sleeve 337, so that air or other pressure fluid coming through one of the passages 335 circulate about the corresponding channel 342 until it finds a clear passage 343 through which it passes radially outward through the corresponding port 339 in the sleeve.

At the end of casting 336 is secured a plate 345 having a central aperture to receive the reduced end 337ᵇ of sleeve 337. Against the face of plate 345 is secured, by means of screws 346, another plate or dial 347 which is provided upon its face with a series of air channels 348 leading radially outward to a series of cylinders 349 formed in said plate. The air passages 348 communicate with the ports 339 in the sleeve 337 and are thus in communication through the ribbed cylinder 341 with the passages 335, connections 334 and the connections 323 which are controlled as above described by the gage slides in accordance with the unit value of the character printed. Mounted in cylinders 349 are pistons 350 connected with stop-pins 351 adapted to project from the outer face of plate or dial 247 when a piston 350 is moved outwardly under the impulse of fluid pressure coming from the ports and passages described. Mounted in line with cylinder 341 and fast to it is a shaft 352 on which is mounted a pin restoring arm 353 having a sleeve bearing 354 formed with a collar 355 engaged by a yoke arm 356 mounted on a rock shaft 357 mounted in a bearing 358 depending from the lower side of plate 1. Rigidly attached to the rock shaft 357 is an arm 359 on the end of which is a cam roll 360 in position to engage a cam 361 on the main cam shaft 171. The lower end of the pin-restoring arm 353 is provided with a pin 362 engaging an arm 363 on a sleeve 364 which is fast on shaft 352. The sleeve 364 is also formed with an arm 365 adapted to be engaged by any stop-pin 351 when projected. The outer face of plate 347 is provided with apertures 366 through which the stop-pins 351 are projected, these apertures being arranged in a circle on the face of plate 347. Between the apertures are holes 367, the object of which will be presently described. The pin-restoring arm 353 is provided at its upper end with two pins 368, 369, the shorter one of which 368 is a restoring pin and the other being a retaining pin. Journaled in bearings 371 upon the upper face of plate 1 is a shaft 238. Fast on said shaft 238 is a pinion 237 in engagement with the rack 236 on the carriage. At the opposite end of shaft 238 and mounted fast thereon is a ratchet wheel 373. Loosely mounted on a stud 370 fast in bracket 370ᵃ on plate 1 (see Figs. 1 and 10), is a gear wheel 374 engaging a pinion 375 mounted on the end of the journaled portion 341ᵃ of the ribbed cylinder 341.

Projecting from the face of the gear wheel 374 is a pin 376 on which is mounted a spring pawl 377 engaging the teeth of the ratchet wheel 373. A stationary ratchet wheel 378 is mounted in the rear of the gear 374 and a spring pawl 379 is mounted upon a pin projecting from the face of the gear 374. This pawl forms a lock to prevent backward movement of the gear 374. The gear 374 is constantly urged in the direction of the arrow (see Fig. 10) by the air pressure driving the carriage, the motion of the carriage being transmitted to the gear 374 through the ratchet and pawl 373 and 377, pawl 379 meanwhile slipping over the teeth of ratchet 378.

The movement of the carriage is controlled by the stop-pins 351 in accordance with the unit values of the characters and spaces by the mechanism above described as follows: The pressure fluid coming through the ports 323 as controlled by the gage slides before described, enters the corresponding connection 333, thence circulates about the corresponding channels 342 of ribbed cylinder 341 until it finds exit to one of the stop-pin cylinders 349 and throws out a stop-pin 351, as many pins in advance of the pin last thrown as the number of units of space occupied by the character last printed; i. e., the unit value of the space which the carriage must be fed in order to bring it to position for the next impression, it being understood that from one stop-pin to the next on the pin dial represents one unit. When a stop-pin is thus thrown out, the carriage is still held in its previous position by arm 365, which is held from rotation by the previously projected stop-pin. Valve 320 is then closed by its operating cam and pressure is shut off from the connections 323—334ˣ and 335, this valve being so formed at 333 that these connections can exhaust into the atmosphere thus relieving the cylinder 349 of all back pressure. The main cam shaft through cam 361 then operates the pin restoring arm 353, which restores the previously projected stop-pin, thereby freeing arm 365 and the carriage, thus allowing the carriage to feed forward until the arm 365 is arrested by the last projected stop-pin. Arm 365 and the carriage are held by the retaining pin 369 until the return movement of the pin restoring arm 353. The movement of the carriage and of arm 365 carries with it the ribbed cylinder 341, so that the passage 343 therein last used is also moved around a distance corresponding to the unit value of carriage feed. If, for instance, the last stop-pin thrown were the uppermost one and the arm 365 were arrested in the position illustrated in Fig. 12$^f$ and the character printed were a five-unit character, the gage slides 305, 306 would be placed by the stop-gages in a position to open communication through the channel marked 5. (See Fig. 12). The air or other pressure fluid passing through this channel and channel 343 would enter the cylinder 349 and would throw out the stop-pin $x$. (See Fig. 12$^f$). On the previously projected stop-pin being restored, by the mechanism above described, arm 365, and with it the carriage, would step forward over the four intervening stop-pins and would be arrested at the pin marked $x$. This movement would have carried the ribbed cylinder 341 around the same distance bringing the channel 343 therein which was previously in communication with the cylinder stop-pin marked $x$, five cylinders farther around the dial or plate. If now, a six unit feed were required, passage No. 6 (see Fig. 12) would be opened by the action of the gage-slides and stop gages and the sixth pin from the one marked $x$ would be thrown out. The channels 343 in the ribbed cylinder 341 are arranged serially around the axis of the cylinder, so that whatever stop-pin was last operated, the pin the required number of units in advance thereof, would be thrown out by the opening of the channel 334$^x$ corresponding to the number of units required for the feed movement. Thus any required unit value of feed is designated and the corresponding carriage-feed movement is executed according to the operation of the stop gages and the gage-slides.

The above mechanism gives the variable feed movement required for the different units of feed required to accommodate the different characters. In order to provide for the justification of lines of print, the unit values of the word-spaces must be varied in accordance with the justification required; and therefore, the normal space feed movement of the carriage must be correspondingly varied to provide for justification. To this end a justification mechanism is provided.

*The justification mechanism.*—In any line of print not requiring justification the word spaces would have a uniform or normal unit value. In a line requiring justification some of the word spaces must be given a unit value different from the normal. The machine herein described is designed to increase the normal unit value of the word spaces to provide for the justification. It has been seen that the stop-gages 299 (see Fig. 11), are provided with perforations and lugs for controlling the gage slides 305, 306 to set the proper stop-pins for controlling the feed movements of the carriage. In these stop-gages at the points thereon corresponding to the blank spaces on the type-carriers which come into impression position when a word space is represented; the lugs 304 are omitted and holes occur in the peripheries, thus allowing the gage slides 305, 306 to move their full extent, if the word-space as affected by justification should require it. In this "space" position of the stop-gages 299, the movement of the gage-slides 305—306 are determined and controlled according to the justification required by means of two stepped slides 519, 520 (see Figs. 11$^k$, 11$^l$) mounted in guides 521, 522 (see Figs. 11$^c$, 11$^h$ and 11$^i$) upon the base-plate 1 of the machine between the gage slides 305, 306. The stepped slide 520 is provided with a series of steps indicated by the numerals 3, 4, 5, 6, 7, and 8 (see Fig. 11$^l$) formed in its lower edge. Stepped slide 519 is formed with two steps at its ends numbered respectively 3 and 4 (see Fig. 11$^k$) and a low portion between said steps indicated by the numerals 5, 6, 7 and 8. Stepped slide 519 coöperates with gage-slide 305; and stepped slide 520 coöperates with gage-slide 306. Projecting laterally from the stem of gage-slide 305 is a stop-pin 523, adapted to engage the steps of slide 519; and gage-slide 306 is provided with a similar stop-pin 524 adapted to engage with the steps of slide 520. The numerals 3, 4, 5, 6, 7 and 8 applied to the steps of slides 519, 520 (see Figs. 11$^k$ and 11$^l$) designate the units of justification represented by these steps when in position with regard to gage-slides 305, 306, it being understood that the 3-unit step corresponds to a normal word space. These stepped slides are automatically brought to proper position with respect to gage slides 305, 306 to control or determine their movements when the stop-gages 299 are at "space" position, and thus determine the spacing required. These stepped stops are pivotally connected with arms 455, 456 respectively (see Figs. 1, 3 and 13), said arms being in turn pivotally connected with an arm 454, by which, through mechanism hereinafter described, said stepped-slides are moved simultaneously into positions to bring their steps into the path of stop-pins 523, 524 of the gage-slides 305, 306.

The amount of justification required for each line is determined by a separate and independent justification controlling-ribbon having perforations formed therein in different positions with regard to one edge thereof according to the justification to be made. This justification controller is fed through the machine to control the justification mechanism, this mechanism being indicated in detail in Fig. 13, and shown in Figs. 1 and 3 in its relative position with the other parts of the machine. On reference to Fig. 1 it will be seen that the justification mechanism is shown, arranged on the top of the base-plate, at or near front right-hand corner thereof. In this justification mechanism is provided guide 380 for guiding justification controller into the mechanism, and another guide 381 (see Fig. 13ª) is provided to conduct the ribbon or controller out of the mechanism. The justification mechanism (see Figs. 13 to 13ᵉ inclusive) comprises a hollow cylinder 382 mounted upon a shaft 383 supported in suitable bearings in a bracket 384. The cylinder 382 is provided with sprocket pins 385 near each end to engage the sprocket perforations in the edges of the justification strip or controller. Pressure rolls 386 and 387 are provided as shown in Figs. 13 and 13ª to press the controller strip into engagement with the cylinder 382, and these pressure rolls 386, 387 are provided with channels 388 to allow the sprocket pins of cylinder 382 to pass. The cylinder 382 is provided with a series of longitudinally arranged perforations 389 corresponding to the transverse lines of perforations on the justification controller. Mounted in rear of the cylinder 382 in a suitable bracket 390 is a series of arms 391 provided with pins 392. These arms are pivotally mounted at their rear ends upon a rod 393 having bearings in the bracket 390, and at their front ends are guided between the teeth 536 of a comb 537. These arms are five in number and correspond with the five circumferential rows of holes in the cylinder 382, the arms 391 being so mounted that their pins will drop into the holes in the cylinder 382 when permitted to do so by perforations in the justification controller. Springs 394 are mounted so as to bear upon arms 391 to insure their falling into the apertures in cylinder 382 when uncovered by a perforation in the justification controller. On the rod 393 near each end thereof is mounted a pair of arms 395, 396 connected by a bail rod 397 which passes under all the arms 391. At the end of the bail rod 397 is secured a block 398 through which passes an adjustable stop-screw 399. This stop-screw is adapted to engage a cam shape 400 carried by an arm 401 hereinafter described, the cam shape being such that in its normal position it forces upwardly the bail rod 397 and thereby holds the arms 391 off the cylinder 382.

On one end of cylinder 382 is secured a toothed-wheel 402. Mounted on the shaft 383 adjacent the toothed wheel 402 is an arm 403 carrying a spring-pawl 404 which is provided with a tail-piece 405. (See Fig. 13ᶜ). The pawl-carrying arm 403 is pressed by means of a spring 406 toward the right hand in Fig. 13ᶜ so as to urge the wheel 402 in a direction to feed the controller ribbon through the mechanism. Also arranged on shaft 383 is a lever 407, the upper portion of which engages a pin 408 in the arm 403. The lower portion of the lever 407 engages a pin 409 in the arm 410 of a spring-pawl 411, said pawl being mounted upon a rod 412 mounted in the bracket 384. (See Fig. 13ᵈ). A spring-retaining pawl 413 is provided which is also mounted upon the rod 412 and is normally held in engagement with the gear 402 by means of its spring.

The above arrangement of parts is such that when the lever 407 is swung on its pivot 383, the arm 403 carrying the pawl 404 is retracted by lever 407 engaging pin 408 thereon. The tooth of pawl 404 is so shaped that in this backward movement it rides over a tooth of wheel 402. At the same time with the above movement of pawl 404 the lower arm of lever 407 is moved away from the pin 409 in the arm 410 of pawl 411 and spring 414 forces the same into engagement with the wheel 402. Lock pawl 411 is so shaped and so pivoted that it holds wheel 402 and cylinder 382 against action of pawl 404 and its arm 403 and spring 406 until arm 407 almost reaches its starting or normal position. Upon the return of the arm 403 under the influence of its spring 406 the toothed wheel 402 together with the cylinder 382 is rotated, pawl 411 being withdrawn from engagement of the teeth of gear 402 by the lower end of lever 407 engaging the pin 409 of this pawl. Retaining pawl 413 has its end so shaped that it retains toothed wheel in normal position when pawl 404 is withdrawn and will ride over the teeth of wheel 402 when the same is turned in the forward direction to feed the justification controller through the machine.

Manual devices are provided for rotating the cylinder 382, as for instance when it is desired to insert or adjust the justification strip. This means consists of a thumb-nut 415 mounted fast upon the journaled end 416 of the cylinder 382. A hand lever 417 fast on a shaft 418 mounted in the bracket 384 is provided on its opposite end with a short arm or cam 419 which is arranged to engage the edge of pawl 413, as shown in Figs. 13ᶜ and 13ᵈ. By moving the hand lever 417 in a backward direction, pawl 413 may be lifted out of engagement with the teeth of wheel 402, then by depressing arm 403 pawl 404 can be raised and by action of spring 406 held above screw 421 and since lock-pawl 411 is normally out of engagement with wheel 402, the cylinder 382 may be rotated in either direction by turning thumb-piece 415. A stop 420ª is provided to limit the movement of the hand lever 417 in one direction and stop 420 is provided so that the short arm or cam 419 will be stopped in proper position to disengage pawl 413 from the wheel 402.

In order that the feed of only one transverse line at a time of the justification controller may be insured, and that there may be no skipping of the pawls, a stop 421 is provided consisting of a set screw passing through a portion of the frame work of the justification mechanism. The upper corner of pawl 404 is given a shape such that the camming action between it and the stop 421 will take place camming the pawl into closer engagement with the teeth when the spring of the arm 403 brings the same up against the stop. By this means as well as by the provision of locking retaining pawls 411 and 413 the feed of only one transverse line of perforations on the justification controller at a time is insured. The justification mechanism is operated whenever a word-space occurs in the main controller. At other times it is locked from operation.

The justification mechanism is operated from the main cam shaft as follows: A side-face-cam 422, (see Figs. 2 and 3) mounted thereon engages a cam roller 423 on an arm 424 fast on a rock shaft 425 (see Fig. 13) mounted in brackets on the lower side of base-plate 1. Fast on said rock-shaft is another arm 426 (see Figs. 3 and 13) to the outer end of which is connected a tie-rod 427 connected to an arm 428 on a rock shaft 429 extending transversely across the top of base-plate 1 and mounted in suitable journals 430 thereon. At the front end of said rock-shaft is an arm 431 having a forked end in which is received one arm of a bell-crank 432 pivoted in a bracket 384 in which the justification mechanism proper is mounted. The other end of said bell-crank is pivotally connected with the lever 407, as shown in Figs. 13 and 13c. Rock-shaft 425 is a spring mounted rock-shaft, the spring tending to hold the cam-roller 423 in engagement with the face of cam 422. Springs 433, 433, on the shaft 429 tend to rotate said shaft to the right and also assist in keeping the cam-roller against the cam. Normally the high part of the cam is in contact with the cam-roller. When the roller rides off the high part, shaft 429 tends to be rotated to the right, under the influence of the spring rock-shaft and the springs 433 above mentioned withdrawing by means of the bell-crank 432 and the lever 407, the pawl 404 one tooth backward. The completion of the revolution of the main cam shaft 171 brings the high part of the cam around to position to return the parts to normal position and allowing the spring 406 to feed the cylinder a space of one tooth to bring a new transverse line on the justification controller under the arms 391. Shaft 429 is however, locked from operation until a word space occurs on the main controller by means of the following locking mechanism: A post 434 is mounted vertically in the upper side of plate 1. Pivotally mounted near the top of this post is a lateral arm 435 engaged by a spring 436 surrounding the post 434, one end of the spring being fastened to the base-plate 1 and the other bearing against the side of the arm 435. A stop notch 437 is formed in the arm 435 to receive the upper end of an arm 438 pinned fast to the rock shaft 429. When this arm is engaged by the notch in the lateral arm 435, shaft 429 and the parts operated thereby are held from movement. An arm 439 is mounted rigidly upon the type-wheel shaft 42 and is arranged to engage the arm 435 and release the same from engagement with arm 438 when a word-space occurs on the main controller and when the type-wheel presents the blank space portion corresponding to word-space to the impression point. By means of the spring 436 arm 435 automatically returns into engagement with arm 438 to lock the same from movement, after the type-wheel shaft has passed the word-space position. It will be understood that when the rock-shaft 429 is in the locked position the cam roll 423 cannot follow its cam 422 and will not drop to the low portion of the cam 422 when the same comes around opposite thereto; but will be held out of engagement by the locking mechanism.

The arms 391 are allowed to fall into engagement with the justification controller as soon as rock shaft 429 commences to move. This is accomplished by means of an arm 440 fast on the rock shaft 429. A vertical rock shaft 441 is mounted in suitable bearings in the bracket 390 and has pinned fast to its lower end an arm 442 in position to engage arm 440. At the upper end of rock shaft 441 is secured the arm 401 carrying the cam shape 400 before referred to. A spring 443 keeps arm 442 in engagement with the arm 440 so that when the arm 440 moves away from arm 442 by the movement of rock shaft 429, arm 442 follows, whereby arm 401 moves the cam shape 400 so as to allow arms 391 to drop under the influence of their springs 394. A pin 401ª limits the motion of arm 401.

It will be understood that the arms 391 represent unit values of justification, as indicated by the numerals 4, 5, 6, 7 and 8 in Fig. 13. The first of these arms on the left represents a justification of one unit, or a word-space of 4 units made up of the normal word-space of three units plus one unit of justification. The other arms represent two, three, four and five units of justification respectively by which the normal word-spaces are increased. As the perforation signifying the requisite amount of justification is fed under the arms 391 the appropriate arm drops below the others, its pin 392 entering the hole in the ribbon and in the cylinder 382.

Passing below arms 391 is a rod 444 one end of which slides in a bearing in the bracket 381 and the other end of which is supported in a bracket 445 rising from plate 1. A stop 446 is secured to said rod by which the longitudinal movement of the rod is arrested when said stop comes into contact with that one of the arms 391 which has been allowed to drop by the perforation in the justification controller. Another stop 447 is secured on the rod 444 in position to engage arm 448 fast to shaft 429. Another stop 449 is secured on the rod 444 against which presses an arm 450 which is secured to the upper end of the vertical rock shaft 451 mounted in the bracket 452 rising from plate 1. A spring 453 surrounds the rock shaft and has one end fastened thereto, the other end bearing against the side of bracket 452, the spring acting to press arm 450 against the stop 449 of rod 444 to move the same in the direction to the right. At the lower end of vertical rock shaft 451 is fast an arm 454 to which are connected by tie-rods 455 and 456 the stepped slides 520, 519 which control the movements of the gage slides 305, 306 to open the appropriate connections 323 corresponding to the unit value of the justification plus the normal word-space. Thus when the first arm 391 on the left falls, the movement of the rod 444 is arrested by the stop 446 coming in contact with the dropped arm. This movement of rod 444 carries stop 449 away from arm 450 a distance representing the distance of one space-unit of justification. As soon as stop 449 moves away from arm 450 the latter immediately follows. This movement of arm 450 is communicated through the rock shaft 451 to the arm 454, which movement brings the proper steps in slides 519, 520 into position to control the movements of the gage slides 305 and 306. For instance, suppose the justification indicated on the controller be two units, that is to say, the normal word space of three units will be increased by two units of justification to give a five unit word space, the controller having a perforation in the second position indicated in Fig. 17°. This perforation coming into position under the arms 391, the second arm from the left end, marked 5, in Fig. 13 will drop by reason of its pin 392 finding this perforation in the justification ribbon. The type-carrier shaft 42 will have been arrested in word-space position and arm 439 is so positioned on the type-carrier shaft that it will engage latch 435 in this position releasing arm 436 and allowing rock-shaft 429 to rock by reason of the cam roller on arm 424 following the shape of its cam 422 on the main cam shaft. The rocking of the shaft 429 swings arm 448 away from the stop 447 on rod 444 and arm 450 moves said rod longitudinally until its stop 446 comes into contact with the side of the dropped arm 391. The rocking of shaft 429 also swings arm 440 away from arm 442, which immediately follows the movement of arm 440 and causes the cam shape 400 to be moved from beneath the stop 399 allowing the bail rod 397 to drop, thus permitting the drop of arm 391. The longitudinal movement of rod 444 being determined by the dropped arm 391 will cause arm 454 to be swung a corresponding distance, thereby moving the stepped slides 519, 520 a corresponding distance.

Since arm 391, marked 5 (see Fig. 13), has been the one supposed to have been dropped, the slides 519, 520 will have been moved to second position, bringing the second stop marked 5 (see Fig. 11$^h$), and the portion marked 5 (see Fig. 11$^k$), in the path of the stops 524 and 523 on the gage-slides 306 and 305 respectively. The stop-gages 299 being also in word-space position, the gage-slides 305, 306 move until their pins 523, 524 are arrested by the steps in the slides 519, 520. It will thus be seen that for two units of justification, gage-slide 305 will drop to its second position from normal, and gage slide 306 will move upwardly to its first position from normal. The step 5 on the slide 520 being in first position and the step 5 on the slide 519 being in second position, this movement of the gage-slides brings the third row of holes containing the one marked 5 (see Fig. 11$^a$) into registry with the passage 322 and pressure connection 321 and brings the second row of holes in gage-slide 306 containing hole marked 5 into registry with this passage and connection. In this position the holes marked 5 in each gage-slide come into registry and no others. The pressure fluid passing through the passage thus opened sets a stop pin 351 (see Fig. 12$^f$) five pins in advance of the last projected stop-pin, thereby determining a carriage feed movement of five units. Similar action of the mechanism takes place for other unit values of justification. The movement of the slides 519, 520 to bring the proper steps into position being determined by the arm 391 which drops and the particular arm 391 being determined by the position of the perforation in the justification controller.

For the normal word-space of three units no perforation occurs in the justification ribbon, and therefore, none of the arms 391 can drop into the path of the stop 446 on the rod 444. This rod therefore, for a normal word-space slides to its full limit of movement as determined by the cam 422. Slides 519, 520, therefore, move to their limit bringing the end stops marked 3 into position in the path of the stop-pins 523, 524 on the gage-slides 305, 306 respectively. It will be seen that the step marked 3 in slide 520 is in second position, and the step marked 3 in slide 519 is in first position, thus allowing a movement of slide 306 to second position bringing the hole marked 3 into position and allowing the slide 305 to move to first position bringing the hole marked 3 into registry with the passage 322. In these positions of the slides 305, 306, only the holes marked 3 in each are in registry with passage 322, thus a stop pin 351 three pins in advance of the last set stop-pin is thrown out, determining a feed of the carriage of three units.

The latch 435 is struck by the arm 439 in every revolution of the type-wheel shaft, and is therefore, disengaged from the arm 438, but since the type-wheel shaft is not arrested in this position except when a word space is to be designated, latch 435 is not held out but immediately reëngages the arm 438 by the action of spring 436. In word space position, the type-wheel shaft is arrested and latch 437 is held open allowing the arm 424 to follow its cam 422 causing the justification mechanism to operate.

The machine may be operated if desired, without justifying the lines of impression, the product in this case being unjustified lines of which all the word spaces would be equal, as in the case of matter produced by the ordinary type-writing machine. To permit this, the following means are provided for preventing justifying arms 391 from acting (see Fig. 13ᵉ): In the bracket 390 in which the rock shaft 393 is mounted, is journaled a rock-shaft 530, having secured to one end a finger lever 531, and to its other end an arm 532, which carries at its extremity a cam shape 533. Arm 396 which carries one end of the bail-rod 397 is in the shape of a bell-crank having a downwardly projecting arm 534 in position to be engaged by the cam piece 533. When it is desired to dispense with justification, the finger lever 531 is moved to rock the shaft 530 and carry the cam-piece 533 beneath the downwardly projecting arm 534 of the bell-crank arm 396, thus holding the bail-rod and the justifying arms 391 in raised position. When the type-wheel shaft is arrested in word-space position and arm 401 is rocked to remove the cam shape 400 from beneath the stop 399, the cam piece 533 being in engagement with the arm 534 of the bell-crank arm 396, the bail rod is thus prevented from dropping and the justifying arms 391 are held in arrested position so that the sliding rod 444 can move to its full extent, to set the stepped slides 519 and 520 into position to control the gage-slides 305, 306 for a normal word-space. Stops 535, 536 are provided in the bracket 384 to limit the throw of the finger lever 531. Thus the machine may be operated either with or without the justification controller as desired.

*The type wheel inking mechanism.*—The type-carrier when placed in operative position is automatically inked by the following mechanism: Mounted on plate 1 is a curved bracket arm 457 on which are pivoted a series of inking rolls carrying arms 458 (see Figs. 1, 2, 3 and 16,) each of the pivots of which is provided with a spring 459 tending to urge the arms 458 toward the type wheel to bring the inking rolls 460 in contact with the type. A stop screw 461 is provided in each of the arms 458 which engages a stop 462 formed in the bracket 457. By means of these screws the inking rolls may be adjusted. Projecting laterally from each of the arms 458 is a pin 463. A curved arm 464 extends adjacent the arms 458 and passes through an opening in the plate 1. This arm is mounted fast upon a rock shaft 465 journaled in a bracket 466 on the under side of plate 1. To the other end of said rock shaft is fast an arm 467, the outer end of which is provided with a cam roller 468 engaging a cam $b$ on the auxiliary cam shaft 38. The curved arm 464 is provided near its upper end with four cam shapes 469 shown in dotted lines in Fig. 15, arranged to engage pins 463 which project laterally from arms 458. These cam shapes engage the pins of the four topmost inking roll arms 458. The curvature of arm 464 is such that the arm itself engages the pins 463 of the three lower inking roll arms, the action of the curved arm 464 being such that when swung on its pivot by means of cam $b$, the cam shapes 469 raise the four topmost inking rollers 460, and curved portion of arm 464 engages the pins 463 of the three lower arms 458 and raise their rolls from the type-carrier. Thus by the movement of arm 464 the whole series of inking rollers is lifted away from the type-carrier. The operation of cam $b$ is timed to cause this to be done just before a "shift" is made.

An ink font 470 (see Fig. 2, 16 and 16ᵃ) is mounted in suitable brackets below the plate 1 and is provided with an adjusting device 471 operated by a set screw 472 to regulate the amount of ink to be taken up by the font roll 473. The font roll 473 is keyed to shaft 473ᵃ having bearings in font 470 and has clutch connection with a shaft 474ᵃ. Shaft 474ᵃ has bearings in bracket 466 and has fast thereon a worm gear 474. Driving said worm gear is a worm 474ᵇ which is mounted upon a shaft 475 and has suitable bearings in bracket 466 secured to the lower side of plate 1. At its rear end shaft 475 has fast thereon a beveled pinion 477 having engagement with a bevel gear 478 upon a shaft 479. The shaft 475 is driven from the main driving shaft 23 by means of a worm 480 fast thereto and engaging the worm wheel 481 mounted fast upon said shaft 475. On the shaft 479 is mounted a cam 482 and arranged to engage therewith is a cam roll 483 on an arm 484 pivoted on a rock shaft 485 mounted in brackets 479ª on the lower side of plate 1. Fast to the rock shaft 485 is an arm 486 formed at its end with a toothed quadrant 487 engaging a gear 488 loosely mounted on the bearing of type-wheel shaft 42. The gear 488 has a sleeve 489, extending from which is an arm 490 carrying at its outer end an ink distributing roll 491. Formed on one side of the arm 490 is a cam shape projection 492, shown in dotted lines in Fig. 15 to engage the studs in arms 458 on which the inking rolls 460 rotate. Fast to shaft 491ª carrying the ink distributing roll 491 is a pulley 491ˣ which receives a driving belt 493ª which is connected with a double sheave 493 loose on the sleeve 489 on the gear 488 said double sheave being driven by belt connection 493ᵇ and sheave 23ᵇ fast to driving shaft 23. Through the action of cam 482, arms 484 and 486 the gear 488 is rotated, swinging the arm 490 up around the inking rolls 460. As the cam projection 492 passes each inking roll it raises the same against the action of spring 459 into contact with the ink distributing roll 491, thus each inking roll is supplied directly with ink. The ink is transferred from the font roll 473 to the ink distributing roll 491 by means of the ductor roll 494 mounted upon a bell-crank 495 pivotally mounted on a stud projecting from a bracket upon the lower side of plate 1. Pivotally connected with the bell-crank 495 is a tie-rod 496, to the other end of which is connected arm 497 fast to rock shaft 497ª mounted in suitable bearings in bracket 466. Said rock shaft has fast to its other arm 498 a cam roller 498ª which engages a cam 499 mounted on the shaft 479. By the action of the cam 499, arms 497, 498 rock rock-shaft 497ª, tie-rod 496 and bell-crank 495, the ductor roll 494 is oscillated between the font roll 473 and the ink distributing roll 491. The end roll 460 of the series of inking rollers at the top of the type-wheel is not inked, the movement of the arm 490 stopping short of this end roll. The function of this end roll 460 is to distribute or wipe the type after they have been inked by the other inking rolls.

It is understood that distributing roll 491 is constantly driven, thus rotating each inking roll 460 as well as ductor roll 494 when same are brought in contact therewith. The diameter of roll 491 differs from that of above mentioned rolls so that it may better grind up the ink.

The clutch connection between font and its driver mechanism is for disconnecting the same when font is taken out for cleaning. Means are also provided for throwing the inking mechanism out of gear. These are illustrated in Figs. 2 and 3, and consist of a lever 500 engaging a clutch 501 on the shaft 479, and a lever 502 engaging a clutch 503 on the same shaft. The clutch 501 disengages the cam 482 from the shaft and the lever 502 disengages cam 499 from the shaft, thereby stopping the operation of the ductor roll and the ink distributing roll, each cam being free on the shaft and provided with a tooth to engage clutch.

The entire apparatus above described is automatic in all its movements and actions and a detailed description of the operation of the complete machine is deemed unnecessary since in the above description, the operation of each part has been described in connection with a description of the mechanism itself.

The main driving shaft is clutched or belted to a convenient source of power and a supply of air or other pressure fluid is provided in the reservoir R. The electric circuits of the electro-magnets are connected and the machine is ready to operate when the main controlling tape or ribbon and the justification controlling tape or ribbon are inserted in their respective places. As each transverse line of perforations on the main controller ribbon is fed into position by the automatic feeding mechanism, and the valve clamping device is actuated the air passes to the several mechanisms for controlling the several operations of the machine and in conjunction with the several cams upon the main cam shaft and the auxiliary cam-shaft. The movements of the type-carriers are controlled to bring the proper type-carriers into position upon the wheel to release the type-wheel shaft and to arrest the same to bring the appropriate type-characters into impression position, to control the feed movements of the carriage in accordance with the unit values of the characters, the normal word spaces and the justification. For the commencement of a new line, the impression-receiving material is fed forward to receive the new line, and the type-carriers are maintained properly inked to give inked impressions. The controller tapes are automatically fed forward step by step to bring the transverse lines of perforations successively into position, to select the character spaces and justifications corresponding to the perforations.

While I have shown and described particular mechanisms constituting the machine, I do not wish to be understood that my invention is limited to the particular mechanisms and means shown and described, but that other mechanisms for producing the same results may be substituted without departing from the spirit and scope of the invention.

The product of the above machine is a printed composition and the impressions may be made upon any suitable impression-receiving material. I prefer however, to employ a transfer material upon which to receive the impressions from which the composition may be transferred to a planographic printing surface, whether in the form of an integral plate, or in the form of line bars as described in the patent to George R. Cornwall 753,368 dated March 1, 1904. When employed in connection with a planographic printing surface of the latter character, the sprocket perforations in the marginal edges of the impression-receiving material afford registering means by which the lines of impressions may be accurately registered or positioned with respect to the bars of a planographic surface of this character. I may if desired, employ a matrix sheet to receive the impressions thereby forming a matrix from which a stereotype may be taken; it being understood that in this case the inking devices herein described may be thrown out of operation and the type characters impressed directly into the matrix sheet. I may also if desired obtain a finished product from the herein described apparatus, in which inked impressions are made upon ordinary paper, this product being practically the same as the product of an ordinary typewriting machine. As many copies of the composition as desired may be obtained by simply running the controller tapes repeatedly through the machine. This may be conveniently done by joining the ends of the tapes so that they form endless ribbons and the operation of the machine will then be continuous for as many copies as desired. Where the lines are not required to be justified the action of the justification mechanism may be limited to the making of equal or normal spacing. It will thus be seen that my invention provides an apparatus for obtaining a product of any character which may be desired in the typographic art.

Having thus described my invention, the following is what I claim as new therein and desire to secure by Letters Patent:—

1. In a machine of the character described, a main driving shaft, a type carrier and two shafts, each having clutch driving connection with the driving shaft, a feed mechanism for a controller operatively connected with one of the shafts, and impression mechanism operatively connected with the other of said shafts and means controlled by the type-carrier in its several positions for operating said clutch driving connections.

2. In a machine of the character described, a main driving shaft, a type carrier and two shafts each having clutch driving connection with said driving shaft, feed-mechanism for a controller operatively connected with one of said shafts, and impression mechanism operatively connected with the other of said shafts, means controlled by the type-carrier when in non-printing position for operating the clutch connection of one of said shafts, and means controlled by the type carrier when in printing positions for operating the clutch connection of the other of said shafts.

3. In a machine of the character described, a main driving shaft, a type-carrier, and two shafts each having clutch driving connection with said driving shaft, a feed mechanism for a controller operatively connected with one of said shafts, impression mechanism operatively connected with the other of said shafts, an electro-magnetic device for operating the clutch-driving connection of each of said shafts, a circuit controlling means for each of said electro-magnetic devices said circuit controlling means operated by the type-carrier.

4. In a machine of the character described, a main driving shaft, a type-carrier, and two shafts each having clutch-driving connection with the driving shaft, a feed mechanism for a controller operatively connected with one of said shafts and impression mechanism operatively connected with the other of said shafts, an electro-magnetic device for the clutch driving connection of each of said shafts, circuit closing means connected with the type-carrier and operating to close the circuit of the clutch-controlling device of the first named shaft when the type-carrier is in normal position, and to break the circuit of said clutch-controlling device and close the circuit of the clutch-controlling device of the second named shaft when the type-carrier is in operative position.

5. In a machine of the character described a feeding mechanism for a controller, a type carrier and an impression mechanism, electrically controlled means for operating said feed mechanism and electrically controlled means for operating the impression mechanism, the circuits of said electrically controlled means controlled by the type-carrier.

6. In a machine of the character described a type-carrier, means to position said character in accordance with character and space representations on a controller, a feed mechanism for said controller, said feed mechanism comprising a feed roll, an escapement mechanism controlling the movement of said feed-roll, and means controlled by the type-carrier for operating the escapement mechanism.

7. In a machine of the character described a type-carrier, means to position said carrier in accordance with character and space representations on a controller, a feed mechanism for said controller, said feed mechanism comprising a feed roll, an escapement mechanism controlling the movement of said feed-roll, and means actuated by the type-carrier when in non-printing position for operating the escapement mechanism.

8. In a machine of the character described, a type-carrier, means to position the same in accordance with character and spaced representations on a controller, a feed mechanism for the controller comprising a feed-roll, an escapement wheel mounted to move therewith, an escapement lever in engagement with said escapement wheel and normally holding the feed-roll from movement, means controlled by the type-carrier for operating said escapement lever and permitting an escapement of the feed-roll.

9. In a machine of the character described, a type-carrier, means to position the same in accordance with character and space representations on a controller, a feed mechanism for the controller comprising a feed-roll, an escapement wheel connected to said feed-roll and moving therewith, said escapement wheel having a plurality of teeth corresponding to the feed movements required for the controller, an escapement lever in engagement with said wheel, said escapement lever having two members adapted to alternately engage the teeth of the escapement wheel and permit an escapement of said wheel one tooth at a time, and means controlled by the type-carrier for operating said escapement lever.

10. In a machine of the character described, a type-carrier, means to position the same in accordance with character and space representations on a controller, a feed mechanism for the controller comprising a feed-roll, an escapement wheel connected to said feed-roll and moving therewith, said escapement wheel having a plurality of teeth corresponding to the feed movements required for the controller, an escapement lever engaging said escapement wheel and formed with two members, one of said members engaging the teeth of the escapement wheel to hold the feed-roll from movement and the other of said members cam-shaped and coöperating with the teeth of the escapement-wheel to cam the holding member into engagement with the teeth of the escapement wheel after each escapement thereof, and means controlled by the type-carrier to operate said escapement lever.

11. In a machine of the character described a type-carrier, means to position the same in accordance with character and space representations on a controller, a feed mechanism for the controller comprising a feed-roll, an escapement mechanism controlling the movement of said feed-roll, an electro-magnetic device for operating said escapement mechanism, the circuit of said electro-magnetic device being controlled by the type-carrier.

12. In a machine of the character described, a type-carrier, a main driving shaft, driving mechanism for the carrier controlled by the main driving shaft, means to arrest the type-carrier in positions corresponding to character and space representations upon a controller, a feed mechanism for the controller, said feed mechanism comprising a feed-roll, an intermediate shaft having friction driving connection with said feed-roll and also having friction driving connection with the main driving shaft, an escapement mechanism for the feed-roll, an escapement mechanism for the intermediate shaft and means controlled by the type-carrier for operating both said escapement mechanisms simultaneously.

13. In a machine of the character described, a type-carrier, a main driving shaft, driving mechanism for the carrier controlled by the main driving shaft, means to arrest the type-carrier in positions corresponding to character and space representations upon a controller, a feed mechanism for the controller, said feed mechanism comprising a feed-roll, an intermediate shaft having friction driving connection with said feed-roll and also friction driving connection with the main driving shaft, a one-revolution escapement mechanism controlling said intermediate shaft, and a step-by-step escapement mechanism connected to the feed-roll, and means controlled by the type-carrier for operating both said escapement mechanisms simultaneously to cause a complete revolution of the intermediate shaft at each escapement and a partial revolution of the feed-roll at each escapement.

14. In a machine of the character described, a clamping device, mechanism for feeding a controller through the clamping device, a series of passages for fluid pressure in said clamping device, a source of pressure fluid supply connected to the clamping device, means operated by the clamping device when in a clamping position to open communication between the passages and the source of supply, and to close said communication when the clamping device is released, and type-selecting, spacing, shift and line-making mechanism operated by the fluid-pressure admitted to the passages.

15. In a machine of the character described comprising fluid-pressure-controlled type-selecting, spacing, shift and line-making mechanisms, passages for conducting pressure-fluid to said mechanisms, a clamping device with which said passages communicate, means to feed a controller through the clamping device, a source of pressure-fluid supply connected to said clamping device, said clamping device automatically operating when in clamping position to open communication between the passages and the source of supply, and when in open position to close said communication, and means to operate the clamping device and the controller feed mechanism alternately.

16. In a machine of the character described, a type-carrier, shifting, impression and line-making mechanisms, fluid-pressure-operated devices for positioning said carrier and controlling said mechanisms in accordance with representations on a controller, passages governed by the controller for conducting the pressure-fluid to the positioning and controlling mechanisms, means to feed the controller to bring the representations thereon in registry with said passages, a clamping device for clamping the controller in registering position, a source of pressure-fluid-supply connected to the clamping device, said clamping device having a valve portion for controlling the admission of pressure-fluid to the passages.

17. In a machine of the character described, a controller feed mechanism, a series of passages for fluid-pressure controlled by the controller, means to clamp the controller in operative position, said means comprising a clamping member and a valve member, a source of pressure-fluid-supply connected to the clamping mechanism, said valve member controlling the admission of pressure-fluid to the said passages, and means to operate said clamping device to bring the clamping member first into operation to clamp the controller in operative position and subsequently to operate the valve member to open the passages to the source of pressure-fluid-supply, and operating upon release of said clamping device to first close said passages from communication with the source of pressure-fluid-supply and subsequently to release the clamping member, said clamp-operating means working alternately with the controller-feeding means.

18. In a typographic machine of the class described, a circular type carrier having detachable types containing a series of single and multiple type faces, means to impart to said carrier an intermittent movement, the maximum number of stops during a complete rotation of the carrier being equal to the number of type faces represented and automatic means for stopping the type carrier.

19. In a typographic machine of the class described, a letter space feed mechanism controlled by a dial having a plurality of pneumatically actuated movable pins, means for projecting the pins, means for restoring the projected pins, and means controlled by an automatic letter selecting device for selecting the pin to be projected.

20. In a machine of the character described, a type wheel, a type carrier in engagement with said wheel, means to move said type wheel progressively, a series of fluid pressure actuated stop devices corresponding to characters on said type-carrier, means rotating with the type-wheel to engage an operated stop device, an impression mechanism, electrically controlled means for operating said impression mechanism and means for closing the circuit of said electric means when the type wheel is arrested.

21. In a machine of the character described a plurality of sets or faces of type, a plurality of stop gages corresponding thereto, stops on said gages representing the unit values of the type characters, a carriage for impression receiving material, means for feeding the carriage to receive successive character impressions and fluid pressure actuated stops to control the feed movement of the carriage, said stops controlled by the gages.

22. In a machine of the character described a plurality of sets or faces of type, a plurality of stop gages corresponding thereto and having stops representing the unit values of the type characters, a carriage for impression-receiving material, means for feeding the carriage to receive successive character impressions, a series of stops for controlling the feed movements of the carriage, means controlled by the stop-gages to select a stop corresponding to the unit value of an impressed character, and fluid pressure means for actuating the selected stop.

23. In a machine of the character described a plurality of sets or faces of type, a plurality of stop gages corresponding thereto having stops representing the unit values of the type characters, a carriage for impression-receiving material, means for feeding the carriage to receive successive character impressions, a series of stops for determining the feed movements of the carriage, passages for conducting pressure fluid to said stops and means controlled by the stop gages for opening the passage leading to the stop which corresponds to the unit value of the last impressed character to the source of pressure fluid supply and means for restoring the last operated carriage stop.

24. In a machine of the character described a plurality of sets or faces of type, a plurality of stop-gages corresponding thereto and having stops thereon representing the unit values of the type characters, selectively operated means for simultaneously shifting one of said sets of type and its corresponding stop gage into operative position, a carriage for impression-receiving material, mechanism for imparting a continuous feed movement to said carriage, a series of stops for arresting the carriage movement and means controlled by stop-gages for operating one of said carriage stops to limit the carriage feed movement to an amount corresponding to the unit value of the last impression.

25. In a machine of the character described a plurality of sets or faces of type, a plurality of stop-gages corresponding thereto and having stops thereon representing the unit values of the type characters, selectively operated means for simultaneously shifting one of said sets of type and its corresponding stop gage into operative position, a carriage for impression-receiving material, mechanism for imparting a continuous feed movement to said carriage, a series of stops for arresting the carriage feed movement for fluid pressure connected to said carriage stops, selectively operated valve slides for controlling said ducts, said valve slides controlled by the stop-gages.

26. In a machine of the character described a plurality of sets or faces of type, a plurality of stop-gages corresponding thereto and having stops thereon representing the unit values of the type characters, selectively operated means for simultaneously shifting one of said sets of type and its corresponding stop-gage into operative position, a carriage for impression-receiving material, mechanism for imparting a continuous feed movement to said carriage, a series of stops for arresting the carriage feed movement, ducts for fluid pressure connected to said carriage stops, selectively operated valve slides for controlling said ducts, a pair of coöperating valve slides having ports therein for controlling said ducts and means on said valve slides engaging the stop-gages and positioning the same to cause ports therein to register with a duct for operating a carriage stop to control the carriage feed movement in accordance with the unit value of the last impressed character.

27. In a machine of the character described, a type-carrier, selectively operated means to position said carrier in impression positions, impression mechanism for executing impressions of the positioned characters, a stop-gage having stops representing respectively the unit values of the characters on the type carrier, means for positioning said stop-gage simultaneously with the type carrier to bring the stop thereon which corresponds to the positioned character to operative position, a carriage for impression-receiving material, means to impart feed-movement thereto and stops for arresting said feed-movement, means for selecting the stop for permitting a feed movement of the carriage equivalent to the unit value of the character last impressed, said selective means controlled by the stop-gage.

28. In a machine of the character described, a carriage for impression-receiving material, driving mechanism for the carriage to feed the same in a direction to receive a line of successive impressions, a series of selectively operated stops for interrupting said carriage feed movement, a selector mechanism for selecting one of said stops, stops corresponding to the unit values of the characters and word-spaces, and means controlled by said stops and coöperating with the selector for selecting one of said carriage stops and means for operating the selected stop.

29. In a machine of the character described, a carriage for impression-receiving material, driving mechanism for the carriage, a series of stops for interrupting the carriage movement, said stops positioned apart a distance corresponding to a unit value of composition, a selector having movement corresponding to that of the carriage and having means therein registering with the carriage stops, a stop-gage the stops of which represent the unit values of the characters and spaces, means coöperating therewith and with the selector for designating a carriage stop corresponding to the required unit value of carriage feed and means for actuating the selected stop.

30. In a machine of the character described, a carriage for impression-receiving material, driving means for said carriage, a series of stops for interrupting the carriage feed movement, ducts for leading pressure fluid to said stops to actuate the same, each of said ducts corresponding to a definite unit value of composition said ducts representing the minimum and maximum unit values of carriage feed movement, a selector having ducts therein corresponding to the aforesaid ducts, said selector in engagement with the carriage driving means and moving with the carriage, a stop-gage, the stops of which correspond to the unit values of the characters and spaces, means controlled by said stop-gage for selecting one of the first mentioned ducts corresponding in unit value to an operative gage-stop, said selector having its corresponding duct positioned by the last carriage movement in registry with the said selected duct and also with a carriage stop in advance of the last actuated carriage stop a number of units equal to the unit value of the selected duct.

31. In a machine of the character described a carriage driving mechanism, a series of stops for interrupting the carriage feed movement, said carriage stops spaced apart a distance corresponding to a unit value of composition, a selector in engagement with the carriage driving mechanism and having ducts representing definite values of carriage feed from the minimum to the maximum carriage feed required, said selector ducts spaced apart a distance corresponding to a unit value of composition and registering with the carriage stops, a series of other ducts representing definite unit values of composition from the minimum to the maximum carriage feed movement required, means for selecting one of said latter ducts corresponding to the unit value of the character or space last impressed and opening said duct to a source of fluid pressure supply, the selector as positioned by the preceding carriage feed movement having the duct therein which corresponds to the unit value of the aforesaid selected duct in registry with a carriage stop in advance of the last actuated carriage stop a number of units corresponding to the carriage feed required.

32. In a machine of the character described a carriage for impression-receiving material, driving mechanism for said carriage, a series of stops for interrupting the carriage feed movement, said carriage stops spaced apart a distance corresponding to a unit value of composition, selectively-controlled fluid-pressure means for actuating said carriage stops, a selector having ducts therein spaced apart a distance corresponding to a unit value of composition, each duct representing a definite unit value from the minimum to the maximum unit value of carriage movement required, said selector ducts registering with the carriage stops in any arrested position of the carriage, the engagement of the selector with the carriage driving mechanism being such that at every feed movement of the carriage the selector duct of minimum value bears a definite relation with the previously actuated carriage stop, and selectively operated means for opening the selector duct corresponding to the next carriage feed movement required to the source of fluid pressure supply.

33. In a machine of the character described, a carriage for impression-receiving material, driving mechanism for said carriage, a series of stops for arresting the feed movement of the carriage said stops arranged in the form of a dial and spaced apart a distance corresponding to a unit value of composition, an arm moving with the carriage driving mechanism passing adjacent said dial in position to be arrested by an actuated carriage stop, a selector having ducts therein spaced apart a distance corresponding to a unit value of composition, said ducts arranged concentrically with the carriage stops and registering therewith in any arrested position of the carriage, each selector duct representing a definite unit value from the minimum to the maximum carriage movement required, said selector in engagement with the carriage driving mechanism and moving with the carriage, selectively operated means for selecting the selector duct representing the unit value of the last impressed character or space and opening said duct to a source of fluid pressure supply, automatically operated means to restore the previously actuated carriage stop and release the carriage and permit movement of the same until the said arm is arrested by the stop in registry with the selected duct, the relation between the selector ducts and the carriage stops being such that from every new arrested position of the carriage the selector ducts register with the carriage stops.

34. In a machine of the character described a word-space regulating mechanism comprising means for automatically feeding a word-space controller, a series of stop-arms each representing a definite unit value of justification from the minimum to the maximum amount required, stops controlled by the stop-arms, a carriage for impression-receiving material, driving mechanism for the carriage, a series of stops representing different unit values of carriage movement, fluid pressure means for actuating said carriage stops and selectively controlled means for designating the carriage stop corresponding to an operated stop-arm and its corresponding stop.

35. In a machine of the character described a type carrier having a plurality of different sets or faces of type, selectively controlled mechanism for selecting and positioning the face of type required, selectively controlled mechanism for selecting and positioning the characters in the selected type face in the order of composition, each of the selecting means being actuated simultaneously and an automatic device for preventing the positioning of the characters before the completion of the positioning of the selected type face.

36. In a machine of the character described, a type carrier, a carriage for impression-receiving material, mechanism for driving the carriage to receive a line of successive impressions, automatically controlled mechanism for returning the carriage to initial position for a new line of impressions, selectively operated means for positioning the type-carrier for the characters in the new line, said carriage returning mechanism and the carrier positioning mechanism being operated simultaneously, and an automatically operated device for locking the carrier positioning mechanism from operation until the carriage has been returned to initial position for the new line.

37. In a machine of the character described, a type carrier, impression mechanism for taking impressions from the type, said mechanism comprising a platen, toggles connected with the platen, means connecting said toggles to simultaneously flex the toggles in both directions and means to execute impressions when the toggles pass dead center in each direction.

38. In a machine of the character described, a type-carrier, an impression mechanism comprising a platen, toggles connected with the platen, a fluid pressure actuated piston connected to the toggles, means to admit pressure fluid to either side of the piston to flex the toggles in either direction and means to take an impression as the toggles pass dead center in either direction.

39. In a machine of the character described, two fixed supports provided with adjacent projections, intermediate of which there is a movable support, a series of type carriers capable of being moved from the rigid support to the movable support and vice versa and means for automatically moving said carrier.

40. In a machine of the character described, fixed type-carrier supports, interjacent of which there is located a movable support and automatic means for moving the carriers from the stationary to the movable support and vice versa.

41. In a machine of the character described, stationary type-carrier supports, an interjacent movable type-carrier support, and automatic means for moving the carriers from the stationary supports to the movable support, and means for locking the carrier temporarily upon the movable support.

42. In a machine of the character described, stationary type-carrier supports, an interjacent movable type-carrier support, automatic means for moving the carriers from the stationary to the movable support, means for locking the carrier upon the movable support, and means for unlocking the carrier when it is desirable to remove it from said support.

43. In a machine of the character described, a series of type-rings, each ring representing a distinct type face, a support for said type-rings, said support comprising a stationary portion and a movable portion, means to select one of the type-rings, and means to shift the selected ring from the stationary portion of the support to the movable portion.

44. In a machine of the character described, a plurality of type-rings, a support for said rings, said support comprising a stationary portion and a movable portion, selectively operated means for shifting said type-rings to bring the selected ring into engagement with the movable portion of the support, and automatically-operated means to lock and position the selected type-ring upon the movable portion of the support.

45. In a machine of the character described, a plurality of series of circularly mounted type, a support for said series of type, said support comprising a stationary portion and a movable portion, alining devices on said support for holding said series of type in definite position, means for moving the said movable portion of the support, and means for bringing the same to rest in normal position with its alining means in registry with the alining means on the stationary portion of the support, a shifter for said series of type, and means operative when the movable portion of the support is in registering position for actuating said shifter to transfer one of said series of type from the stationary portion of the support to the movable portion.

46. In a machine of the character described, a plurality of type-rings, a support for the same comprising a movable portion and a stationary portion, a shifter engaging the type-rings, and means on said shifter for holding the type-rings in locked relation one with the other, means to operate said shifter to shift any one of the type-rings from the stationary portion of the support on to the movable portion thereof, or vice versa, the locking means of said shifter operating to lock the rings from independent rotation during the shifting movement, and means to release said locking means to permit rotation of the carrier shifted on to the movable portion after the shifting movement has been completed.

47. In a machine of the character described, a plurality of sets of type, each set representing a distinct type design, a support for said sets of type, and shifting mechanism for shifting any one of said sets of type into operative position, said shifting mechanism comprising a toothed rack and a plurality of sectors engaging said rack, each sector corresponding to a set of type, selectively operative means to operate said sectors to move the rack an amount required to bring the set of type corresponding to the selected sector into operative position.

48. In a typographic machine employing a plurality of type in which is represented one of each of the characters in a font, a series of type carriers each representing a given number of said characters, and automatic means for operating one of said carriers, while the other carrier, or carriers remain stationary.

49. In a typographic machine, employing a plurality of alphabets, a series of type carriers each carrying an alphabet, said type carriers being selectively movable to and from a common support, and each of said carriers being capable of separate operation for positioning characters to be printed, while the other carriers are stationary.

50. In a machine of the character described, stationary type carrier supports, an interjacent movable type carrier support, a series of movable fingers resting between the several type carriers as a means for moving them from one support to another, said fingers being of a suitable form to fit tightly between the several carriers while moving them upon their supports, but to leave said carriers free after the required movement has taken place.

51. In a machine of the character described, stationary type carrier supports, an interjacent movable type carrier support, a type carrier upon the movable support and one or more type carriers upon one or both of the stationary supports, means for locking and unlocking the type carrier upon the movable support, means for bringing the movable support to a state of rest, and automatic means for moving the several type carriers while the movable support is at rest until the type carrier selected for operation is located upon the movable support, and means for releasing and moving the movable support and means for again bringing the movable support to rest.

52. In a machine of the character described, a movable support for a plurality of type carriers, a fixed support coöperating with said movable support, means to impart an intermittent movement to the movable support, means to remove the type carrier from the movable support, and means to place any of the carriers held by the fixed support to the movable support at will and means to prevent contact between the carriers on the movable support and those on the fixed support.

53. In a machine of the character described a wheel mounted upon a shaft journaled in bearings, said bearings having cylindrical projections in the direction of the sides of the wheel, said projections being of the same, or approximately the same diameters as that of the wheel, so that with the wheel they form approximately a continuous surface, a series of annular type carriers mounted upon said surface and normally free to move longitudinally thereon, means to normally hold said carries against rotation, means to rotate the wheel intermittently, and means to lock the carrier on the wheel while it is rotating from and back to its normal position, and means for unlocking the type carrier when the wheel is at normal position.

54. In a machine of the character described, a single wheel, with a type carrying periphery, and means for changing the type periphery so as to present a different variety or face of letters, a dial containing stops representing the characters, spaces and functions of one type carrier but adapted to be used for all the type carriers.

55. In a machine of the character described a type carrier comprising a plurality of sections, each section bearing a distinct set or face of type, selectively operated means to automatically shift the carrier to bring any one of said sections into operative position, means to lock sections from independent movement during the shift operation and means to permit independent movement of the section in operative position.

56. In a machine of the character described, a type carrier comprising a plurality of sections, each section bearing a distinct set or face of type, automatic means for shifting the carrier to bring the selected section into operative position, means to lock the sections from independent rotation during the shift movement, and means to release said locking means when the shift movement is completed.

57. In a machine of the character described a type carrier comprising a plurality of sections, a support for said carrier comprising a stationary portion and a movable portion, selectively operated means to automatically shift said carrier to bring the selected section into operative engagement with the movable portion of said support, means on both portions of the support engaging the several sections of the carrier to hold the same from rotary movement, said means on the stationary portion of the support registering with the same means on the movable portion when the latter is in normal position, means to rotate the movable portion of the support, and selectively operated means to control said movement.

58. In a machine of the character described the type-carrier comprising a plurality of separate sections, each section representing a distinct set or face of type, a support for said carrier comprising a stationary portion and a rotary portion, means to shift said character to bring any one of its sections into operative engagement with the movable portion, said shifting mechanism comprising a pair of arms engaging said carrier locking devices for said sections, and means to operate said locking devices during the shifting movement, and to release the same when the shifting movement is complete.

59. In a machine of the character described a type carrier comprising a plurality of sections, each section representing a distinct set or face of type, means to shift said carrier to bring any one of said sections into operative position, locking means to prevent independent movement of any of said sections during the shifting movement, said locking means comprising wedge-shaped pieces and means bringing said wedge-shaped pieces between adjacent sections of the carrier to lock the same together.

60. In a machine of the character described, a type-carrier having a plurality of sets or faces of type, means engaging said carrier to shift the same to bring any of said type-faces into operative position, said means comprising a rod and selectively operative means for moving said rod to different extents to bring the desired type face into operative position.

61. In a machine of the character described, a plurality of sets or faces of type, a plurality of sectors corresponding to the sets of type, means operated by said sectors to shift the sets of type into operative positions and means for selectively operating the sectors.

62. In a machine of the character described a plurality of sets or faces of type, a plurality of sectors corresponding to the sets of type, means operated and controlled by each of said sectors to shift the set of type corresponding respectively to the sectors into operative positions, and means for selectively operating sectors.

63. In a machine of the character described a plurality of sets or faces of type, a plurality of sectors corresponding to the sets of type, means operated by said sectors to shift the sets of type into operative positions and means on each sector to determine the operative position of the set of type corresponding thereto and means for selectively operating sectors.

64. In a machine of the character described, a plurality of sets or faces of type, a plurality of sectors corresponding to the sets of type, means operated by sectors to shift the sets of type into operative positions, a series of cams corresponding to the sectors and means for selectively operating said cams.

65. In a machine of the character described, a plurality of sets or faces of type, a plurality of sectors corresponding to the sets of type, means operated by the sectors to shift the sets of type into operative positions, and a series of fluid pressure operated cams for actuating the sectors.

66. In a machine of the character described a plurality of sets or faces of type, a plurality of sectors corresponding to the sets of type, means operated by said sectors to shift the sets of type into operative positions, said sectors having a neutral position in which the means operated thereby positions the set of type corresponding thereto in operated position and means for bringing any of said sectors into its neutral position.

67. In a machine of the character described a plurality of sets or faces of type, a plurality of sectors corresponding to the sets of type, means operated by said sectors to shift the sets of type into operative position, said sectors having a neutral position in which the set of type corresponding thereto is in operative position, means on each of said sectors for determining the neutral position thereof, and a series of cams engaging said determining means to move the sectors to neutral position and means for selectively operating said cams.

68. In a machine of the character described, a plurality of sets or faces of type, a rod provided with means engaging said sets or faces of type, a rack portion on said rod, a series of sectors engaging said rack portion, and a series of cams for operating said sectors to move the rod to different extents to bring any of said sets of type into operative position.

69. In a machine of the character described, a plurality of sets or faces of type, a plurality of sectors corresponding to said sets of type, a rod common to and engaged by said sectors and having means thereon engaging said sets of type, a series of cams corresponding to the sectors and engaging the same, fluid pressure means for operating said cams, the engagement of the sectors and cams being such that the rack is moved to different extents corresponding to the actuated sector to bring the corresponding set of type into operative position and means formed on the cams for locking the sectors in operative position.

70. A series of type-carriers automatically interchangeable, inking devices coöperating with the positioned carrier, and means for removing the inking devices while changing from one carrier to the other, an ink receptacle, and means for withdrawing the ink therefrom, means for distributing the ink and applying it to the type.

71. A series of type-carriers automatically interchangeable, a common means for operating said carriers one at a time, an ink receptacle, means for withdrawing ink therefrom, means for distributing the ink as withdrawn and applying to the type.

72. A series of type-carriers, means for automatically selecting one of said carriers and bringing it into position to be operated while the characters to be printed are being selected, means for adjusting and locking the selected carrier in operative position, means to automatically unlock said carrier when it is to be withdrawn from operative position, a series of inking devices, normally in contact with the carrier in operative position and means for removing the inking devices while changing carriers, an ink receptacle, means for taking ink from the receptacle and distributing it and applying it to the type.

73. In a machine of the character described a type carrier, a series of ink applying rolls normally in contact with the type, a pivotally mounted arm, a distributing roll carried by said arm in position to pass adjacent the ink applying rolls during the movement of said arm, means to oscillate said arm, means on said arm to engage each of the applying rolls successively and lift the same from the type into contact with the distributer roll, means to rotate the distributer roll, an ink fount, and means to transfer ink from the fount to the distributer roll.

74. In a machine of the character described a type-carrier having type mounted circularly thereon, a series of ink applying rolls concentrically with the type and normally in contact therewith, a pivotally mounted arm having an independently rotated distributer roll thereon, said arm mounted concentrically with the type and the ink applying rolls, means to oscillate said arm to the ink applying rolls, means on said arm to engage the ink applying rolls *seriatim*, lift the same from the type into contact with the distributer roll, momentarily holding same in contact therewith and permit the ink-applying roll to return into contact with the type, and means to supply said distributer roll with ink.

75. In a machine of the character described, a type-carrier, a plurality of ink-applying-rolls, each of said rolls mounted in a pivotally mounted arm, means to hold said roll normally in contact with the type, an arm having cam surfaces thereon arranged to engage the several arms of the ink applying rolls, and means to operate said arm to engage cam surfaces with the arms of the ink applying rolls, said cam surfaces formed to lift the rolls simultaneously off the type.

76. A typographic machine including in combination a movable support, a plurality of type carriers shiftable into and out of operative relation with said support, and inking means coacting only with the type carrier in operative relation with said support.

77. A typographic machine, operated by a controller, including in combination a plurality of movable type carriers, a movable support for a type carrier, means whereby the controller controls the movement of the support, and means whereby the controller controls the movement of the type carriers relative to the support.

78. A typographic machine, operated by a controller, including in combination, a plurality of movable type carriers, a movable support for a type carrier, means whereby the controller controls the movement of the support, and means whereby the controller causes any one of the type carriers to pass into operative relation with said support.

79. A typographic machine, operated by a controller, including in combination a plurality of movable type carriers, a movable support for a type carrier, means whereby the controller controls the movement of the support, and means whereby the controller causes one type carrier to pass into, and another type carrier to pass out of, operative relation with said support.

80. A typographic machine including in combination a rotatable support, a plurality of type carriers shiftable into and out of operative relation with said support, and inking means coacting only with the type carrier in operative relation with said support.

81. A typographic machine including in combination a movable support, a controller for positioning said support, and a plurality of type carriers which may be moved into and out of operative relation with said support.

82. A typographic machine including in combination a rotatable support, and a plurality of type rings, each of which may be moved into or out of operative relation with said support.

CHAS. T. MOORE.

Witnesses:
HENRY L. BRYHN,
R. B. H. LYON.